(12) United States Patent
Ariyoshi et al.

(10) Patent No.: US 6,918,130 B2
(45) Date of Patent: Jul. 12, 2005

(54) OPTICAL DISK UNIT

(75) Inventors: Yuji Ariyoshi, Toyonaka (JP); Yosuke Noda, Osaka (JP); Michinori Hashizume, Yawata (JP); Kiyoshi Ishioka, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 102 days.

(21) Appl. No.: 10/130,100

(22) PCT Filed: Sep. 14, 2001

(86) PCT No.: PCT/JP01/07982
§ 371 (c)(1),
(2), (4) Date: May 14, 2002

(87) PCT Pub. No.: WO02/23546
PCT Pub. Date: Mar. 21, 2002

(65) Prior Publication Data
US 2002/0163870 A1 Nov. 7, 2002

(30) Foreign Application Priority Data
Sep. 14, 2000 (JP) ........................ 2000-280282

(51) Int. Cl.[7] ................................. G11B 7/09
(52) U.S. Cl. ..................................... 720/691
(58) Field of Search ............... 720/605, 689, 720/690, 691, 692, 706, 710

(56) References Cited

FOREIGN PATENT DOCUMENTS

| GB | 2 347 263 | 8/2000 |
|---|---|---|
| JP | 5-67936 | 9/1993 |
| JP | 7-244908 | 9/1995 |
| JP | 10-134467 | 5/1998 |
| JP | 11-66716 | 3/1999 |
| JP | 2000-222803 | 8/2000 |

*Primary Examiner*—George Letscher
(74) *Attorney, Agent, or Firm*—Wenderoth, Lind & Ponack, L.L.P.

(57) ABSTRACT

An optical disk drive according to the present invention includes, a drive base (10); a traverse base (20) having a turntable (5), a first motor (3) for turntable drive, an optical pickup (6) and a drive mechanism thereof; and an intermediate base (80) disposed between the two bases, so as to swing vertically relative to the drive base and support the traverse base through an elastic body. A drive power transfer path switching mechanism is provided for switching the path through which drive power from a second motor 4 can be driven in forward and reverse directions to supply drive power to the loading drive mechanism and a pickup drive mechanism, so as to make it possible to perform a disk loading operation, a disk rotating operation and a pickup driving operation by 2 motors, and to make it possible to achieve both absorbing vibration from outside and suppressing vibration generated by the rotating operation of the turntable.

11 Claims, 41 Drawing Sheets

OPTICAL DISK UNIT

TECHNICAL FIELD

The present invention relates to an optical disk drive (hereinafter appropriately referred to as simply a disk drive) for recording a data signal and/or reproducing a data signal recorded to an optical disk (hereinafter appropriately referred to as simply a disk) used as a data storage medium such as what is called a CD (Compact Disc) or what is called a DVD (Digital Video Disk or Digital Versatile Disk).

BACKGROUND ART

As such a type of disk drive, a disk drive that has an opening on the front panel through which a disk tray opens and closes, and after the tray is opened and a disk is loaded onto the tray, the tray is automatically retracted into a predetermined position (a mounted position onto the turn table) in the disk drive is well known.

In such a type of disk drive, when a disk is loaded into this type of disk drive it is held between the turntable and a clamp and driven at a specific rotational speed so that data signals recorded to the disk can be read by the disk drive, that is recording or reproducing apparatus, during a read operation, for example. More specifically, signals are recorded to tracks within a specific area of the disk, and an optical pickup for signal reading is driven according to the track address of the desired signal so that the desired signal can be reproduced.

This type of disk drive has following three basic operations that require drive motor power: disk loading whereby the tray is driven in two directions between a disk loading/unloading position outside the disk drive at which a disk can be placed on or removed from the tray, and a loading/unloading position inside the disk drive at which the disk is loaded to or unloaded from the turntable; disk driving whereby the turntable is driven to spin a disk; and pickup driving whereby an optical pickup is driven primarily between positions at the outside circumference and inside circumference of the disk.

Conventionally, typical disk drives have also used separate motors (that is, three individual motors) as the drive source for these three operations.

In view of to this problem, in Japanese Utility Model Laid-Open Publication No. 3-49682 (hereinafter referred to as prior art 1), for example, a disk player (disk drive) is suggested that reduces the number of required motors to two by driving a single loading motor in forward and reverse directions for disk loading and unloading, disk chucking, and pickup drive.

A constitution according to the prior art 1 typically comprises a case and a chassis substantially integrated with the case, a turntable and a drive motor thereof are fixed to the chassis. That is, because the vertical position of the turntable is fixed, the disk must be moved vertically for disk loading and unloading in order to avoid interference with the turntable. In addition, the clamper side (chucking plate) must be driven vertically in order to clamp (settle) the disk to the turntable.

Therefore, in the disk drive according to the prior art 1, a disk holder for lifting the disk from the disk holding surface of the tray is provided, and rotating up or down the disk holder timed to the tray movement, thereby interference between the disk and turntable during disk loading and unloading is to be avoided. A chucking plate is further provided, that is supported by the fixed chassis through a chucking arm, so that the chucking plate can rotate and move vertically. And, the chucking plate is rotated up or down according to the disk loading and unloading timing to either clamp the disk to the turntable or to release the disk. Drive construction and operating the component parts are thus quite complicated and disadvantageous with respect to simplifying drive construction and achieving good stable operation.

Furthermore, all drive parts other than the tray and associated drive system are also provided on the fixed chassis in the disk drive according to the prior art 1. In addition, these parts are rigidly attached or supported on the fixed chassis. As a result, any impact, shock, or vibration to which the disk player is exposed is also transmitted directly from the fixed chassis to the various rigidly attached drive parts. These parts are thus easily susceptible to major damage. This design is therefore disadvantageous with respect to improving the durability of the disk drive to the effects of external forces, that is, resistance to shock and vibration.

Rigid attachment of these components to the fixed chassis also makes it necessary to extremely precisely position these components relative to each other. Extremely high precision is therefore required in both parts manufacture and assembly. When the need to mass-produce these components is considered, this need for extremely high precision is disadvantageous with respect to increasing productivity.

Considering these problems of the prior art, the applicant of this application has suggested, in Japanese Patent Application No. 11-23833 (hereinafter referred to as prior art 2), an optical disk drive having a basic constitution that has a first base (drive base) comprising a base frame of the disk drive, and a second base (traverse base) separate from the first base and supported to move or swing vertically relative to the first base, and has disposed thereto the turntable and a first motor for rotationally driving the turntable, and the optical pickup and pickup drive mechanism. This optical disk drive is able to reduce the number of motors used for drive operation, simplify the construction, improve the durability against shock and vibration, and improve the productivity.

According to this optical disk drive, the second base is supported by the first base, through floating bushings at right and left two portion of one end side, and through a gear (cam gear) supported by a floating collar and a floating spring at the other end side, in a manner enabling the second base to float (in a floating state) within specific limits (that is, within the flexibility limits of the floating bush, the floating collar and the floating spring. It is to be noted that the above-mentioned two floating bushings also have a supporting function for supporting the second base to move or swing vertically relative to the first base.

That is, the second base is not supported by a rigid construction (rigidly) on the first base, but is instead supported so as to float on the first base within limits determined by the flexibility of the damping members (the floating bushing, the floating collar and the floating spring). As a result, strong shocks or vibrations to which the optical disk drive is exposed can be absorbed by the damping members, and thus prevented from being transferred directly from the first base to drive parts on the second base. This means that the durability of the disk drive can be improved with respect to shock and vibration.

Furthermore, by supporting the second base so that it can float on the first base within the range of damping member flexibility, it is possible to adjust the relative positions of components on the first base and second base within the floating range of the second base. Compared with a conventional disk drive in which the components are supported by a rigid construction (rigidly), it is therefore possible to require less precision in parts manufacture and assembly, and productivity can therefore be improved in the manufacturing process.

SUMMARY OF THE INVENTION

In a disk such as DVD whereby high rotation speed is required (in DVD, for example, required rotation speed is approximately double that of a conventional CD) because of high recording density, also required higher accuracy in writing and/or reading information signal, therefore, it is more sensitive to vibration and more greatly influenced thereby.

When the arrangement of the prior art 2 is employed in such a disk to rotate in high speed (in other words, a disk that is required higher accuracy in writing and/or reading information signal), it is preferable to design the floating supporting mechanism that supports the second base to the first base have relatively high elasticity (that is, relatively soft supporting constitution) as same as the prior art 2.

The second base having a turntable rotates the disk thereon is provided with many other various components and mechanisms, therefore, it is usually difficult to arrange the turntable so that its position coincides with center of gravity of the second base. That is, the turntable is to be disposed at an off set position to (a position out of) the center of gravity of the second base to a certain extent. When the turntable disposed at a position out of the center of gravity rotates, this rotation may possibly generate vibration of the second base. More specifically, in the case the rotation speed of the turntable is high, the accuracy of writing and/or reading of information signal is greatly influenced by the vibration.

In order to restrain the vibration that may be generated by the rotation of the turntable, it is preferable to design the floating supporting mechanism that supports the second base to the first base to have relatively low elasticity (that is, relatively hard supporting constitution).

That is, when the arrangement of the prior art 2 is employed in such a disk that is required higher accuracy in writing and/or reading information signal, it is important to determine the elasticity of the floating supporting mechanism that supports the second base to the first base to an suitable value so as to achieve effectively both of absorbing vibration input from outside and restraining vibration generated by rotation of the turntable simultaneously.

However, in the optical disk drive of the prior art 2, floating bushings supporting respectively right and left portions of one end side of the second base must have simultaneously the rotational function of supporting the second base rotationally to the first base. Therefore, the floating supporting mechanism must be designed to have high elasticity (that is, relatively hard supporting constitution) more than a certain extent, and a range of determination in relation to elasticity is limited. That is, it is difficult to determine the elasticity of the floating supporting mechanism that supports the second base to the first base to an suitable value so as to achieve effectively both of absorbing vibration input from outside and restraining vibration generated by rotation of the turntable simultaneously.

Furthermore, in an disk such as DVD that is required higher accuracy in writing and/or reading information signal, a light beam from a pickup must be irradiated to the disk surface with high accuracy, and a reflected beam by the disk surface must be received with high accuracy. Therefore, an angle between the disk surface and the light beam must be limited more strictly.

However, there are usually deformations such as warpage and bending to a certain extent. Therefore, considerably complex constitution is required in mechanisms such as an optical pickup feeding mechanism and disk clamping mechanism, in order to limit more strictly an angle between the disk surface and a light beam in keeping up with deformation of the disk.

It is therefore a primary object of the present invention to achieve effectively both of absorbing vibration input from outside and restraining vibration may be generated by rotation of the turntable simultaneously, in an optical disk drive whereby disk loading operation, disk rotating operation and pickup transferring operation can be performed by two motors, furthermore, to limit strictly an angle between the disk surface and a light beam in keeping up with deformation of the disk.

To achieve this object, an optical disk drive of the application (hereinafter referred to as a first aspect of the present invention) has a turntable for rotatably supporting an optical disc, an optical pickup for writing a data signal to an optical disc rotating on the turntable or reading a data signal recorded to the optical disc, a pickup drive mechanism for moving the optical pickup bidirectionally between the inside circumference side and outside circumference side of the optical disc, and a disk loading mechanism for moving an optical disc bidirectionally between a first position at which the optical disc is above the turntable, and a second position at which the optical disc is outside the disk drive, a first base comprising a base frame of the disk drive, and a second base having disposed thereto the turntable and a first motor for rotationally driving the turntable, and the optical pickup and pickup drive mechanism, and an intermediate base disposed between the first base and the second base, being supported to move or swing vertically relative to the first base, and supporting the second base through an elastic body. Disposed on the first and/or second base are: a loading drive mechanism for driving said disk loading mechanism; a second motor that can be driven in forward and reverse directions for supplying drive power to the loading drive mechanism and pickup drive mechanism; and a drive power transfer path switching mechanism for switching the drive power transfer path of the second motor between a path transferring power to the loading drive mechanism and a path transferring power to the pickup drive mechanism. Thus comprised, moving the optical pickup, raising or lowering the turntable, and moving the optical disc can be substantially continuously performed in this sequence by driving the second motor continuously in a first direction of rotation; these operations can be performed in reverse direction in reverse sequence substantially continuously by driving the second motor continuously in reverse of this first direction of rotation.

According to this constitution, a separate second base is thus supported on a first base such that the second base can move or swing in a circular path vertically together with the intermediate base relative to the first base. A single motor (the above-noted second motor) can also be driven continuously forward (in a first direction of rotation) or in the opposite direction to move the optical pickup, raise or lower the turntable, and move the optical disc substantially continuously in this sequence, or substantially continuously in reverse direction in reverse sequence. Therefore, in inserting or retracting the disk, interference between the disk and the turntable without necessity to move the disk in the up and down direction. Also, it is possible to settle (clamp) the disk on the turntable and to release it therefrom, by utilizing a motion of moving or swinging in the up and down direction the second base mounted with the turntable against the first base. In this case, the optical pickup moving operation, the turntable raising or lowering operation and the disk transferring operation are performed by one motor. Therefore, with a first motor for rotating the turntable, it is capable of operating the disk drive totally with two motors, and of reducing the number of motors to use, then the construction of the drive can be more simplified. Furthermore, in this case, the intermediate base is supported on a first base such that the intermediate base can move or swing vertically relative to the first base, and the second base is supported by the intermediate base through an elastic body. Accordingly, the supporting of the intermediate base to move or swing vertically relative to the first base and the elastic supporting of the second base can be performed separately. Thus, the flexibility in determining the elasticity of the supporting portion for supporting elastically the second base is enhanced, in comparison with the case where the intermediate base is not provided. As a result, it is possible to achieve effectively both of absorbing vibration input from outside and restraining vibration that may be generated by rotation of the turntable simultaneously.

Further, in an optical disk drive of the application (hereinafter referred to as a second aspect of the present invention), based on the first aspect of the present invention, the intermediate base is disposed inside an opening in the first base, and is supported so that it can swing vertically pivoting around one end thereof relative to the first base. The first base comprises thereon a cam gear disposed near the other end side of the intermediate base, said cam gear having on an outside surface thereof a cam channel for raising and lowering an other end of the intermediate base; and the loading drive mechanism has a loading drive gear set containing a plurality of gears including a final output gear. The final output gear of the loading drive gear set engages an outside teeth part of the cam gear to rotate the cam gear and thereby raise or lower said other side of the intermediate base.

According to this constitution, the cam gear is rotated by drive power transferred from the loading drive gear set, and the other end side of the intermediate base is raised or lowered in conjunction with cam gear rotation. As a result, the intermediate base is (therefor, the second base also is) swung up or down to the first base pivoting around the one end side of the second base. That is, the vertical swing operation of the intermediate base and the second base (accordingly, raising or lowering operation of the turntable) and the disk transferring operation are performed by one motor (the second motor) in linking with each other.

Furthermore, in an optical disk drive of the application (hereinafter referred to as a third aspect of the present invention), based on the second aspect of the present invention, the profile of the outside gear part of the cam gear as seen in longitudinal section is an arc or a line approaching said arc. This arc follows a path of vertical circular motion through which the final output gear of the loading drive gear set travels in conjunction with the swinging movement of the intermediate base.

According to this constitution, the final output gear of the loading drive gear set reliably and smoothly engages the outside gear part of the cam gear when the final output gear swings up or down in conjunction with the swinging movement of the intermediate base.

Furthermore, in an optical disk drive of the application (hereinafter referred to as a fourth aspect of the present invention), based on the second or the third aspect of the present invention, a protrusion is disposed to said other end side of the intermediate base, and this other end side of the intermediate base is positioned vertically as a result of this protrusion engaging a cam channel in the cam gear.

According to this constitution, vertical positioning of the other end side of the intermediate base and the second base to the first base is reliably determined by engagement of the this protrusion and cam channel. Thereby, it is possible to engage accurately and reliably machinery components on the first base with those on the second base Furthermore, in an optical disk drive of the application (hereinafter referred to as a fifth aspect of the present invention), based on anyone of the second to the fourth aspects of the present invention, the disk loading mechanism comprises a tray drive gear for driving the tray on which a disk is placed. When the intermediate base swings downward to a specific position relative to the first base, the outside gear part of the cam gear engages the tray drive gear.

According to this constitution, the tray is driven after the intermediate base has (therefor, the second base also has) positively swung down from the first base. Accordingly, it is possible to avoid reliably the interference between the tray (the disk) and the turntable, when the tray is driven (that is, when the disk is transferred).

Furthermore, in an optical disk drive of the application (hereinafter referred to as a sixth aspect of the present invention), based on anyone of the second to the fifth aspects of the present invention, the pickup drive mechanism comprises a feed rack for moving the optical pickup, and a rack drive gear set comprising a plurality of gears for driving the feed rack. After moving the optical pickup to an inside circumference edge position of the data signal recording area of the optical disc, the feed rack can be moved to a specific position farther to the inside circumference side of the disc. By moving to this specific position at the inside circumference side and engaging the drive power transfer path switching mechanism, the second motor drive power transfer path is switched from a path to the pickup drive mechanism to a path transferring power to the loading drive mechanism. By moving from said specific position at the inside circumference side to the outside circumference side of the disc and thereby disengaging from the drive power transfer path switching mechanism, the second motor drive power transfer path is switched from a path transferring power to the loading drive mechanism to a path transferring power to the pickup drive mechanism.

According to this constitution, the drive power transfer path of the second motor can be automatically switched as a result of the feed rack moving from this specific position to the inside circumference side of the disk after moving the optical pickup to an inside circumference edge of the data signal recording area of the optical disc, and again when the feed rack moves from this specific position toward the outside circumference side of the disk. Therefore, the operation of the optical pickup for reading signal and switching the drive power transfer path of the second motor are performed in a manner linked with each other by driving one motor (the second motor).

Furthermore, in an optical disk drive of the application (hereinafter referred to as a seventh aspect of the present invention), based on the seventh aspect of the present invention, a regulating rod retractable from the other end side is disposed to the second base, and a positioning hole that can be engaged by the regulating rod is disposed in the intermediate base. The feed rack engages the regulating rod when it moves from the one end side to the other end side of the second base and reaches a specific position. The regulating rod protrudes from the other end side of the second base and fits into said positioning hole when the feed rack moves further toward the other end side after engaging the regulating rod, and thus regulates the position thereof to the second base through the elastic body, thereby positioning the second base to the first base in a lateral direction perpendicular to the direction of feed rack travel.

According to this constitution, the regulating rod is driven to project from the other end side of the second base as a result of the feed rack moving beyond a specific position to the other end side. The regulating rod thus fits into the positioning hole in the intermediate base, and thereby determines the lateral position of the second base to the intermediate base (therefor, to the first base) perpendicular to the direction of feed rack travel. Thereby, machinery components on the first base and those on the second base can be precisely and reliably engaged with corresponding components. Furthermore, moving the feed rack to the other end side of the second base and positioning the second base can be interlinked using drive power from a single motor (the second motor).

Furthermore, in an optical disk drive of the application (hereinafter referred to as a eighth aspect of the present invention), based on the first aspect of the present invention, the optical disk drive further comprises a disk clamping mechanism for pinching and holding an optical disk, which is mounted on a position that is concentric with a turntable fixed to a rotating axis of a spindle motor, with a clamper that is supported in a freely rotating manner. The clamper of the optical disk driving device is comprised of a central clamper for pinching and holding a proximity of an inner edge of the optical disk with the turntable and a large clamper abutting against an outer periphery of the optical disk. The disk drive further comprises a clamper moving means for moving the clamper in a direction away from an upper surface of the turntable when the pinching and holding the disk by the turntable and clamper are released.

According to this constitution, it is capable of exhibiting an action of correcting warpage, with regard to an disk warped to the clamper side, by abutting and pressurizing the large clamper to a proximity of an outer periphery of a disk on which no information is recorded. Thereby, it is possible to irradiate and reflect the light beam of the pickup to the disk surface in a condition of correcting warpage of the disk, and to limit more strictly an angle between an information recording surface of the disk and the light beam. That is, even if the disk is warped, it is possible to accurately perform recording and reproducing information in dealing with the deformation of the disk. Furthermore, since the disk drive is provided with a clamper moving means for moving the large clamper abutting against an outer periphery of the disk in a direction away from an upper surface of the turntable, it is possible to move the large clamper so as not to hinder movements of the tray.

Furthermore, in an optical disk drive of the application (hereinafter referred to as a ninth aspect of the present invention), based on the eighth aspect of the present invention, the optical disk drive further comprises the clamper that is supported at a position that is concentric with the turntable, a spring member which one side is made to abut the clamper and the other side of which is made to abut a spring holder that is mounted on a position that is concentric with the clamper, a spring hook that pierces through the clamper and that is fixed to the spring holder with the clamper and the spring member being interposed between, and a clamp plate for supporting the spring hook. The spring hook is supported by the clamp plate unless the turntable and the clamper are in pinching and holding conditions and wherein the clamper is moved by the spring member interposed between the clamper and the spring holder.

According to this constitution, the spring hook may be supported by the clamp plate unless the turntable and the clamper are in pinching and holding conditions, and the spring holder that is fixed to the spring hook may be simultaneously supported. It is possible to exhibit an action of moving the clamper by the spring member that is interposed between the supported spring holder and the clamper. That is, it is possible to move the clamper in a direction away from an upper surface of the turntable, by the urging force of the spring member that is interposed between the clamper and the spring holder supported by the clamp plate.

Furthermore, in an optical disk drive of the application (hereinafter referred to as a tenth aspect of the present invention), based on the eighth aspect of the present invention, the optical disk drive further comprises the clamper on which a first magnet is mounted, a clamp plate that is disposed in a direction opposite to the turntable of the clamper, and a second magnet that is mounted on the clamp plate. The clamper is moved through mutual pulling owing to magnetic force of the first magnet and the second magnet unless the turntable and the clamper are in pinching and holding conditions.

According to this constitution, it is possible to exhibit an action of moving the clamper through mutual pulling owing to magnetic force of the first magnet and the second magnet unless the turntable and the clamper are in pinching and holding conditions.

DETAILED DESCRIPTION OF THE INVENTION

Figure 1:
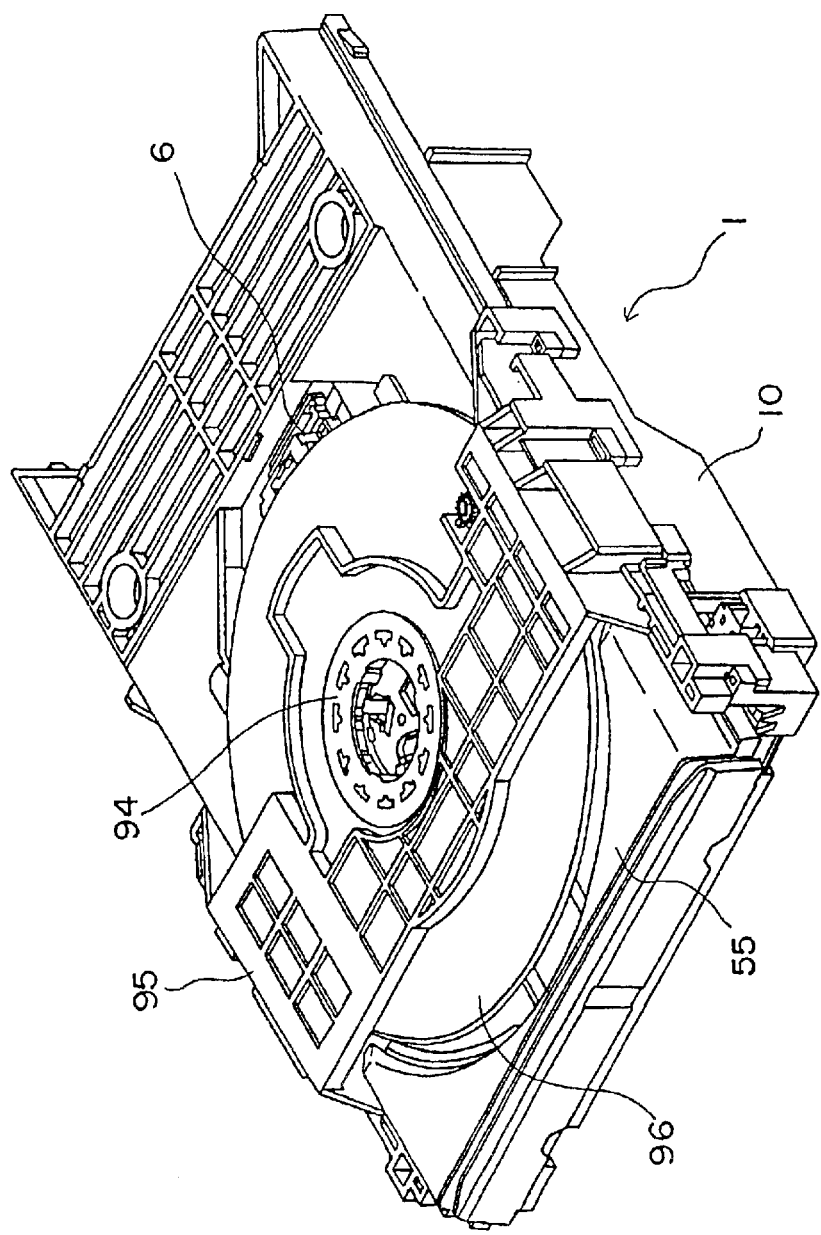
FIG. 1 is an overall perspective view of the assembled optical disk drive according to a preferred embodiment of the present invention.
Figure 2:
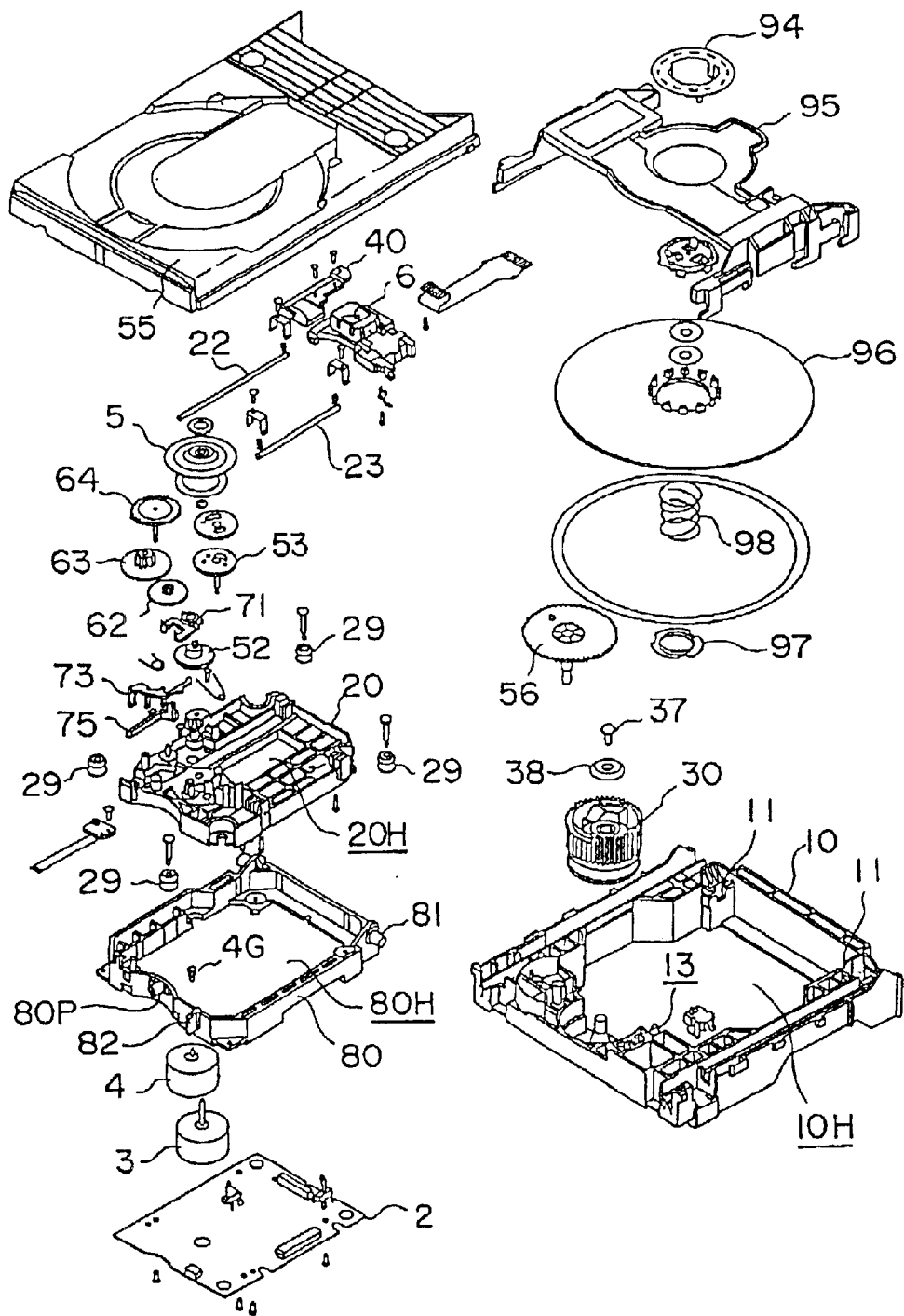
FIG. 2 is an exploded view of the disk drive.
Figure 3:
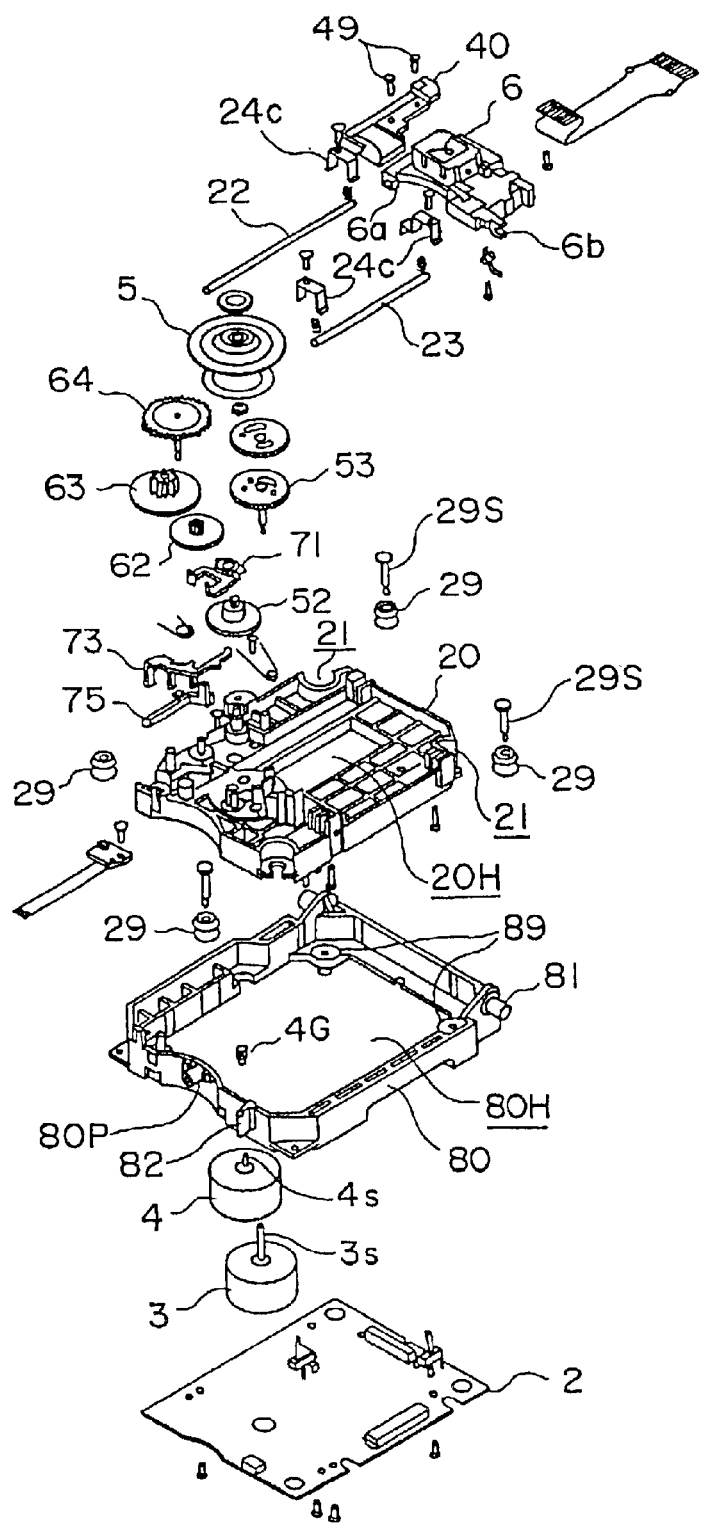
FIG. 3 is an enlarged view of parts of FIG. 2.
Figure 4:
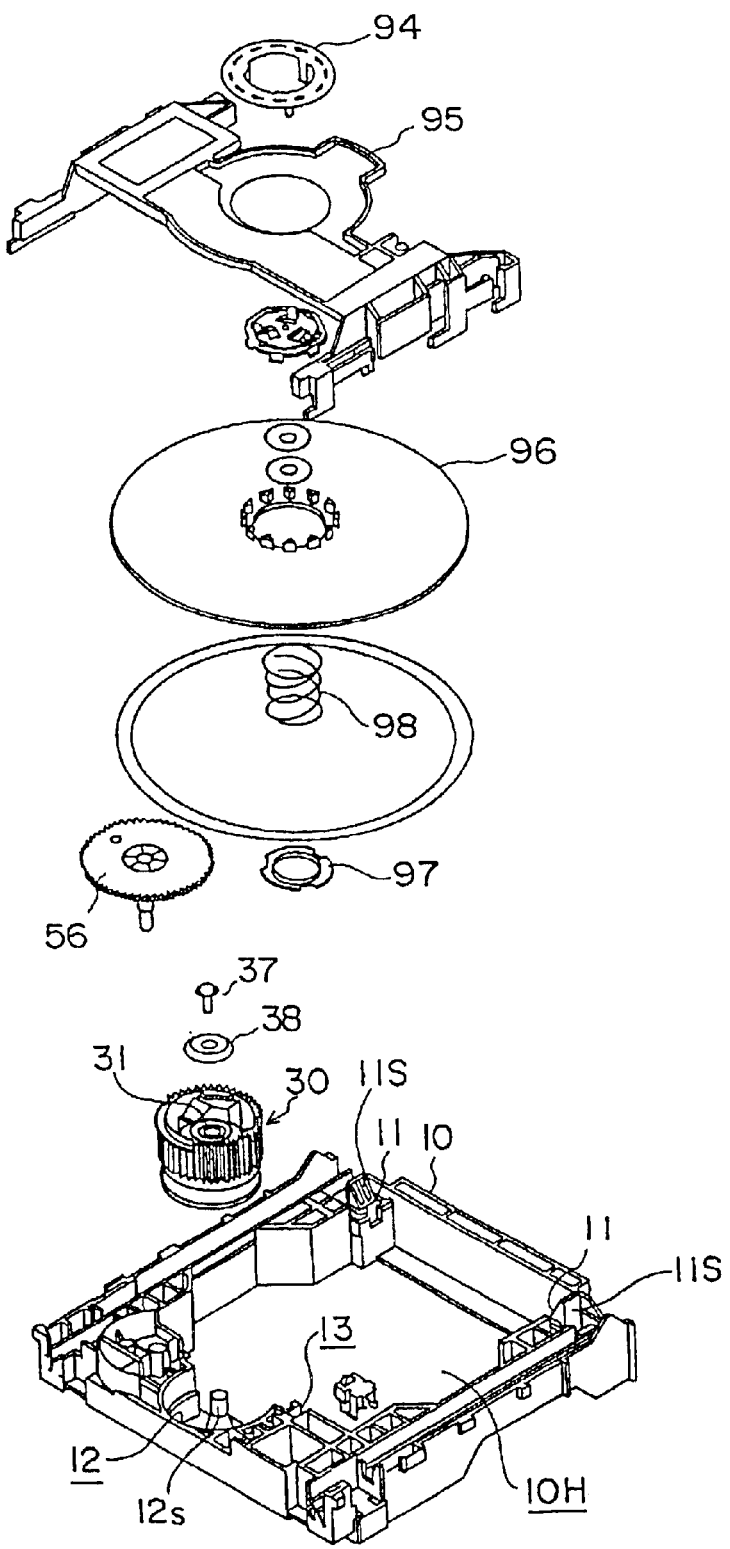
FIG. 4 is an enlarged view of parts of FIG. 2.

The preferred embodiments of the present invention are described below with reference to the accompanying figures. FIG. 1 is an overall perspective view of the assembled optical disk drive (hereinafter referred to as disk drive or simply drive) according to a preferred embodiment of the present invention. FIG. 2 is an exploded view of the disk drive shown in FIG. 1, and FIGS. 3 and 4 are enlarged views of parts of FIG. 2.

As will be known from these figures, an optical disk drive 1 according to this preferred embodiment comprises a drive base 10 as the installation base for major components of the drive 1, a traverse base 20 as the support base for supporting the major part of the disk drive's drive mechanism, and a intermediate base 80 disposed between the two base members 10, 20.

The overall shape of the drive base 10 and the intermediate base 80 are substantially square frames when seen in plan view. The intermediate base 80 is assembled to an internal space 10H in the drive base 10, and the traverse base 20 is assembled to an internal space 80H in the intermediate base 80.

It should be noted that the drive base 10, traverse base 20 and the intermediate base correspond respectively to the first base, second base and intermediate base in the accompanying claims.

A disc used as the data storage medium, such as a Digital Versatile Disc (what is called DVD), is placed on a tray 55 in this disk drive 1. The tray 55 transports a disk placed thereon bidirectionally along the frame of drive base 10. The path of the tray 55 is diagonal as seen in FIG. 1 and FIG. 2 and indicated by the arrow in FIG. 2. Thus, when a disk is removed from inside the disk drive 1, that is, is ejected, the tray 55 travels diagonally downward to the left as seen in FIG. 1 and FIG. 2, and when the disk is loaded (is inserted) from outside into the disk drive 1, the tray 55 travels diagonally upward to the right as seen in FIG. 1 and FIG. 2.

It should be noted that the side of the disk drive 1 from which the disk, that is, the tray 55, is removed from inside the disk drive 1 (the diagonal lower left side in FIGS. 1 and 2) is hereafter referred to as the front of the drive 1, and the side of the drive 1 to which the disk is inserted (the diagonal upper right side in FIGS. 1 and 2) is hereafter referred to as the back of the drive 1. The top and bottom of the drive 1 as seen in FIGS. 1 and 2 are also referred to hereafter as the top and bottom sides.

A pair of right and left intermediate base support portions 11 are disposed at the back of the drive base 10 (at the top right in FIG. 1 and FIG. 2). Shafts 81 are disposed to protrude from both side of the rear end of the intermediate base 80 respectively. Each of the intermediate base support portions 11 is formed to have a semicircular notch that opens upwardly. The shafts 81 are fit into right and left intermediate base support portions 11 respectively, thereby, the back of the intermediate base 80 is supported such that it can pivot in a vertical direction of the drive base 10 centering on a horizontal line Lh (see FIG. 5) between the centers of the right and left intermediate base support portions 11 (that is, between centers of the right and left shaft 81).

It is to be noted that a bias mechanism that urges the shaft 81 to the support portion 11 is provided at an outer vicinity, for example, of each of the intermediate base support portions 11, so as to prevent the shaft 81 fit into the support portion 11 from coming off.

A groove 13 (positioning groove) is formed on an inner periphery of the front portion of the drive base 10. A protruding piece 82 (positioning protruding piece) is provided at a corresponding portion to the positioning groove 13, on the front end of the intermediate base 80. The protruding piece 82 is fit into the positioning groove 13, thereby, the intermediate base 80 is positioned accurately to the drive base 10 in the right and left direction, further, vibration of the intermediate base 80 and the drive base 10 in the right and left direction is restrained.

A notch 21 is formed respectively at each back corner and a front corner of the traverse base 20. A catch 89 (bushing catch) corresponding to the notch 21 is provided respectively at each back inner right and left corner and a front inner corner of the intermediate base 80. An elastic, typically rubber, bushing 29 (floating bushing) is fit into each notch 21, thereafter, a settle shaft 29S inserted into the bushing 29 is fit and fixed to the bushing catch 89. Thereby, the traverse base 20 is supported by means of three bushings 29 so that the traverse base 20 can float (is supported in a floating condition) relative to the intermediate base 80 within a specific range (that is, within the flexibility of the bushings 29).

Figure 8:
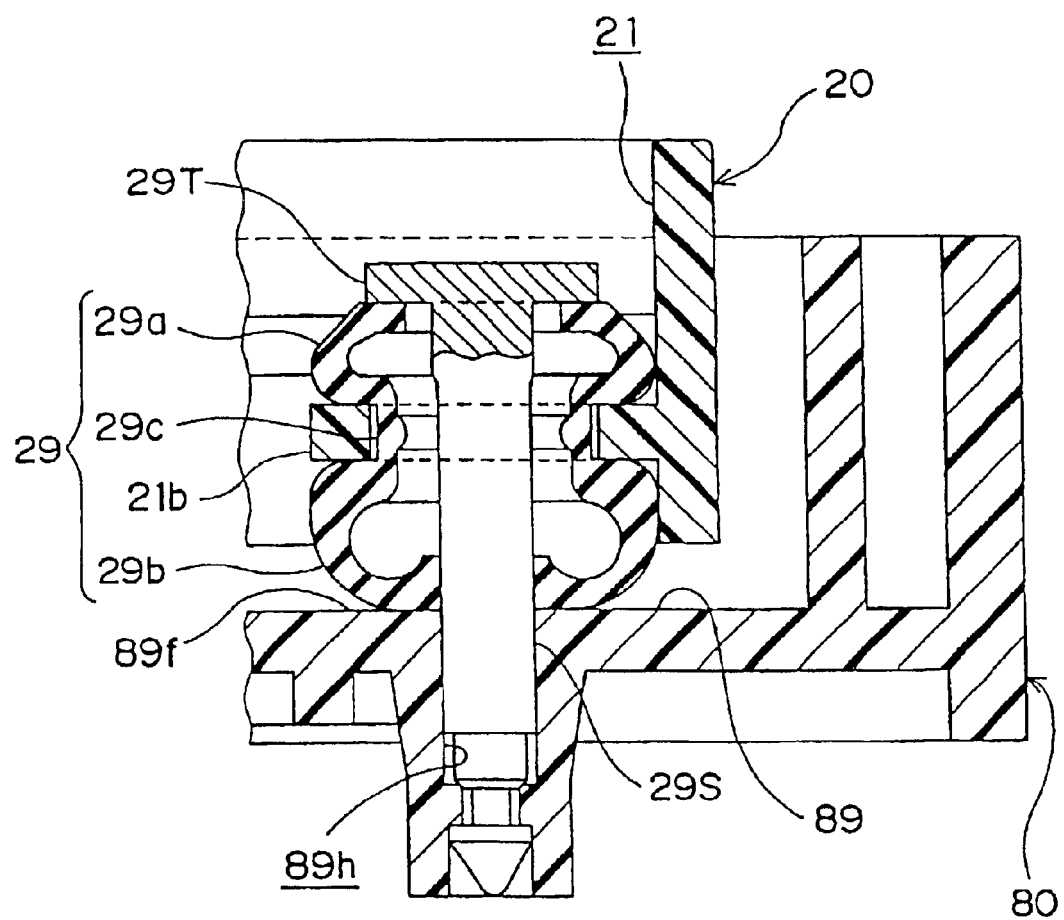
FIG. 8 is an enlarged vertical section view of the floating bushing fit to the traverse base.

As shown in FIG. 8, the bushings 29 are an integral hollow body molding with both ends open. Each bushing 29 also has relatively large diameter first and second damping parts 29a and 29b in sequence along the long axis of the bushing 29, and a relatively small diameter fitting part 29c between the two damping parts.

This fitting part 29c thus forms a constricted neck between damping parts 29a and 29b, and is the part that is fit to the traverse base 20 to be supported in a floating state by the floating bushings 29. More specifically, the bushing 29 is installed to a notch 21 of the traverse base 20 by fitting the outside circumference of the fitting part 29c into the hole part of a bushing mounting plate 21b in the notch 21.

And, the lower end of the floating bushing 29 contacts or approaches an upper surface 89f (bushing support surface) of the bushing catch 89, then, a fixing hole 89h formed in the bushing catch 89 and an opening of the floating bushing 29 are positioned with respect to each other. Thereafter, the fixing shaft 29S is inserted into the hollow inside of the bushing 29, and the top of the fixing shaft is fit into the settle hole 89h of the bushing catch 89. Thereby, the floating bushing 29 is fixed between a head 29T of the fixing shaft 29S and the bushing support surface 89f.

That is, the floating bushing 29 installed in the notch 21 of the traverse base 20 is fixed to the bushing catch 89 of the intermediate base 80. As described above, the traverse base 20 is supported (in a floating condition) by the intermediate base through the three floating bushings 29.

Preferably, the traverse base 20 is assembled to the intermediate base 80 by way of bushings 29 such that the terminal part of the second damping part 29b contacts bushing support surface 89f with a certain flexibility when in a normal state wherein only the normal weight of the traverse base 20 and components mounted thereon acts on the bushings 29.

When vibration is applied to the disk drive 1 when the drive 1 is in use or during manufacture and vibrating force is thus applied causing relative movement between the drive base 10 and traverse base 20, the damping action accompanying compressive deformation within the flexibility limits of the second damping part 29b effectively absorbs vibration components from the downward movement (that is, in the direction in which the bushing mounting plate 21b approaches the bushing support surface 89f) of the traverse base 20.

It should be noted that contact between the terminal end of the second damping part 29b and the bushing support surface 89f in this normal state is not necessarily a prerequisite for achieving this vibration damping effect from the second damping part 29b. A gap between this terminal end and the bushing support surface 10f simply reduces the vibration damping effect an amount equivalent to the gap, and when the relative movement between the intermediate base 80 and traverse base 20 exceeds this gap, the vibration damping effect is equivalent to how much this relative movement exceeds the gap.

When the traverse base 20 moves downward, the bushing mounting plate 21b moves away from the head 29T of fixing shaft 29S. If the upper end of the first fitting part 29a is fixed to the head 29T of fixing shaft 29S by adhesive, for example, the first damping part 29a is stretched and deformed within its flexibility limit. Vibration can therefore be absorbed both by the damping effect of the stretch deformation of the first damping part 29a and the damping effect of the compressive deformation of second damping part 29b. Extremely effective vibration absorption can thus be achieved.

Vibration components whereby the back of the traverse base 20 moves upward (that is, such that the bushing mounting plate 21b moves closer to the head 29T of fixing shaft 29S) can be effectively absorbed by the damping effect accompanying the compressive deformation of the first damping part 29a within the flexibility limits of the first damping part 29a.

When the traverse base 20 moves upward, the bushing mounting plate 21b moves away from the bushing support surface 89f of the intermediate base 80. If the lower end of the second fitting part 29b is fixed to the bushing support surface 89f by adhesive, for example, the second damping part 29b is stretched and deformed within its flexibility limit. Vibration can therefore be absorbed both by the damping effect of the stretch deformation of the second damping part 29b and the damping effect of the compressive deformation of the first damping part 29a. Extremely effective vibration absorption can thus be achieved.

Lateral vibration components parallel to the base surface, such as vibration components in the front-back direction or side to side direction of the traverse base 20, are absorbed by lateral deformation of the floating bushing 29 within its flexibility limit.

The floating bushing 29 thus comprises first and second damping parts 29a and 29b, and the fitting parts 29c. It is therefore possible to provide a simple, space-saving, low cost floating means that can support the entire weight of the traverse base 20, and effectively absorb vibration while preventing the traverse base 20 from slipping vertically out of place, when the traverse base 20 vibrates.

Figure 5:
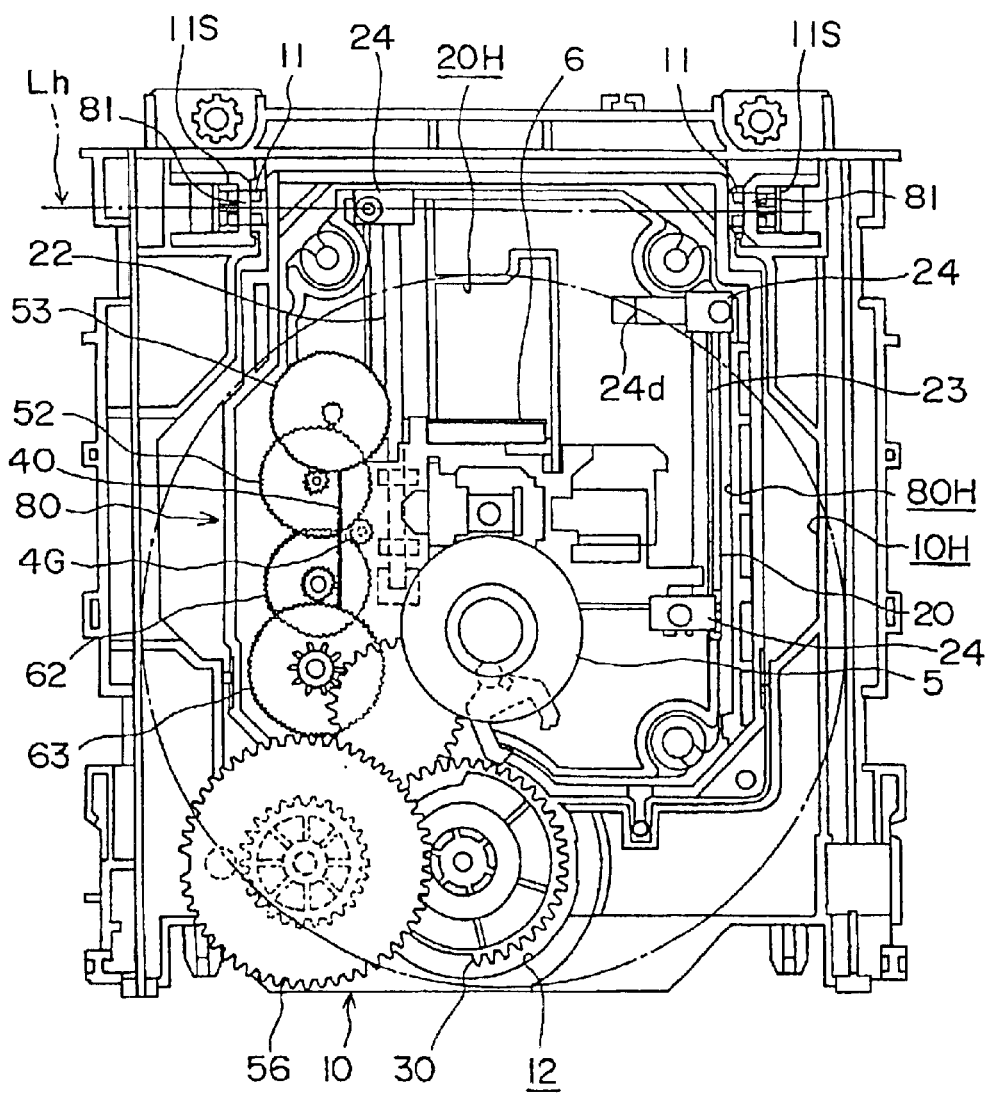
FIG. 5 is a plan view of an assembled state of the traverse base and drive base of the optical disk drive.

As will also be known from FIG. 4 and FIG. 5, a recess 12 of which the shape of the perimeter is part of a circle is formed at the front edge part of internal space 10H in drive base 10. A spindle 12s is vertically disposed in the bottom center of this recess 12. The center boss 31 of a substantially cylindrical cam gear 30 is fit so that it can rotate freely on this spindle 12s. The center boss 31 of the cam gear 30 is passed over the spindle 12s, and a screw member 37 (stop screw) is screwed through a flexible collar 38 (floating collar) into the end of the spindle 12s.

The cam gear 30 is therefore housed in recess 12 of drive base 10 with the top and bottom held between elastic members 38 and 39, that is, the top held by the floating collar 38. As a result, the cam gear 30 is supported on the drive base 10 in a manner enabling the cam gear 30 to float (in a floating state) within specific limits, that is, within a range (that is, within the flexibility limits of the floating collar 38).

It should be noted that the floating bushing 29 and floating collar 38 shall not be limited to rubber materials. For example, a soft resin or other suitable material with a specific flexibility can be alternatively used.

In the embodiment, more preferably, the elastic property of the floating support mechanism of the traverse base 20 is set so that vibration input into the traverse base 20 from outside is effectively absorbed and vibration generated by rotation of turn table 5 is effectively restrained. For example, a material of relatively low elasticity (that is, relatively hard; compared with that in the prior art 2) is selected as the material of the floating bushing 29 and floating collar 38 is selected The cam gear 30 is described in detail next with reference to FIGS. 24 to 29. The cam gear 30 comprises on its outside surface a plurality of teeth 30g (external teeth) parallel to the long axis Lg of the cam gear 30, and a cam channel 33 having top and bottom horizontal channels 33a and 33c, and diagonal channel 33b.

There is also a smooth part 34 in which there are no teeth 30g on the outside surface of the cam gear 30. A protrusion 80P for slideably engaging the cam channel 33 is also provided at the front edge of the intermediate base 80 (see FIG. 2 and FIG. 3). This protrusion 80P engages the cam channel 33 to support the front of the intermediate base 80 by way of cam gear 30 on the drive base 10.

Figure 6:
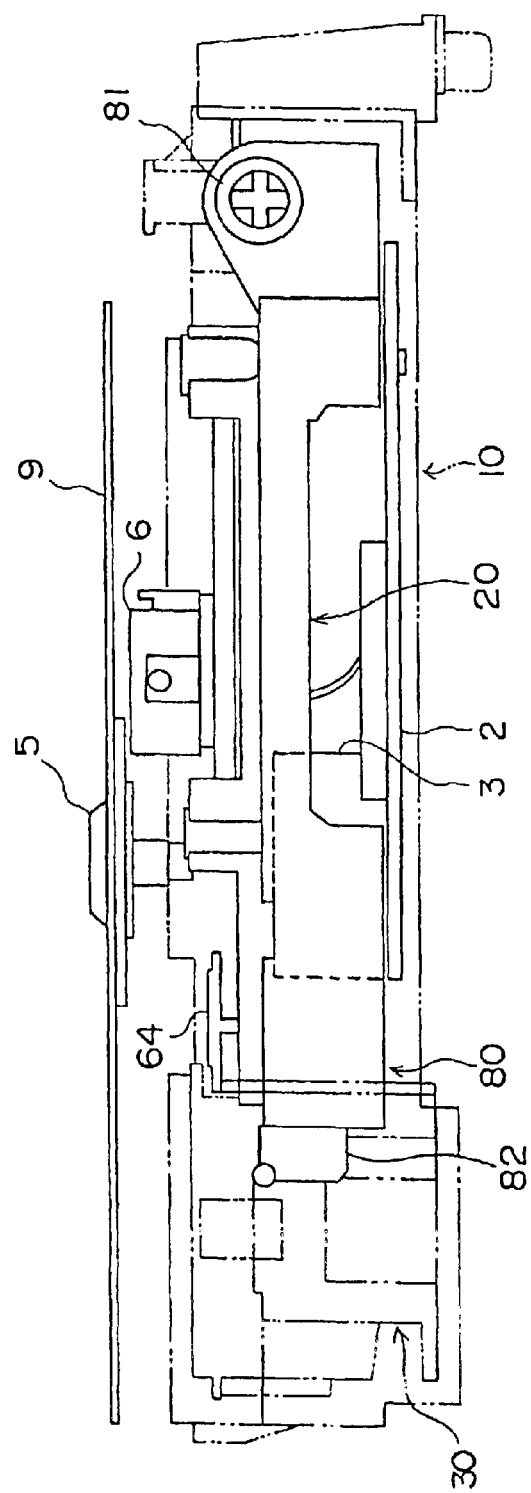
FIG. 6 is a partial side section view showing a typical support structure holding the traverse base to the drive base.
Figure 7:
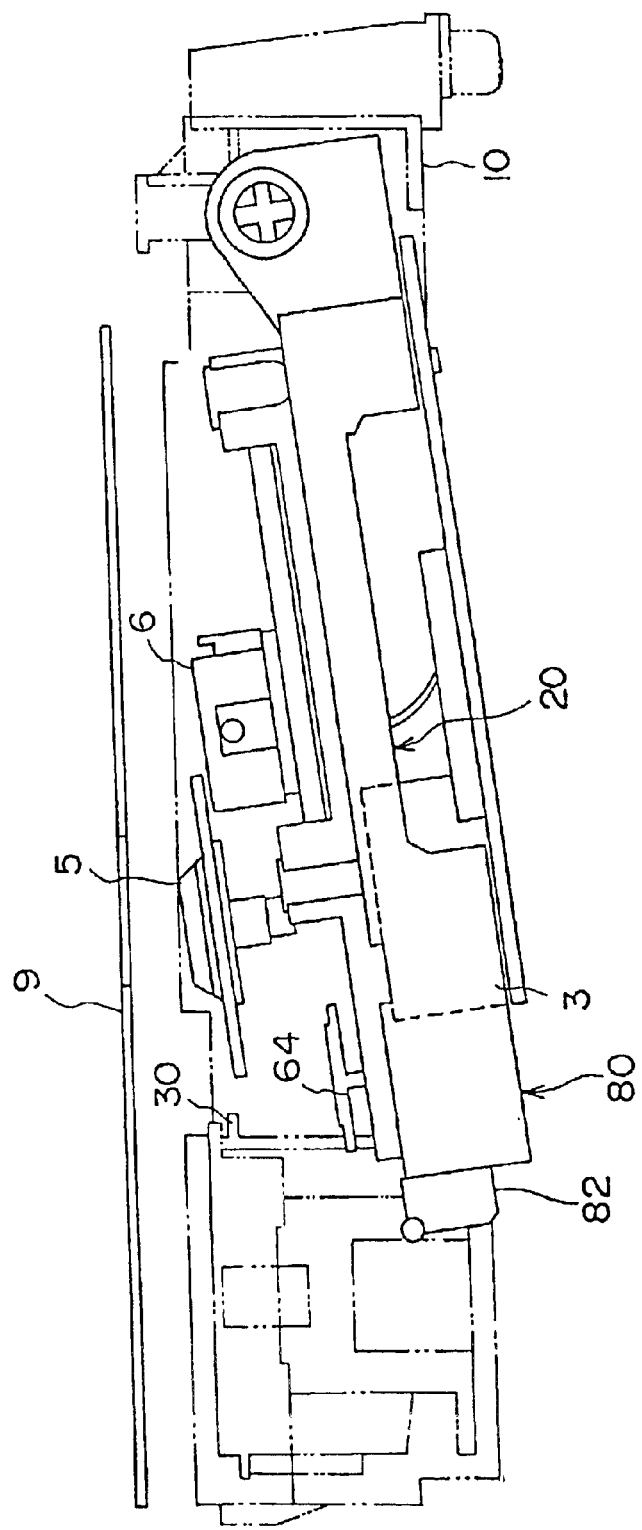
FIG. 7 is a typical partial side section view showing the traverse base inclined to the drive base.

As shown in FIG. 6 and FIG. 7, the intermediate base 80 is thus supported, at the back by way of right and left shaft 81 and the intermediate base support 11, to swing vertically on the drive base 10.

And the front portion of the intermediate base 80 is supported by way of the protrusion 80P and the cam groove 33 of cam gear 30 so that it floats (in a floating state) within a specific limit (that is, within the flexibility limits of the floating collar 38) on the drive base 10. Furthermore, the intermediate base 80 is positioned to the drive base 10 in right and left directions by the above-mentioned positioning protruding piece 82 fit into the positioning groove 13 provided to drive base 10.

The traverse base 20 is thus supported, at both the back corner and a front corner by way of the floating bushing 29 so that it floats (in a floating state) within a specific limit (that is, within the flexibility limits of the floating bushing 29 and the floating collar 38) on the intermediate base 80.

Note that the front portion of the traverse base 20 engages with the intermediate base 80, as explained later, by a regulating rod 75s fit into a positioning hole 83 of the intermediate base 80. And, in this engagement state, the traverse base 20 is combined with the intermediate base 80 at 4 portions totally.

The traverse base 20 is thus not supported by rigid construction (rigidly) on the intermediate base 80 (therefore, on the drive base 10), but is supported so that it can float (in a floating state) on the drive base 10 within the range of the flexibility of the supporting damping members (the floating bushing 29 or the floating collar 38 additionally), through the intermediate base 80. The damping members 29, 38 can therefore absorb an impact, shock, or vibration applied to the disk drive 1, thereby preventing the force of the impact or vibration from being directly transmitted from the drive base 10 to components on the traverse base 20. As a result, a disk drive 1 with improved durability and resistance to impact and vibration can be achieved.

Furthermore, by supporting the traverse base 20 so that it floats on the drive base 10 within the range of the flexibility of the damping members 29, 38, through the intermediate base 80, it is possible to adjust the relative positions of components on the drive base 10 and traverse base 20 within the floating range of the traverse base 20. Compared with a case in which the components are supported by a rigid construction (rigidly), a disk drive according to the present invention therefore also requires less precision in parts manufacture and assembly, and productivity can therefore be improved in the manufacturing process.

In this case, since the intermediate base is supported to swing vertically on the drive base 10 and the traverse base is supported on the intermediate base 80 through the elastic body, it is possible to perform the supporting of the vertical swing of the intermediate base to the drive base 10 and the elastic supporting of the traverse base 20 by separate mechanisms. Therefor, it is not necessary to use a same support in supporting the swing motion of the traverse base on the drive base and the elastic supporting of the traverse base, as it is in a conventional optical disk drive (prior art 2). Accordingly, the design range of elasticity of the supporting portion to support elastically the traverse base is not limited, and the flexibility of design thereof is to be enhanced.

As a result, absorbing vibration input from outside and restrain of vibration generated by rotation of the turn table are, relatively easily, achieved simultaneously.

As shown in FIG. 2 and FIG. 3, first and second electric motors 3 and 4, and a circuit board 2 comprising a control circuit for controlling driving motors 3 and 4, are also fastened to the bottom of drive base 10.

A turntable 5 on the top of which is placed a disc 9 (see FIGS. 5 to 7) is also disposed above the drive base 10. This turntable 5 is linked to the output shaft 3s (see FIG. 3) of the first motor 3 (spindle motor). An optical pickup 6 for writing a data signal to or reading a recorded data signal from the disc 9, and other drive components for operating the disk drive 1, are also disposed on top of drive base 10.

These drive mechanisms are described next below.

As will be understood from FIG. 3, FIG. 5 and FIGS. 51–53, a front to back (top to bottom) opening 20H is provided in traverse base 20. A pair of pickup guide channels 22 and 23 for guiding front to back travel of the optical pickup 6 is provided on the sides of this opening 20H. The turntable 5 is preferably positioned near the front end of the pickup guide channels 22 and 23 and opening 20H, or even forward of this position.

The optical pickup 6 is fixed to a rack member 40 (feed rack) described later at one side (left side in FIG. 5) in right and left direction, and a front to back pair of guide shoes 6a is provided under the fixed portion. These guide shoes 6a are engaged with the left guide rod 22 in a manner to slide freely in front and back direction. There is provided a metal guide arm 6b at the other side (right side in FIG. 5) in right and left direction of the optical pickup 6, that engages with the right guide rod 23 in a manner to slide freely in front and back direction. An intermediate metal fitting 6c is connected to the guide arm 6b. The intermediate metal fitting 6c is connected electrically to a pickup element 6p of the optical pickup 6.

Thus, the optical pickup 6 is supported so that it can slide front to back on the traverse base 20 by engaging the slide shoe 6a with the left guide rod 22 and engaging the guide arm 6a with the right guide rod 23. It should be noted that a flexible connection member (for example, a flexible ribbon cable: not shown) for electrically connecting the optical pickup 6 and circuit board 2 is passed through the opening 20H.

The rear end portion of the left guide rod 22 and front and rear end of the right guide rod 23 are supported by guide rod supporting portion 24 provided on the traverse base 20. As shown in detail in FIG. 53, the guide rod supporting portion 24 comprises a tilt adjustment mechanism that adjusts the inclination of the guide rod 22, 23 by setting each end portion of guide rods in vertical direction.

That is, an adjusting screw 24a raising or lowering the end of guide rod is fitted in to a lower portion of each guide rod supporting portion 24. While, a coil spring 24b urging the end of guide rod downwardly is assembled into an upper portion of each guide rod supporting portion. And, a holding metal cover 24c is fixed over the coil spring 24b.

By providing such a tilt adjustment mechanism, it is possible to adjust the inclination of the guide rod 22, 23, thereby adjusting an angle between a light beam of the optical pickup 6 and the disk 9. And, it is possible to perform accurately writing and/or reading information signal against the disk 9, even if there are deformations such as warpage in the disk 9.

It is to be noted that only the front end of the left guide rod 22, not shown in figures, is supported by simple concave receiving portion, not with tilt adjustment mechanism, in order to avoid an interference with a moving operation of feed rack 40.

In the preferred embodiment, more preferably, in order to earth the noise of the optical pickup 6 in a simple manner, for example, one end of the holding metal cover 24c of the right guide rod supporting portion 24 is extended downwardly (that is, closing to the circuit board 2) through the traverse base 20. There is provided, at a corresponding portion to the extended portion 24d of the metal holding cover 24c, a through hole 2h capable of inserting therein an earth connector 25 having a earth wire 25a at one end thereof. And, it is possible to insert the earth connector 25 into the through hole 2h and to stick the tip of the extended portion 24d of the metal holding cover 24c in the tip portion of the earth connector 25. Furthermore, both of the guide rod 23 and the guide arm 6b are made of electrically conductive material such as metal.

Therefore, noise from the pickup element 6p of the optical pickup 6 is transmitted to the guide rod 23 through the intermediate metal fitting 6c and the guide arm 6b, and conveyed from the guide rod 23 to the earth wire 25a through the metal holding cover 24c and the earth connector 25, and then, the noise is eliminated through the earth wire 25a.

That is, by a simple work only to insert the earth connector 25 to the extended portion 24d of the metal holding cover 24c, noise of the optical pickup 6 can be eliminated.

As described above, the optical pickup is fixed at one side (left side in FIG. 5) in right and left direction on the rack member 40 (feed rack). Therefore, the traveling motion in front and back direction of the feed rack 40 is guided by the right and left guide rods 22, 23 through the slide shoe 6a and the guide arm 6b. That is, the optical pickup 6 can be moved bidirectionally front and back guided by the guide rods 22, 23 by moving the feed rack 40 along the guide rods 22, 23.

As shown in detail in FIGS. 30 to 34, teeth 41 (driven rack part) are formed along substantially the full length on one side of the feed rack 40 (the right side in FIG. 3 and FIG. 5). A length of teeth 42 (transfer path switching rack) is also formed on the other side at the front of the feed rack 40.

It should be noted that a front and back pair of guide shoes 6a is provided at the back of the feed rack 40, as described above. And, the movement of the feed rack 40 to the back is limited by striking and stopping the guide shoes 6a at the back wall of the traverse base 20 when the feed rack 40 travels to the back (upward in FIG. 5).

A gear set 51 (rack drive gear set) comprising a group of gears is disposed to the traverse base 20 to drive the feed rack 40 and move the optical pickup 6 bidirectionally front and back.

As shown in detail in FIGS. 9 to 13, this gear set 51 comprises: a motor gear 4G fastened to the output shaft 4s of the second motor 4; a first traverse gear 52 having a large diameter input gear 52A (first traverse input gear) for engaging the motor gear 4G, and a small diameter output gear 52B (first traverse output gear) integrally disposed to the top of the input gear 52A; and a second traverse gear 53 having a large diameter input gear 53a (second traverse input gear) for engaging the first traverse output gear 52B, and a small diameter output gear 53B (second traverse output gear) integrally disposed to the bottom of the second traverse input gear 53a. The second traverse output gear 53B engages the driven rack part 41 of the feed rack 40.

When the second motor 4 is driven and the motor gear 4G turns at a specific speed in, for example, the counterclockwise direction as seen in FIG. 9 to FIG. 13 (corresponding to the first direction of rotation in the accompanying claims of this invention), motor rotation is speed reduced at a specific reduction ratio and is transferred to the output side by the gear set 51 so that the final output gear 53B (second traverse output gear) turns counterclockwise at a reduced speed.

This causes the feed rack 40 to travel at a predetermined speed along the guide rail 24 to the front (to the bottom as seen in FIGS. 9 to 13). When the second motor 4 is driven in the direction opposite that described above, and feed rack 40 also travels in the opposite direction.

It is therefore possible by switching the forward and reverse direction of second motor 4 operation to change the direction in which the feed rack 40, and therefore the optical pickup 6, travels, and the feed rack 40 and optical pickup 6 can therefore be driven bidirectionally forward and back.

The feed rack 40 and gear set 51 form the basic optical pickup drive mechanism, equivalent to the optical pickup drive mechanism of the accompanying claims, whereby the optical pickup 6 is moved in two directions between the inside circumference and outside circumference of the disc 9. The pickup guide channels 22 and 23, guide shoe 6a and guide arm 6b also assist driving the optical pickup 6.

A tray drive gear 56 for moving the tray 55 between an unloading position at the front of the disk drive 1 so that a disc can be place on or removed from the tray 55, and a loading position inside the disk drive 1 at which a disk is loaded to or unloaded from the turntable 5, is provided at the front of the drive base 10.

It should be noted that this loading position and unloading position are equivalent to the first position and second position, respectively, in the accompanying claims.

This tray drive gear 56 comprises a large diameter output gear 56B for engaging the tray rack teeth 55g provided on the back of the tray 55 (see FIG. 19 to FIG. 21), and a small diameter input gear 56A below the output gear 56B. The tray drive gear 56 is positioned beside the cam gear 30 such that the input gear 56A engages the outside teeth 30g of the cam gear 30.

The tray 55, tray rack teeth 55g, and tray drive gear 56 form a disk loading mechanism, equivalent to the disk loading mechanism in the accompanying claims, for carrying a disc 9 between the turntable 5 loading position (first position) and the unloading position (second position) outside the disk drive 1.

A gear set 61 comprising a group of gears (a loading drive gear set 61: see FIG. 9 to FIG. 13) for moving the tray 55 between the disc 9 unloading position and loading position is provided on top of the traverse base 20.

This loading drive gear set 61 comprises: motor gear 4G attached to the output shaft 4s of the second motor 4; a first loading gear 62 having a large diameter first loading input gear 62A for engaging the motor gear 4G, and a small diameter first loading output gear 62B disposed integrally to the top of the first loading input gear 62A; a second loading gear 63 having a large diameter second loading input gear 63A for engaging the first loading output gear 62B, and a small diameter second loading output gear 63B disposed integrally to the top of the second loading input gear 63A; and a large diameter third loading gear 64 for engaging the second loading output gear 63B. This third loading gear 64 engages teeth 30g of the cam gear 30.

Figure 29:
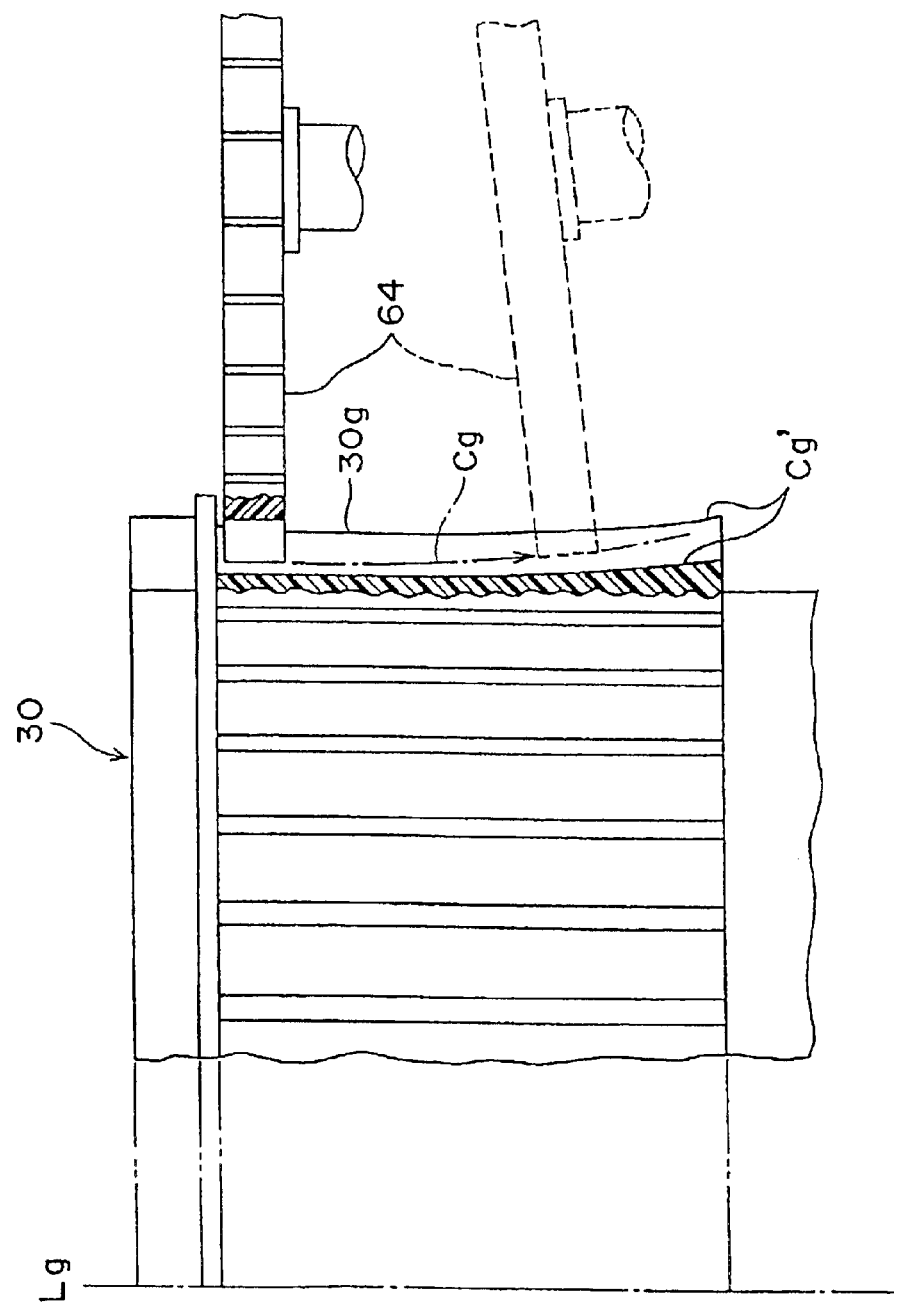
FIG. 29 is a partial vertical section view showing the tooth profile of the cam gear.

The profile of teeth 30g of the cam gear 30 when seen in vertical section, or more preferably in side view as shown in FIG. 29, is curved. When the intermediate base 80 having the traverse base 20 and cam gear 30 are assembled into the drive base 10 with the intermediate base 80 pivoting at the back edge thereof so as to move circularly up and down relative to the drive base 10 (see FIG. 6 and FIG. 7), the curve of the tooth profile is part of the arc Cg' tracing the circular path Cg of the front edge of the third loading gear 64.

The third loading gear 64 on the traverse base 20 and teeth 30g of the cam gear 30 can therefore reliably and smoothly engage even when the traverse base 20 has swung, through the intermediate base 80, to a position at an angle to the drive base 10 (indicated by the dotted line in FIG. 29 and shown in FIG. 7). It should be noted that the profile of teeth 30g in vertical section can be a straight line at an incline to the long axis Lg of the cam gear 30 and approaching curve Cg'.

It should be further noted that the second loading gear 63 is not shown in FIG. 6 and FIG. 7 to provide a clearer view of the third loading gear 64 engaging teeth 30g of cam gear 30.

As thus described, the profile in vertical section of the teeth 30g of cam gear 30 is an arc following the circular path of the third loading gear 64, that is, the last output gear of the loading drive gear set 61, as the gear 64 moves circularly up or down in conjunction with the circular movement of the intermediate base 80 and the traverse base 20, or is a straight line approaching this arc. As a result, the final output gear 64 reliably and smoothly engages teeth 30g of cam gear 30 even when the loading drive gear set 61 moves in a circular path vertically in conjunction with the movement of traverse base 20 in a circular path.

It should be noted that a loading drive mechanism for driving the disk loading mechanism comprises basically the loading drive gear set 61 and cam gear 30, or more specifically the teeth 30g thereof, and this loading drive mechanism corresponds to the loading drive mechanism of the accompanying claims.

The above-noted optical pickup 6 can move to a specified position on the inside circumference side of the data signal recording area of the disc 9. When the optical pickup 6 is then moved by the drive power of second motor 4 via the gear set 51 from the outside circumference side of the disc 9 to the inside circumference side, and reaches said specified position outside of the data signal recording area of the disc 9, the transfer path of second motor 4 drive power is switched to the loading drive gear set 61.

This transfer path switching operation is described further in detail with reference to FIG. 14 to FIG. 18. A vertical stud 20s is disposed at the front of the traverse base 20. A trigger lever 71 for switching the power transfer path is held on the stud 20s. A rocking lever 73 restricting the position of the trigger lever 71 is provided nearby.

Figure 35:
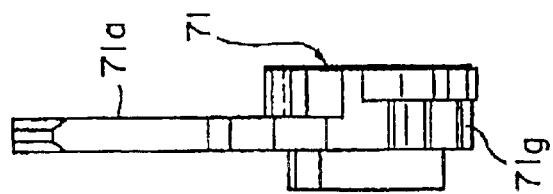
FIG. 35 is a section view of the trigger lever through line Y35—Y35 in FIG. 36.
Figure 36:
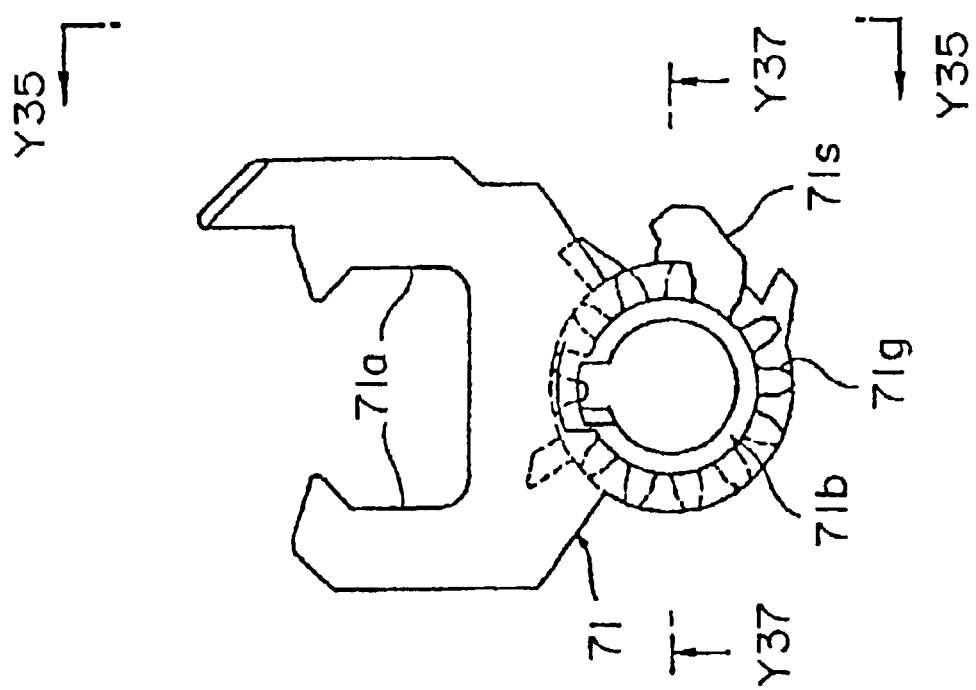
FIG. 36 is a plan view of the trigger lever of the drive mechanism.
Figure 37:
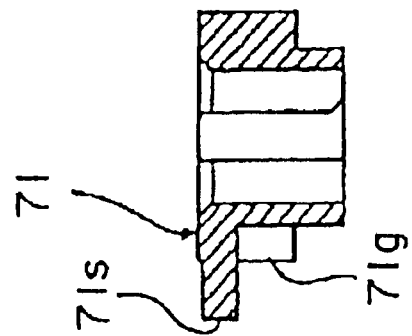
FIG. 37 is a vertical section view of the trigger lever through line Y37—Y37 in FIG. 36.

As shown in detail in FIG. 35 to FIG. 37, the trigger lever 71 comprises a base 71b fit rotatably on the stud 20s, a partial gear 71g formed to part of the outside of the base 71b, and a pair of engaging arms 71a for engaging the cam gear 30. A stop 71s for engaging claw 73d of rocking lever 73 is provided on the outside of the trigger lever base 71b.

The partial gear 71g is for engaging the power transfer path switching rack 42. The engaging arm 71a is also disposed so that it can engage the hook 32 protruding from the outside of the cam gear 30.

Figure 38:
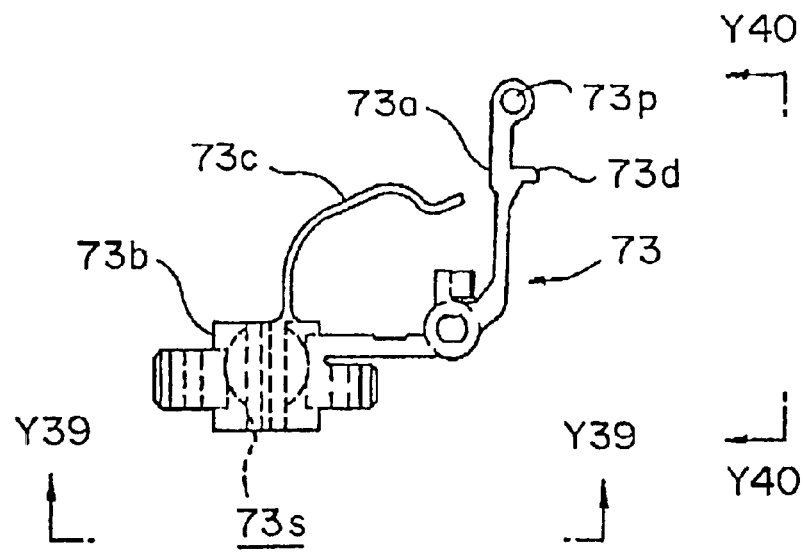
FIG. 38 is a plan view of a rocker lever of the drive mechanism.
Figure 39:
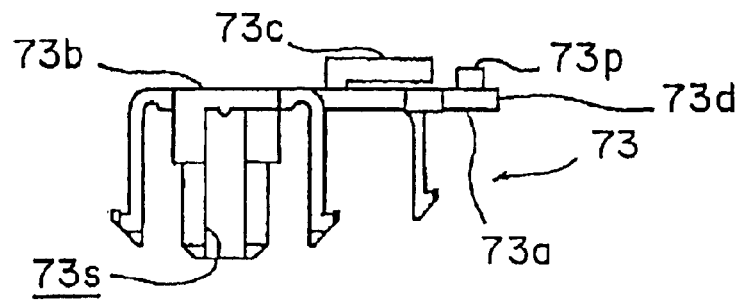
FIG. 39 is a side view of the rocker lever through line Y39—Y39 in FIG. 38.
Figure 40:
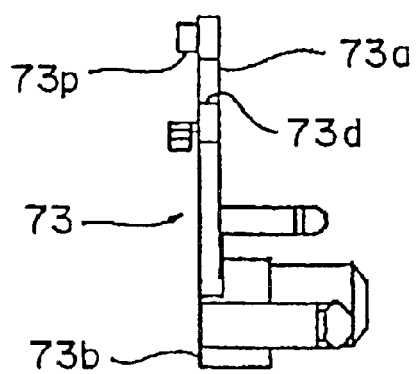
FIG. 40 is a side view of the rocker lever through line Y40—Y40 in FIG. 38.

As shown in detail in FIG. 38 to FIG. 40, the rocking lever 73 comprises a base 73b that is fit and fastened at the front of traverse base 20, a lever part 73a extending in a basic L shape from the base 73b, and a spring part 73c extending basically in an arc from the base 73b. A claw 73d for engaging the stop 71s of trigger lever 71, and a pin 73p protruding upward, are integrally molded to the lever part 73a. A guide slot 73s through which the regulating rod 75s of positioning rod 75 slides freely is also formed in the base 73b.

Figure 30:
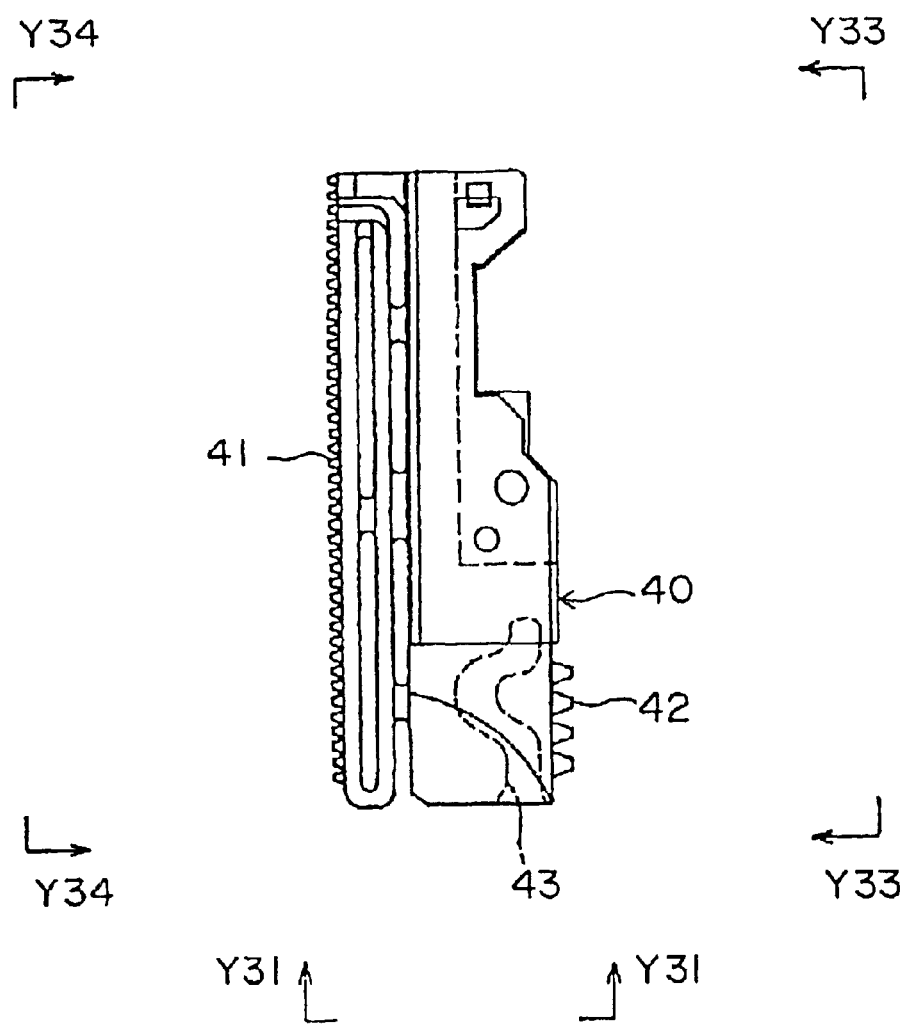
FIG. 30 is a plan view of the feed rack of the drive mechanism.
Figure 31:
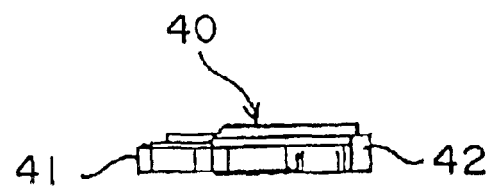
FIG. 31 is a side section view of the feed rack through line Y31—Y31 in Fig. 30.
Figure 32:
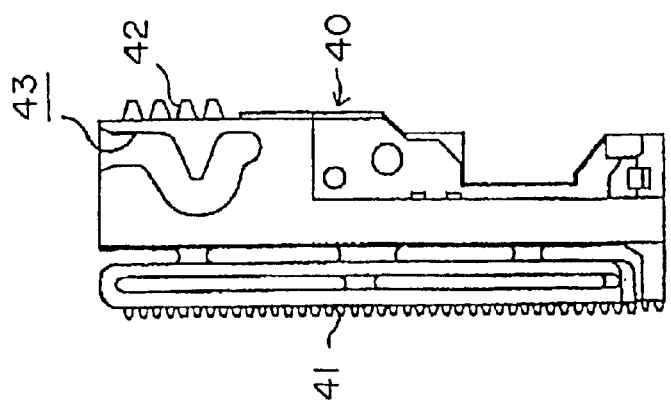
FIG. 32 is a back view of the feed rack.
Figure 33:
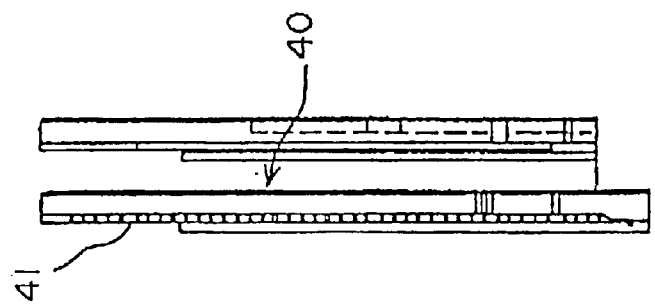
FIG. 33 is a section view of the feed rack through line Y33—Y33 in FIG. 30.
Figure 34:
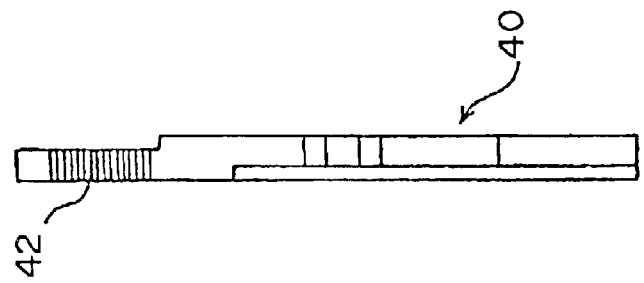
FIG. 34 is a section view of the feed rack through line Y34—Y34 in FIG. 30.

As will be known from FIG. 30 and FIG. 32, a cam channel 43 with a curved shape when seen in plan view is provided in the back of the feed rack 40. The front end of the cam channel 43 is open to the front of the feed rack 40. The pin 73p of rocking lever 73 is thus able to engage and slide freely through this cam channel 43.

A positioning mechanism for precisely maintaining engagement of the various components disposed to the drive base 10 and the traverse base 20 respectively, the intermediate base 80 and traverse base 20 is also provided on the drive base 10 and traverse base 20.

More specifically, a positioning member 75 (positioning rod) for positioning the traverse base 20 to the intermediate base 80 and engaging both bases 20, 80 as one body is disposed to the front of the traverse base 20.

Figure 41:
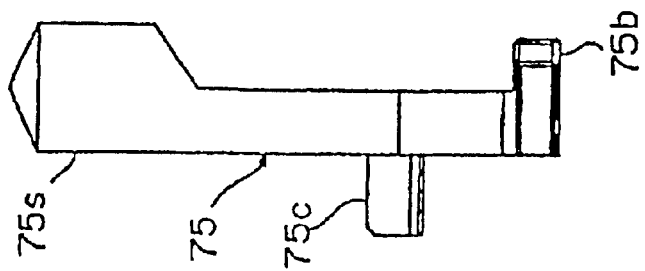
FIG. 41 is a side view of the rocker lever through line Y41—Y41 in FIG. 42.
Figure 42:
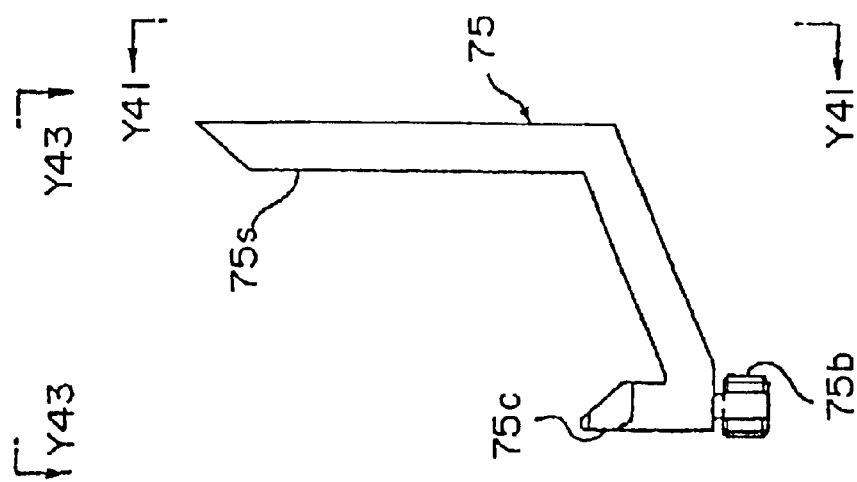
FIG. 42 is a plan view of the rocker lever of the drive mechanism.
Figure 43:
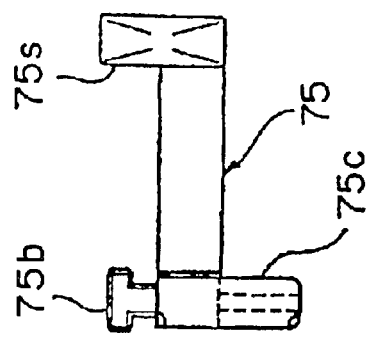
FIG. 43 is a side view of the rocker lever through line Y43—Y43 in FIG. 42.

As shown in detail in FIG. 41 to FIG. 43, this positioning rod 75 comprises an engaging base 75b for engaging and sliding freely front-back in the front-back guide channel 26 formed in the top of traverse base 20, extension 75c projecting forward from the engaging base 75b, and regulating rod 75s extending front-back (top-bottom as seen in FIG. 14 to FIG. 18) at a position offset to the right from the engaging base 75b and extension 75c.

As noted above, this regulating rod 75s is inserted through and slides freely front-back in the guide slot 73s formed in the base 73b of rocking lever 73. As described more fully below, after assembly the front of the extension 75c contacts spring part 73c of rocking lever 73 and is pushed thereby to the back. The back of the extension 75c can also contact the front of the feed rack 40 so that as the feed rack 40 moves to the front, the entire positioning rod 75 also moves to the front.

As shown in FIG. 14 to FIG. 18, a positioning hole 83 into which the regulating rod 75s of the positioning rod 75 can enter and fit is formed in the front end wall of the intermediate base 80. When the feed rack 40 moves further than a specific distance to the front, the front of the feed rack 40 contacts and pushes on the back of the extension 75c of positioning rod 75, causing the entire positioning rod 75 to advance with the engaging base 75b following the guide channel 26. This causes the regulating rod 75s to fit into the positioning hole 83 of the intermediate base 80, and thus engages the traverse base 20 to the intermediate base 80.

A cam channel 27 shaped like an arc when seen in plan view is also provided in the top at the front of the traverse base 20. An engaging protrusion 32p is also provided on the back of the hook 32 on cam gear 30. This engaging protrusion 32p engages the cam channel 27, and thus regulates the front-back position of the traverse base 20 to the drive base 10.

Furthermore, the vertical positioning between the front of the intermediate base 80 (therefore, of the traverse base 20) and the drive base 10 is accurately controlled by the protrusion 80P provided at the front of the intermediate base 80 engaging the cam channel 33 of cam gear 30.

The position of the front of traverse base 20 to the drive base 10 is thus accurately determined in three perpendicular directions through the intermediate base 80, that is, side to side, front to back, and vertically, and the components mounted on the drive base 10 and traverse base 20 can be accurately and reliably engaged with corresponding parts. It is therefore possible when switching the transfer path of second motor 4 drive power to accurately maintain linkage between the disk loading mechanism on the drive base 10 and the loading drive mechanism on the traverse base 20.

The disk drive 1 also has a clamping plate 95 with an assembled clamper 96 for clamping a disc 9 to the turntable 5 (see FIGS. 1, 2, 4, 22, and 23).

A claw 95d is formed at each of the plurality of mounting arms 95f (two are provided at front and back in this exemplary embodiment) disposed to right and left sides of the clamping plate 95. The clamping plate 95 is assembled to the drive base 10 by engaging these claws 95d with the sides of the drive base 10. By thus assembling the clamping plate 95 to the drive base 10, the center of the clamper 96 can be centered with the center of turntable 5 rotation.

The clamping plate 95 comprises right and left horizontal bases 95b for supporting mounting arms 95f on the same right and left sides, an annular center holder 95a for supporting the clamper 96, and a horizontal connector 95c for connecting the holder 95a to the bases 95b.

In the preferred embodiment, a notch 95e is formed on each side between the base of the holder 95a and the corresponding horizontal bases 95b. The width of each horizontal connector 95c is less than the width of the horizontal base 95b by an amount corresponding to the notch 95e. This gives the horizontal connectors 95c less rigidity than the horizontal bases 95b, and makes it easier for the horizontal connectors 95c to bend vertically. Therefor, when the disk drive 1 is dropped, for example, exposing the disk drive 1 to a large shock such that the turntable 5 contacts the clamping plate 95, the clamping plate 95 is able to easily flex in the vertical direction, thus absorb the force of impact, and therefore effectively prevent the turntable 5 (and spindle motor 3 linked to the turntable 5) from suffering major damage.

In the preferred embodiment, a disk clamping mechanism is employed so as to limit strictly an angle between a disk surface and the light beam, even if the there is deformation such as warpage and bending in the disk 9, by correcting them through a relatively simple constitution.

Figure 44A:
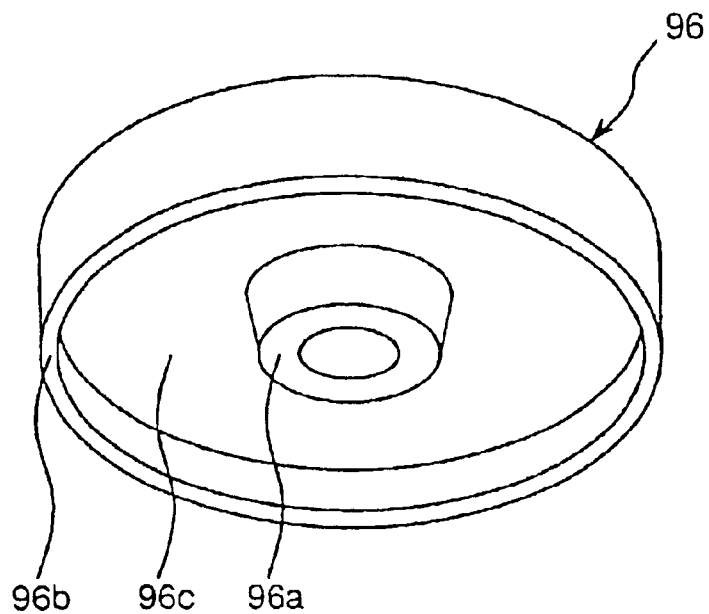
FIG. 44A is a schematic view of a clamper for explaining a basic principal of a disk clamping mechanism of the disk drive.
Figure 44B:
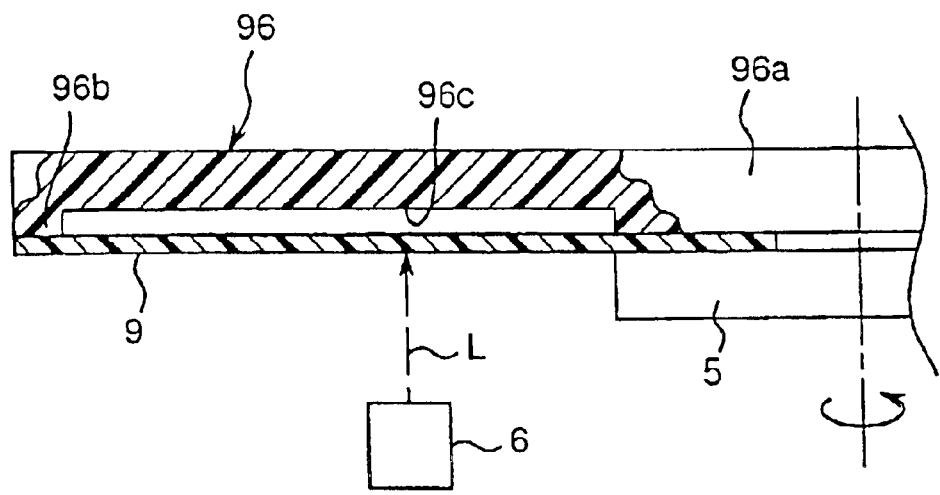
FIG. 44B is a partially sectional view showing a pinching and holding condition of the disk by the disk clamping mechanism.

FIGS. 44 to 47 schematically show a basic constitution and a principal of a disk clamping mechanism employed in the embodiment. As shown in FIG. 44, a clamper 96 is comprised of a central clamper portion 96a for pinching a proximity of an inner edge of a disk 9 with a turntable 5 for fixing the same and a large clamper portion 96b that is of substantially identical radius as that of a proximity of an outer edge of the disk 9 and that is of substantially identical height as that of the central clamper portion 96a, both members extending over the entire periphery. A concave portion 96c is formed to extend over the entire periphery between the central clamper portion 96a and the large clamper portion 96b of the clamper 96 so as not to contact the disk 9.

As shown in FIG. 45, the disk 9 is mounted onto the turntable 5 and the clamper 96 is attached thereafter. At this time, the central clamper portion 96a of the clamper 96 pinches the proximity of the inner edge of the disk 9 with the turntable 5 for fixing the same, and the large clamper portion 96b contacts the outer edge of the disk 9.

And, in case the outer edge side of the disk 9 is warped towards a direction opposite to a surface onto which the light beam is irradiated (in a direction of a so-called labeled surface) (see FIGS. 45A and 45B), the disk 9 is first made to abut against the large clamper portion 96b of the clamper 96 at the outer peripheral portion thereof, whereupon the disk 9 is pressurized by the central clamper portion 96a for pinching and fixing the same with the turntable 5.

Figure 45A:
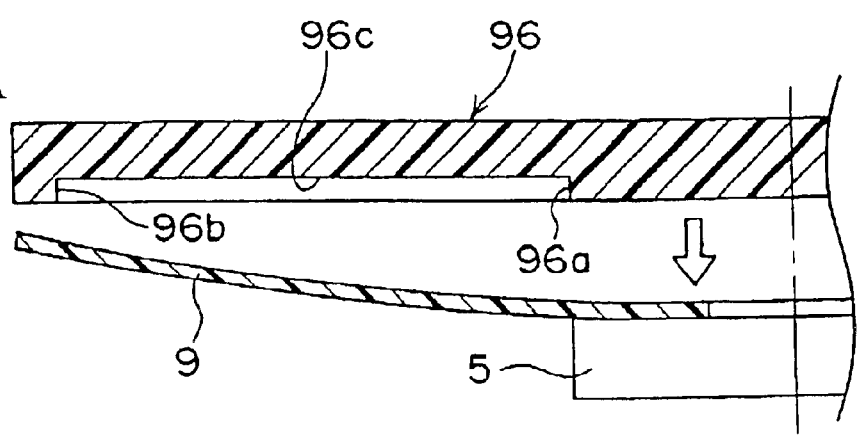
FIG. 45A is one of-partially enlarged sectional view in series showing a disk clamping operation of the clamper for explaining a basic principal of the disk clamping mechanism.
Figure 45B:
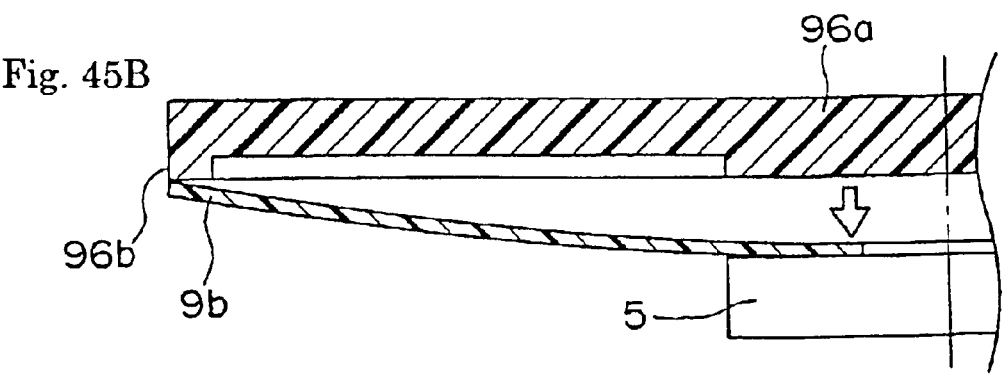
FIG. 45B is one partially enlarged sectional view in series showing a disk clamping operation of the clamper.
Figure 45C:
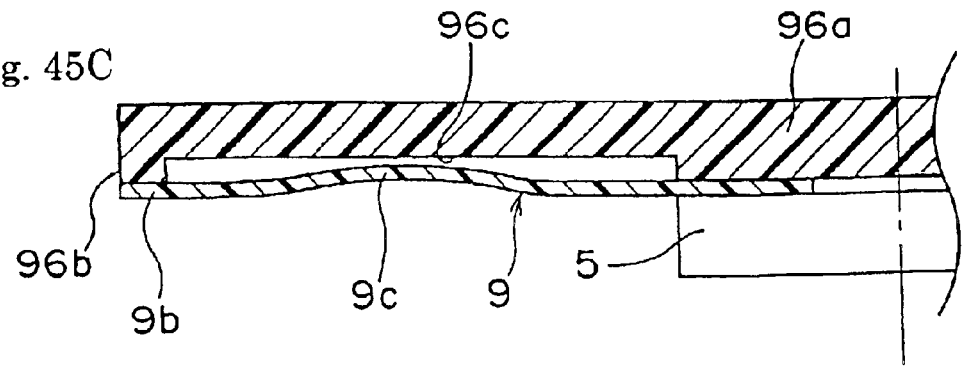
FIG. 45C is one partially enlarged sectional view in series showing a disk clamping operation of the clamper.

With this pinching and holding, the warped outer edge portion 9b of the disk 9 is pressurized in a direction opposite to the original warpage so that the warpage is corrected. While it may be that a central radial portion of the disk 9c (that is, a portion between the proximity of the inner edge portion 9a and the proximity of the outer edge portion 9b) remains warped in the direction of the original warpage as illustrated in FIG. 45C, it will be the concave portion 96c of the clamper 96 that opposes the central radial portion 9c so that the disk 9 will be prevented from contacting the concave portion 96c of the clamper portion 96.

In this manner, even if warpage in the direction of the labeled surface is present in the disk 9, the warpage may be reduced by attaching the clamper 96 that is comprised with the large clamper portion 96b so that an angle formed between the light beam of the pickup 6 and the disk surface will fall within the above-described defined value, and accurate recording and reproduction can be performed also with a pickup that does not include a tilt mechanism.

Figure 46A:
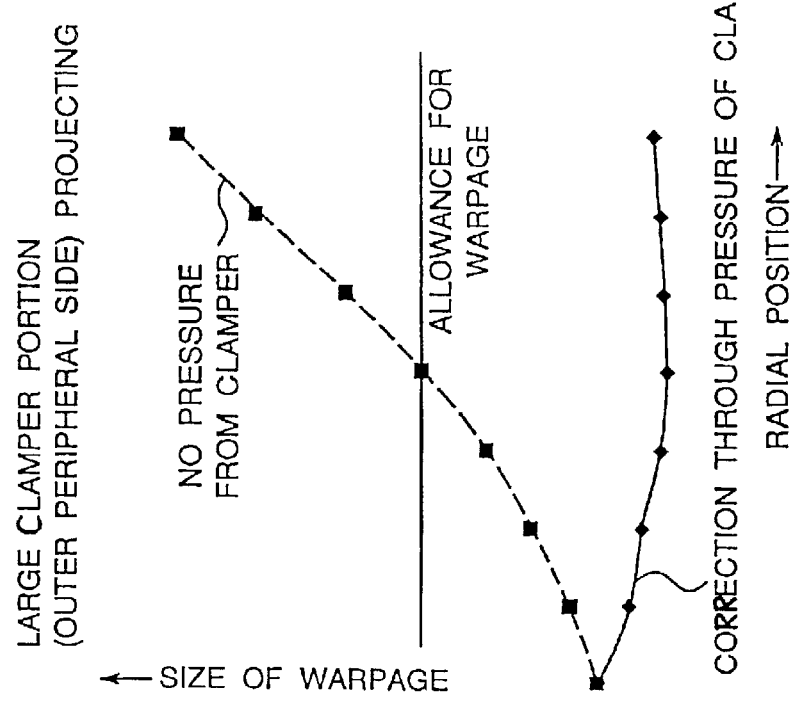
FIG. 46A is one graph for explaining results of correction of warpage in a disk through pressure of the clamper to the disk.
Figure 46B:
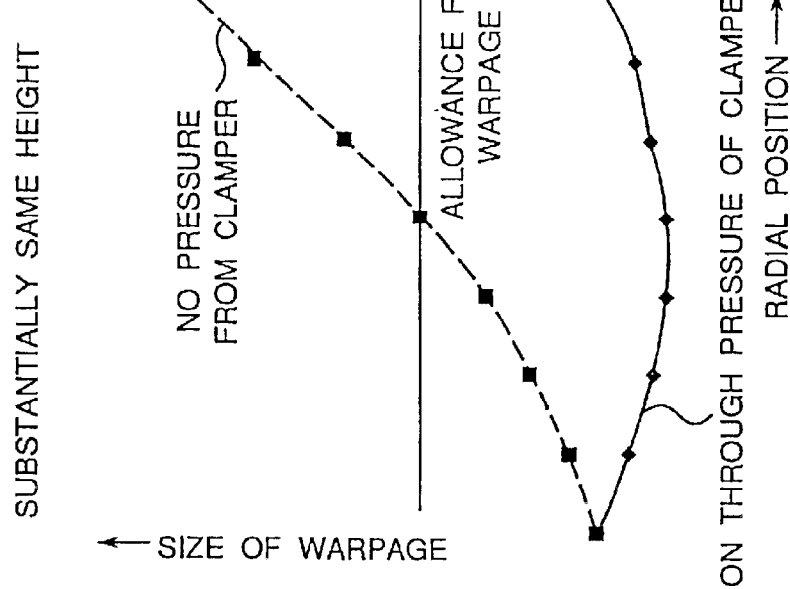
FIG. 46B is one graph for explaining results of correction of warpage in a disk through pressure of the clamper to the disk.

We have conducted tests to verify effects of correcting the disk warpage by the disk clamping mechanism employing the basic principal explained above. The test results are shown in FIG. 46. FIG. 46A illustrates characteristics of warpage of the disk in the case of the height positions of the central clamper and the large clamper being substantially identical, and FIG. 46B illustrates characteristics of warpage of the disk in case of the large clamper portion projecting further in height than the central clamper portion, wherein the lateral axis illustrates a radial directional distance from a center of the disk and the longitudinal axis illustrates a degree of the warpage. While it is obvious from both drawings that warpage has been corrected to be within the range of the defined value (the range of allowable value) for the warpage in contrast to conditions in which no pressurizing force is applied by the large clamper portion as illustrated by the chain lines, it can be understood that the warpage is smaller in case of FIG. 46B in which the large clamper portion is further projecting than the central clamper portion.

Clamper moving operations for moving the clamper 96 in a direction opposite to an upper surface of the turntable 5 unless the turntable 5 and the clamper 96 are in pinching and holding conditions will now be explained with reference to FIG. 47 that is schematic side and sectional views (wherein hatchings for indicating sections are omitted partially). The disk 9 that has been moved onto the turntable 5 by a tray 55 is mounted by the clamper 96. A protrusion 55a formed on the tray is provided for introducing the disk 9 to a position that is concentric with the turntable 5 and will be a hindrance formed on the tray.

Figure 47A:
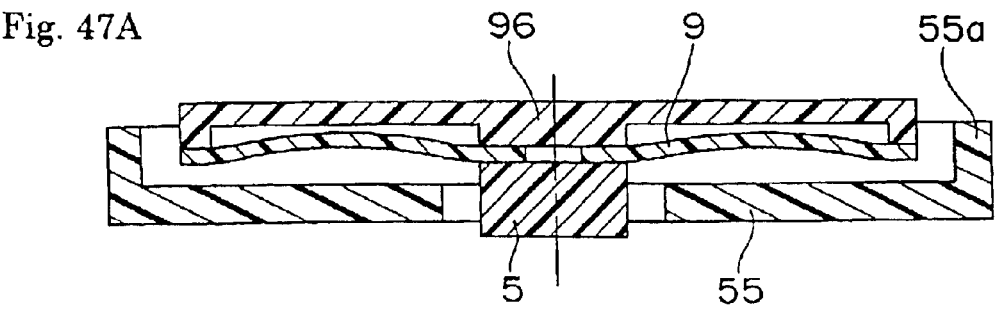
FIG. 47A is one sectional view in series showing a disk clamping operation of the clamper for explaining a basic principal of the disk clamping mechanism.
Figure 47B:
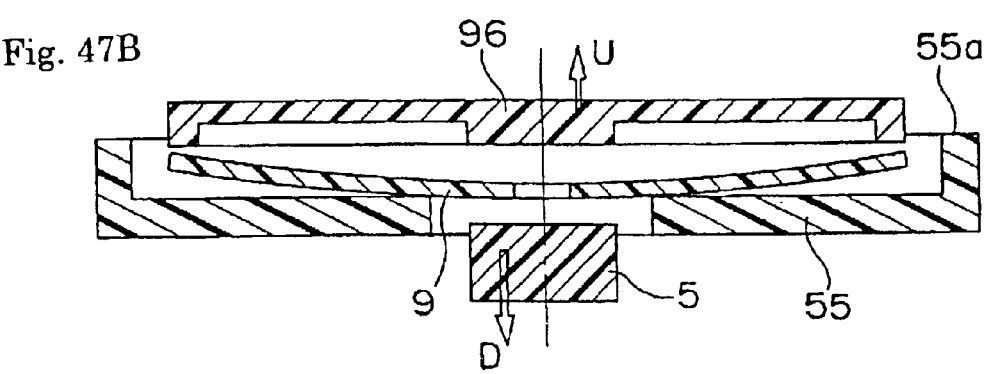
FIG. 47B is one sectional view in series showing a disk clamping operation of the clamper.

FIG. 47A illustrates a condition in which the disk 9 is pinched and held by the clamper 96 and the turntable 5 (similar to FIG. 45C). It can be understood that the disk 9 is pinched and held in a condition in which it is remote from the tray 55. Simultaneously with the movement of the turntable 5 in a direction as indicated by arrow D as illustrated in FIG. 47B, which is a direction opposite to the disk 9, the clamper 96 will move in a direction as indicated by arrow U in the drawing, that is a direction opposing the upper surface of the turntable (direction away from the turntable 5).

Figure 47C:
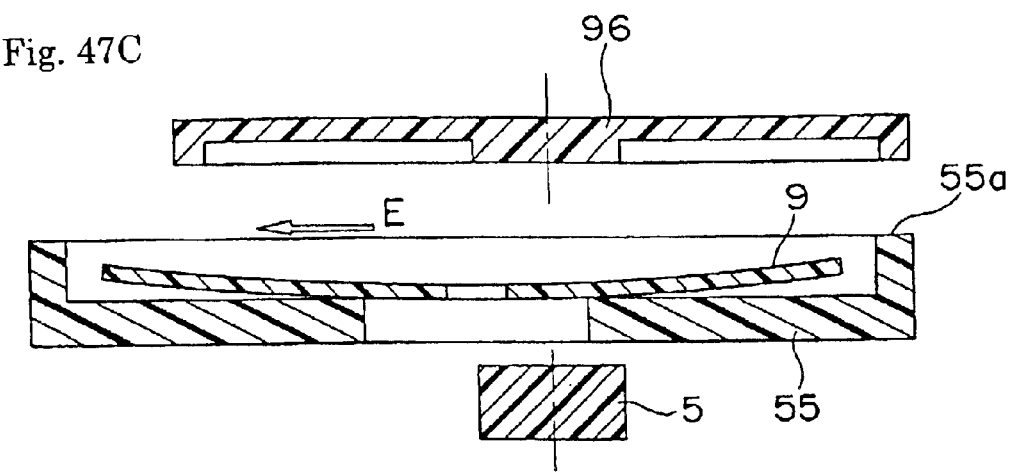
FIG. 47C is one sectional view in series showing a disk clamping operation of the clamper.

Owing to the movement of the clamper 96, it is possible to avoid a case in which movements of the tray 55 are hindered by the protrusion 55a of the tray 55 or any other hindrances when the tray moves (in a direction as indicated by arrow E in FIG. 47C).

As explained so far, the provision of a clamper for pressurizing an outer periphery of the disk from its labeled surface will reduce warpage of the disk 9 to enable stable driving for reproduction and also avoid hindrances preventing movements of the tray 55.

Figure 48:
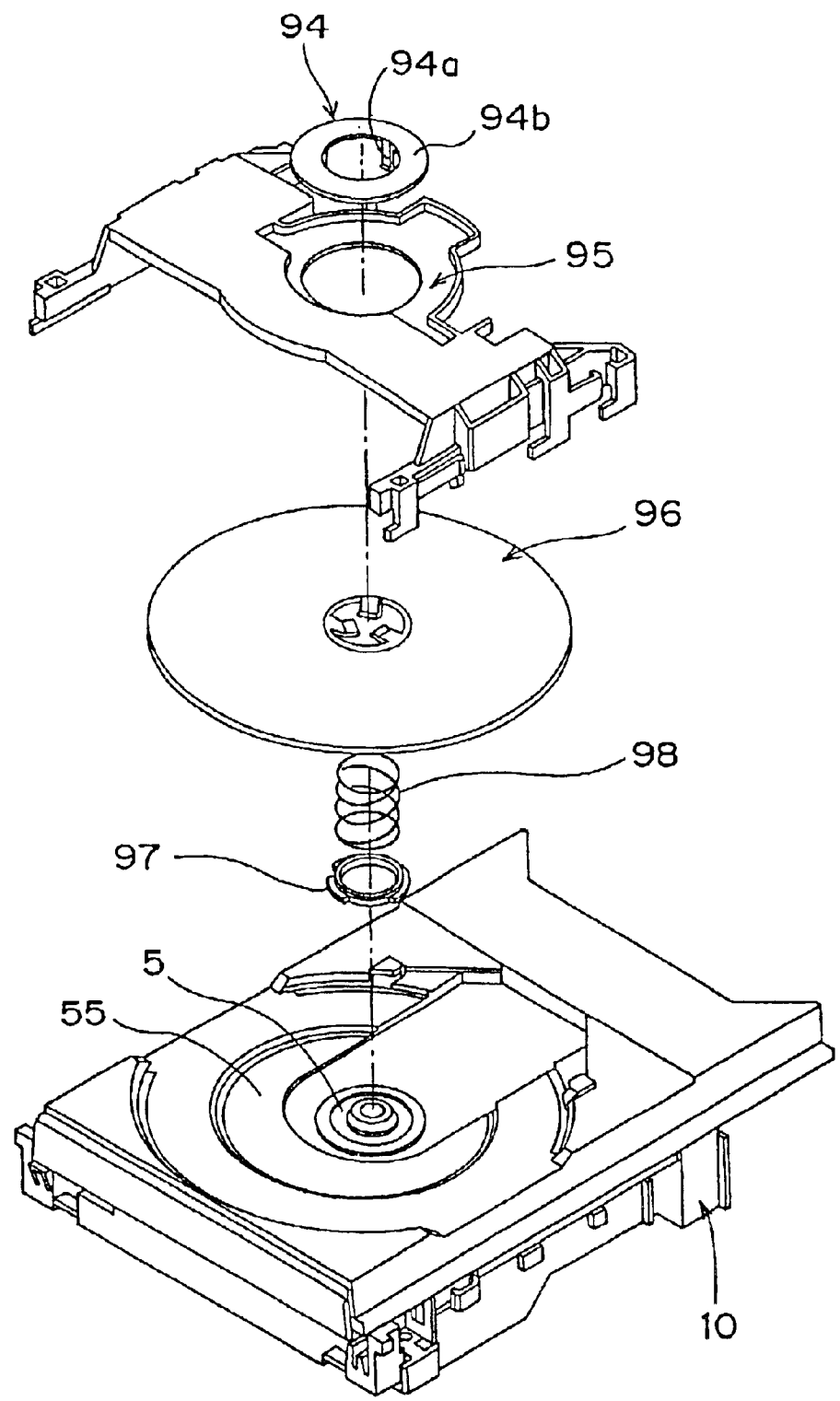
FIG. 48 is a perspective view showing a basic constitution of the disk clamping mechanism of the disk drive.
Figure 49A:
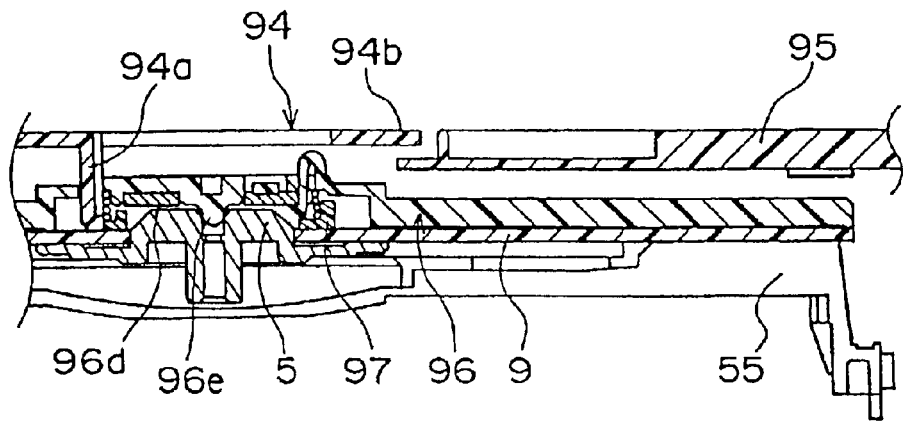
FIG. 49A is one partially enlarged sectional view in series showing a disk clamping operation of the clamper for explaining a basic principal of the disk clamping mechanism.

The disk drive according to the embodiment comprises a disk clamping mechanism applying the above-mentioned basic principal, and the concrete constitution will now be explained in details with reference to FIGS. 48 and 49. FIG. 48 is an overall perspective view of the disk clamping mechanism according to the present embodiment, and FIG. 49 is a partial sectional view showing the operation thereof, illustrating a condition in which the disk is being pinched and held (FIG. 49A) up to a condition immediately before starting moving through the tray (FIG. 49C).

In FIGS. 48 and 49, A clamper magnet 96d is arranged downward of the proximity of the inner radius of the clamper 96 to oppose a tip end of the turntable that is made of ferromagnetic material such as iron. A taper center portion 96e is provided in the center of the clamper 96 for achieving centering of the turntable 5 and the clamper 96 by being inserted into a central hole of the turntable 5. It should be noted that centering of the disk 9 and the turntable 5 is achieved in a conventional manner in that the inner radial portion of the disk 9 is held by a taper stepped portion of the turntable 5.

A spring hook 94 with a hook portion 94a projecting from its inner radial portion is arranged in the center of a clamp plate 95. The hook portion 94a pierces through a clamp plate 95 in a freely rotating and moving-with-play arrangement. Also, the hook portion 94a pierces through the clamper 96 under the clamp plate 95 and engages the spring hook 94 with the clamper 96 through a spring 98. With this arrangement, the clamper 96 abutting against the disk and pressurizing the same will be urged by the spring member 98 in an upward direction above the spring hook 94 engaged at the inner radial hook portion 94a.

In this manner, the clamper 96, the spring 98, the spring holder 97, and the clamp plate 95 supporting the spring hook 94 will be fixed to a main body of the disk drive (drive base) 10 for holding the turntable 5 and for mounting the tray 55 thereon in a freely sliding manner.

Operations of the thus arranged optical disk driving device according to an embodiment 2 will now be explained. In FIG. 49, FIG. 49A illustrates a condition in which the disk 9 mounted on the lifted turntable 5 is being fixed by being pinched and held by the clamper 96, similarly to a condition as illustrated in the above-described embodiment 1. Since suction force generated between the clamper magnet 96d of the clamper inner radial portion and the turntable 5 is larger than the upwardly directed urging force as generated by the spring 95, the clamper 96 pressurizes the disk 9 that is mounted on the turntable 5 over its entire surface. Moreover, since the turntable 5 is lifted, the spring holder 97 and the hook portion 94a are also lifted with the proximity of the inner radius of the disk being pinched between so that the spring hook 94 is remote from the clamp plate 95 to be freely rotating.

Figure 49B:
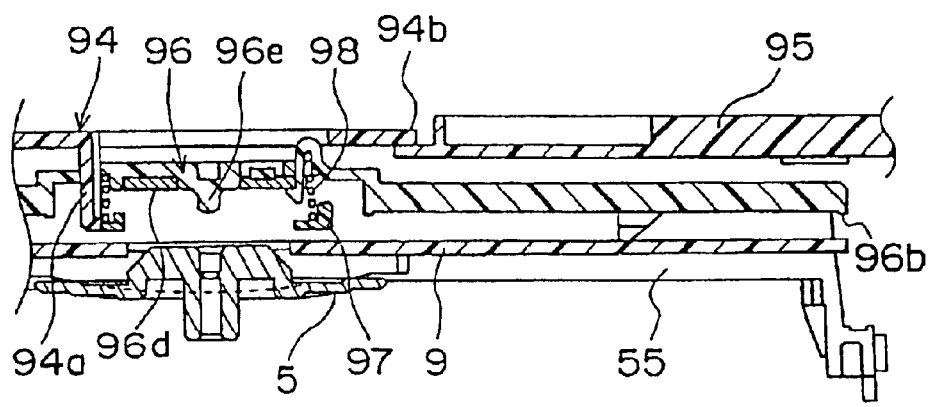
FIG. 49B is one partially enlarged sectional view in series showing a disk clamping operation of the clamper.
Figure 49C:
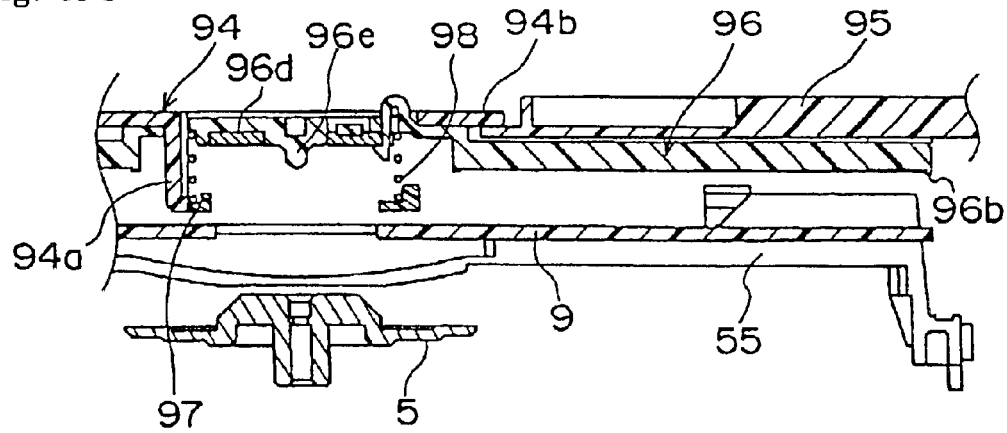
FIG. 49C is one partially enlarged sectional view in series showing a disk clamping operation of the clamper.

Next, by the downward movement of the turntable 5 in a direction opposite to the disk 9 (direction it separated from the disk 9) as illustrated in FIG. 49B, the disk 9 is separated from the turntable 5 and mounted onto the tray 55. The spring holder 97 and the hook 94 that are now remote from the turntable 5 and are no more supported thereby will suspend through suction force between the clamper magnet 96d and the turntable 5 as well as their own weights, while a brim portion 94b provided on an upper portion of the spring hook 94 will engage at the clamp plate 95 to thereby support the spring holder 97 and the spring hook 94 by the clamp plate 95. Furthermore, upon descending of the turntable 5, the magnetic suction force between the separated turntable 5 and the clamper magnet 96d will reduce such that repulsive force of the spring member 98 overcomes this force, and the clamper 96 will be urged in the upward direction to thereby separate the clamper 96 from the disk 9 located on the tray 55.

As illustrated in FIG. 49C, after the turntable 5 moves in a direction as to further separate from the disk 9 and the distance between the clamper 96 and the tray 55 as well as the distance between the tray 55 and the turntable 5 are sufficient, the tray 55 will move in a sliding manner in a forward direction (vertical direction with respect to the sheet of paper on which the drawing is illustrated) with the disk 9 remaining mounted thereon to eject the disk 9.

When mounting the disk 9 on the turntable 5 by performing the above-described operations in an opposite order, the tray 55 similarly moves in a sliding manner in a condition in which it is sufficiently remote from the clamper 96 and the turntable 5 as illustrated in FIG. 49C. When the disk 9 is moved to the proper position upward of the turntable 5, the sliding movement of the tray 55 is terminated and the turntable 5 starts lifting. Accompanying the lifting of the turntable 5, the spring hook 94 will be lifted with the proximity of the inner radial portion of the disk being pinched between to thereby disengage the spring hook 94 and the clamp plate 95. When the suction force between the turntable 5 and the clamper magnet 96d overcomes the upwardly directed urging force of the spring member 98, the clamper 96 will be sucked in a downward direction for pressurizing the disk 9.

As explained so far, according to the present embodiment, though the optical disk driving device comprises a clamper of large diameter, the employment of the spring member enables the clamper 96 of large diameter for pressurizing the disk when approaching the turntable to automatically separate from the disk when the turntable is descending, and prevents movements of the tray 55 from being hindered by the projection 55a or other hindrances when the tray performs sliding movements for ejecting the disk.

That is, according to the embodiment, it is possible to achieve a superior effect of correcting warpage by abutting and pressurizing a proximity of an outer periphery of a disk on which no information is recorded, of restricting an angle between an information recording surface of the disk and the light beam that is irradiated for recording and reproducing information to be within a specified value, and of precisely reading information for accurately performing recording and reproduction. By the provision of a means for moving a clamper of large diameter for abutting and pressuring an outer periphery of a disk, it is possible to achieve an effect of enabling movements without hindering a tray.

It is to be noted that the suction force between the clamper 96 and the turntable 5 must be set greater than the spring force by the spring 98 because the suction force and the spring force act in directions, when the disk 9 is pinched and held.

Figure 50A:
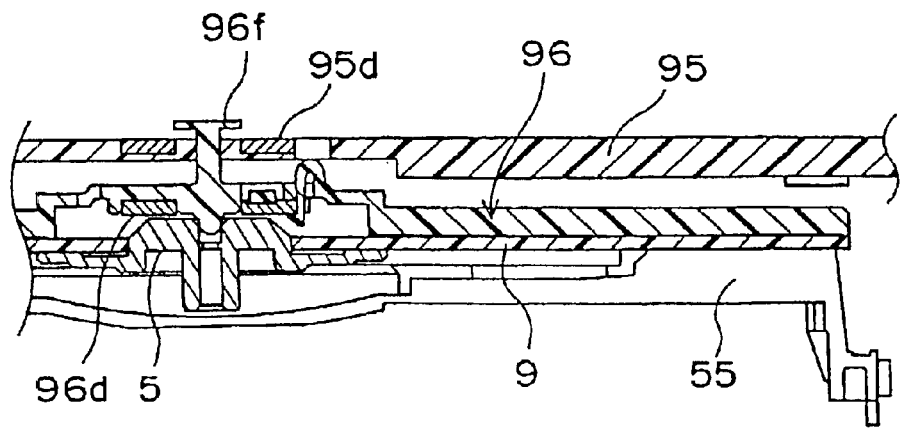
FIG. 50A is one partially enlarged sectional view in series showing a disk clamping operation of the clamper in a modified embodiment of the disk clamping mechanism.

Next, a modified embodiment of the above disk clamping mechanism will now be explained in details with reference to FIG. 50. FIG. 50 is a partial sectional side view for explaining operations of an optical disk driving device according to Embodiment 3 of the present invention.

In FIG. 50, as for the clamper 96, the arrangement for pressurizing the entire surface of the disk is identical to that of the above described one while this arrangement does not maintain a spring member but retraction of the tray at the time of sliding movements is performed through suction provided through magnetic force between the clamper and the clamp plate 95 that is held with play. More particularly, a second magnet 95d is provided on the clamp plate 95, and the turntable 5, a first magnet 96d and the second magnet 95d are arranged to be aligned on a substantially concentric axis such that the first magnet 96d of the clamper 96 is sucked by the turntable 5 or the second magnet 95d.

Figure 50B:
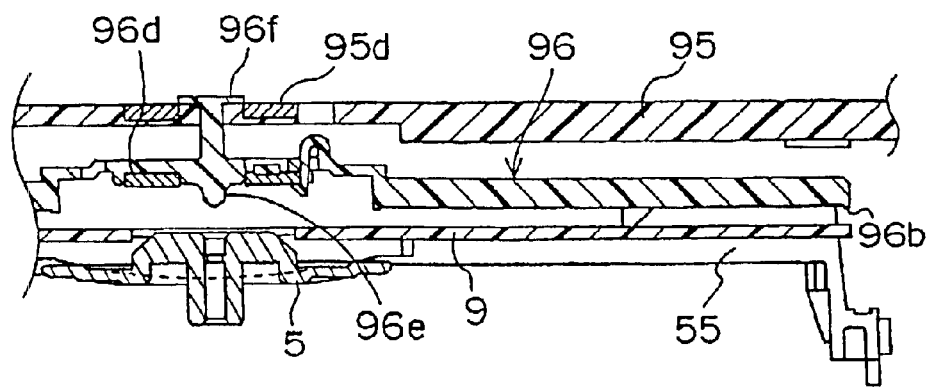
FIG. 50B is one sectional view in series showing a disk clamping operation of the clamper.
Figure 50C:
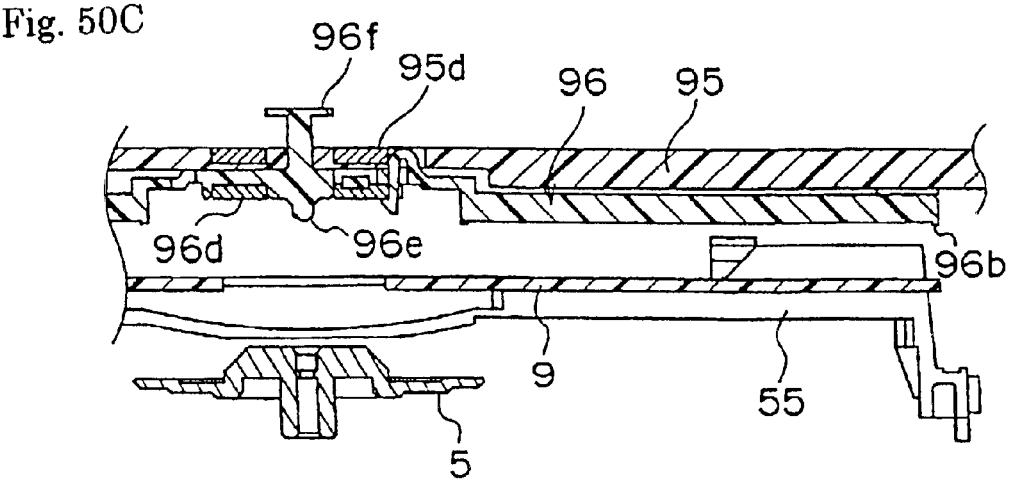
FIG. 50C is one sectional view in series showing a disk clamping operation of the clamper.

Operations of the thus arranged optical disk driving device will now be explained with reference to FIG. 50. In FIG. 50, the disk 9 that is mounted on the turntable 5 is fixed, as illustrated in the above-described embodiment 1, by being pinched and held by the clamper 96 that is sucked by the turntable 5 as described above. The turntable 5 then moves in a direction in which it separates from the clamp plate 95 (downward direction in the drawing) to mount the disk 9 on the tray 55. Upon movement of the turntable 5 and the disk 9, the clamper 96, which is engaged at brim portion 96f, will be supported by the clamp plate 95 with play (FIG. 50B) through suction force with the turntable or through its own weight as explained with reference to the prior art. When the turntable 5 further moves and the suction force of the first magnet 96d with the turntable 5 is overcome by the suction force with the second magnet 95d, the clamper 96 is lifted through mutually pulling magnetic force between the first magnet and the second magnet (FIG. 50C).

It should be noted that both of the first magnet and the second magnet do not need to be comprised by magnets, and either one may be a metal member. However, as explained with reference to the prior art, such an arrangement will be realized when magnets and metal members are adjoining in the turntable 5, the first magnet, and the second magnet, since magnetic force is also utilized for pinching and holding through the clamper and the turntable. The suction force between the turntable and the first magnet needs to be larger than the pulling force between the first magnet and the second magnet in order to pinch and hold the disk.

The operation of a disk drive 1 thus comprised is described next below.

When a disc 9 is loaded into the disk drive 1 and a signal recorded to the disc 9 is being reproduced by the optical pickup 6 (see FIG. 9), the intermediate base 80 and the traverse base 20 are supported substantially parallel to the drive base 10 as shown in FIG. 6, by means of the protrusion 80P at the front edge of the intermediate base 80 fitted into the top horizontal channel 33a of the cam channel 33 in cam gear 30.

Figure 14:
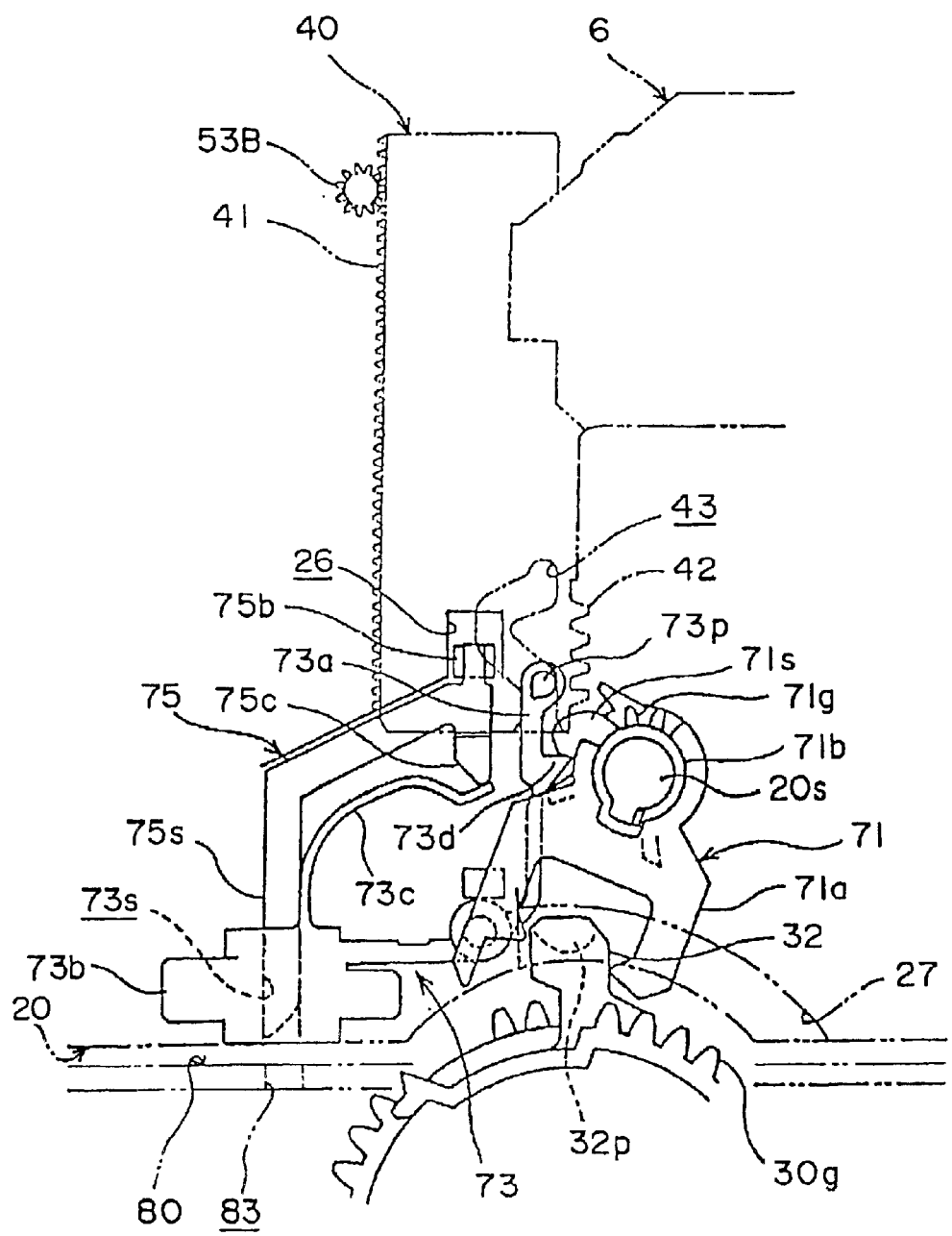
FIG. 14 is a sequence of enlarged plan views showing the drive power transfer path switching operation of the drive mechanism in above optical disk drive.

The stop 71s of the trigger lever 71 is engaged with the claw 73d of rocking lever 73, and the engaging arm 71a engages the hook 32 of cam gear 30, at this time as shown in FIG. 14. When thus engaged, the trigger lever 71 is turned all the way clockwise in FIG. 9 and FIG. 14.

To read a signal from the disc 9 in this position, the spindle motor 3 is driven to spin the turntable 5 on which the disc 9 is loaded at a specific speed, the optical pickup 6 is moved to a position below the signal track to be reproduced, and the optical elements (that is, the optical system including a laser and lens) of the optical pickup 6 are operated to read the desired signal from the disc 9.

If the signal track to be reproduced is not above the current optical pickup 6 position, or if signals are to be read from some plurality of signal tracks, the optical pickup 6 must be moved appropriately toward the inside circumference of the disc 9, that is, toward the front of the disk drive 1, or the outside circumference of the disc 9, that is, toward the back of the disk drive 1.

The optical pickup 6 is moved by means of the optical pickup drive mechanism. As described above, the second motor 4 is therefore driven and the motor gear 4G turns. Rotation of the motor gear 4G is speed reduced at a specific speed reducing ratio and transferred to the output side by the rack drive gear set 51, thereby causing the final output gear 53B (second traverse output gear) to turn at a reduced speed and moving the feed rack 40 and the optical pickup 6 linked thereto front or back. If the motor gear 4G turns counterclockwise in FIG. 9 to FIG. 13, the optical pickup 6 moves forward (downward in FIG. 9 to FIG. 13) toward the inside circumference of the disc 9. If the motor gear 4G turns in the opposite direction, the optical pickup 6 moves to the back (upward in FIG. 9 to FIG. 13) toward the outside circumference of the disc 9.

It should be noted that the loading drive gear set 61 also turns in conjunction with second motor 4 operation during this signal reproduction mode, but the teeth of the third loading gear 64, that is, the final output gear of the gear set 61, are positioned at the smooth part 34 of the cam gear 30 and thus do not engage the cam gear teeth 30g. Drive power from the second motor 4 is therefore not transferred to the cam gear 30, and hence to the tray drive gear 56, in this signal reproduction mode.

Figure 10:
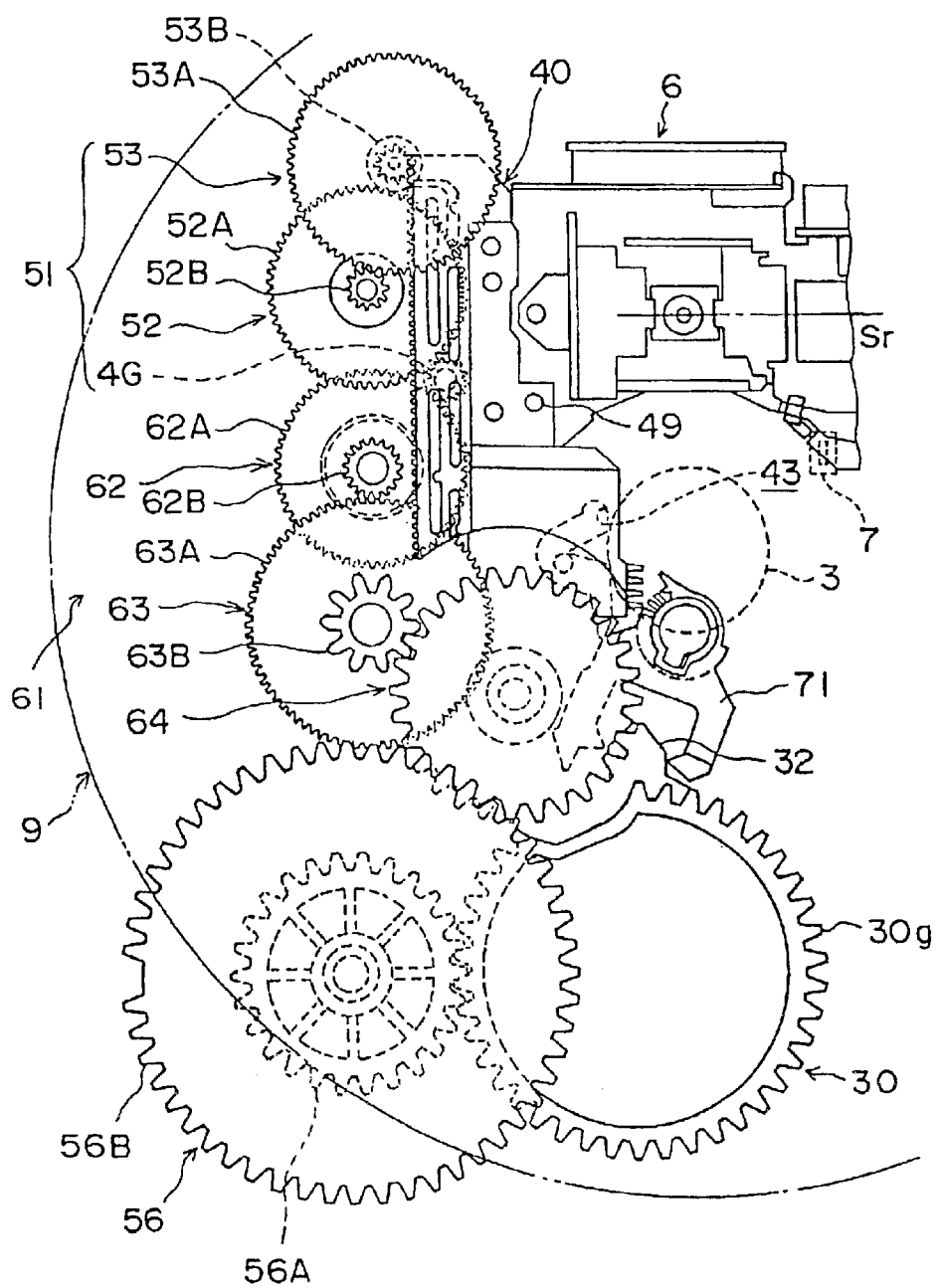
FIG. 10 is one plan view showing the operation of the drive mechanism.
Figure 15:
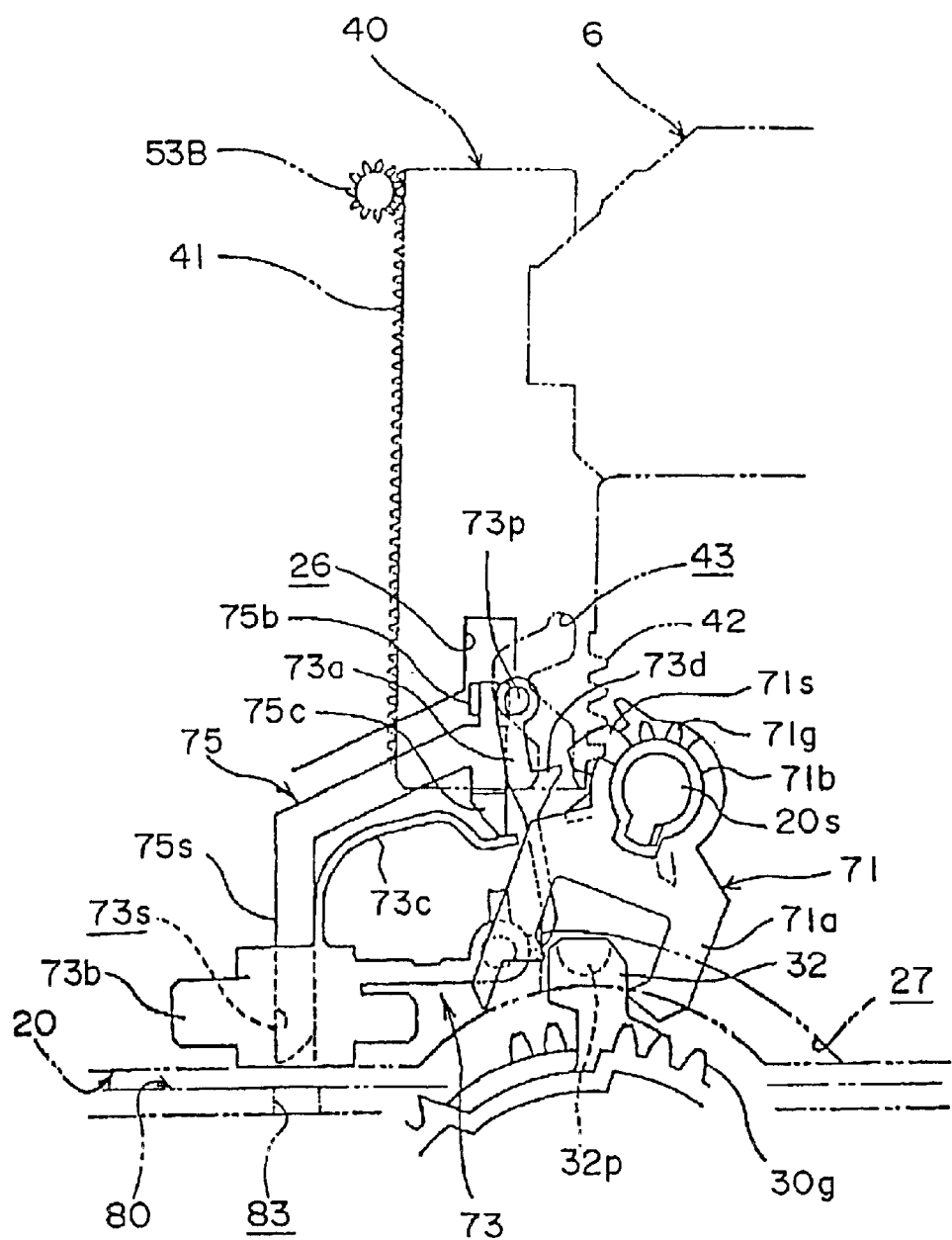
FIG. 15 is a sequence of enlarged plan views showing the drive power transfer path switching operation of the drive mechanism in the optical disk drive.

FIG. 10 and FIG. 15 show the drive train when positioned for reading a signal recorded to the most inside circumference part of the recording position range (data signal recording area) of the disc 9. When positioned to read from this disc area, the optical pickup 6 is moved forward by the optical pickup drive mechanism to the inside circumference edge Sr of the data signal recording area of the disc 9, and the back end of the driven rack part 41 of the feed rack 40 is engaged with the final output gear 53B (second traverse output gear) of the rack drive gear set 51. The power transfer path switching rack 42 is also extremely close to the partial gear 71g of trigger lever 71.

The data signal recording area of an optical disc 9 is known from the literature to be determined by the distance from the disc center based on the disk format standard. A conventional disk drive also has an optical pickup position detector disposed at a position corresponding to the most inside circumference position of the data signal recording area to detect whether the optical pickup is at this most inside circumference position or has moved thereto so that the optical pickup can be prevented from moving beyond this point further towards the inside circumference of the disc.

In contrast to this conventional design, a disk drive 1 according to this preferred embodiment has an inside circumference detection switch 7 disposed at the inside circumference edge Sr of the data signal recording area of the disc 9, and uses the inside circumference edge Sr as an inside circumference edge switching position. When off, this inside circumference detection switch 7 operates the same as in a conventional optical disk drive to detect whether the optical pickup is at this most inside circumference position or has moved thereto. What differs from the conventional disk drive is that when the inside circumference detection switch 7 is on, movement of the optical pickup 6 beyond the inside circumference edge Sr is not limited when the optical pickup 6 trips the inside circumference detection switch 7, and the optical pickup 6 can therefore be purposely moved further to the inside circumference of the disc 9.

The inside circumference detection switch 7 operates mechanically in the same manner as a common conventional detector, and is disposed to project and retract vertically to the top of the traverse base 20. When the optical pickup 6 reaches a position above the inside circumference detection switch 7, the bottom of the optical pickup 6 interferes with the switch 7, causing the inside circumference detection switch 7 to be pushed into the traverse base 20 in resistance to the pressure of a switch spring (not shown in the figure). It should be noted that this inside circumference detection switch 7 shall not be limited to a mechanical device such as described above, and can alternatively be a non-contact detector or any of various other known designs.

Figure 11:
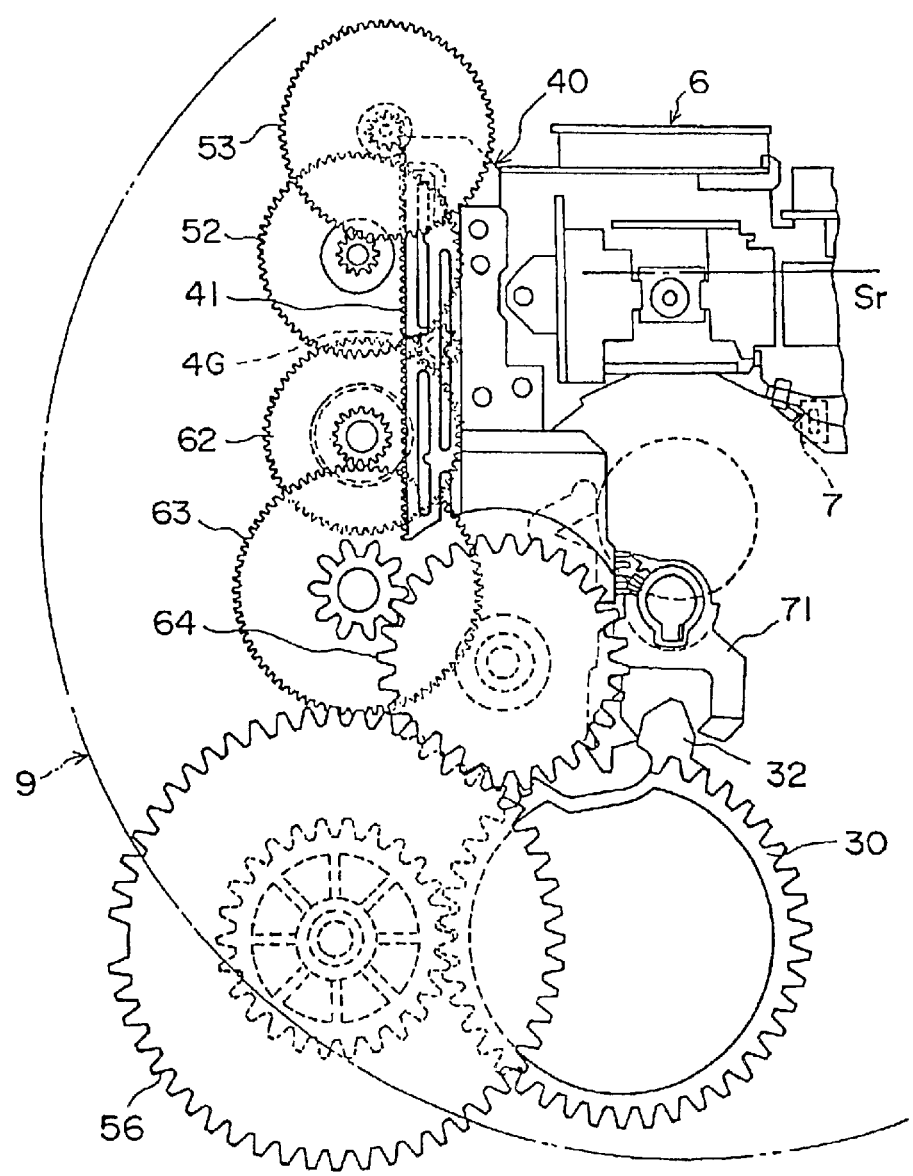
FIG. 11 is one plan view showing the operation of the drive mechanism.
Figure 16:
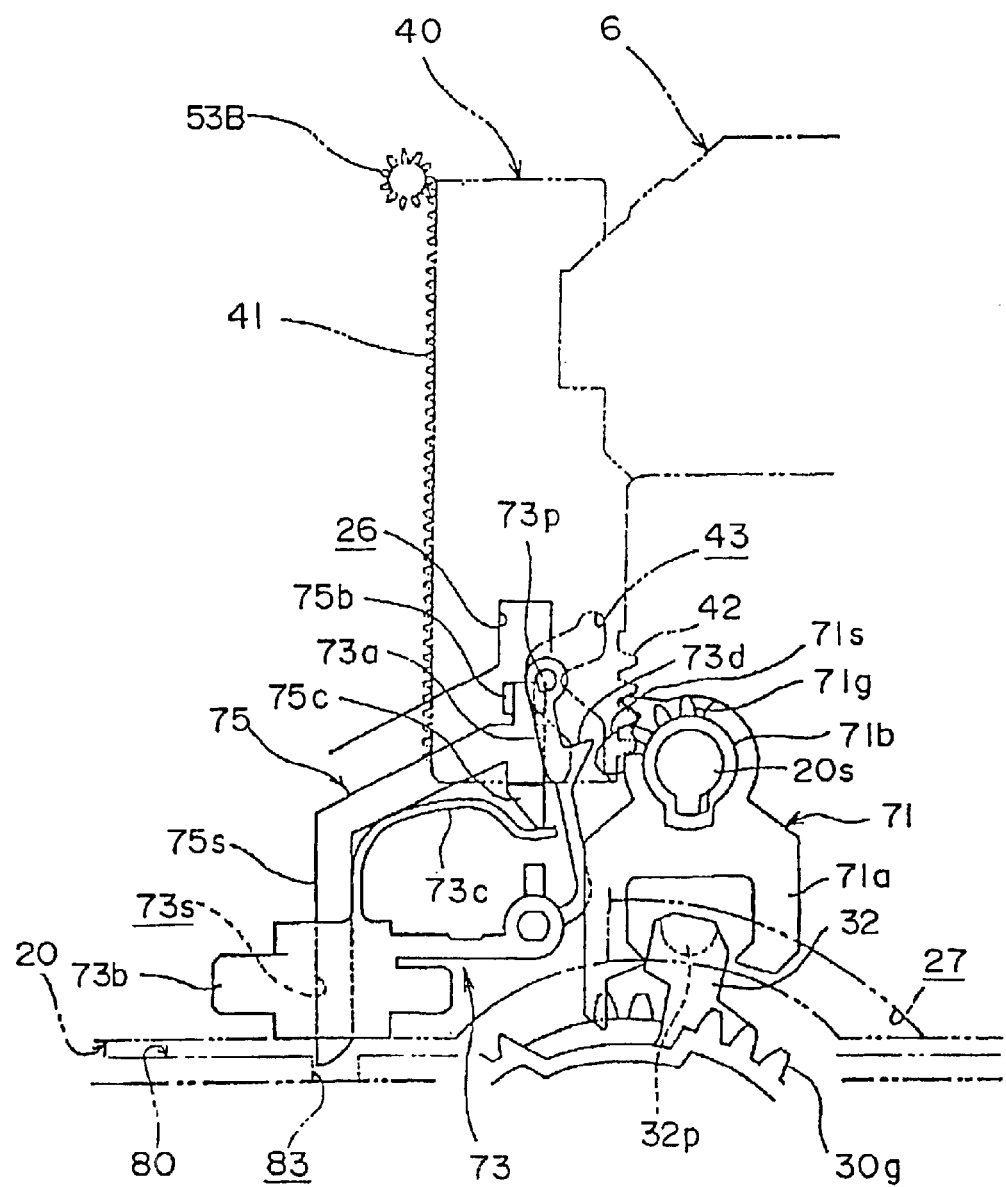
FIG. 16 is a sequence of enlarged plan views showing the drive power transfer path switching operation of the drive mechanism in the optical disk drive.

FIG. 11 and FIG. 16 show the optical pickup 6 after it has moved to the inside circumference edge Sr, operated the inside circumference detection switch 7, and then moved beyond this position farther to the inside circumference of the disc 9.

The differences between the state shown in FIGS. 10 and 15 and the state shown in FIGS. 11 and 16, as well as the movement to these states, are described next below.

The optical pickup 6 is moved from the state shown in FIGS. 10 and 15 to the state shown in FIGS. 11 and 16 by continuing to drive the second motor 4 in the same direction (clockwise in this case) from the state shown in FIGS. 10 and 15 after the optical pickup 6 operates the on-state inside circumference detection switch 7.

By thus moving the optical pickup 6 further to the inside circumference, the power transfer path switching rack 42 of the feed rack 40 moving the optical pickup 6 front-back engages the partial gear 71g of trigger lever 71, and turns the trigger lever 71 clockwise. In conjunction with this the engaging arm 71a of trigger lever 71 turns the hook 32 of cam gear 30 clockwise.

The cam gear 30 thus turns clockwise, and the cam gear teeth 30g begin to engage the final output gear 64 (third loading gear) of the loading drive gear set 61. The driven rack part 41 of the feed rack 40 is still engaged with the final output gear 53B (second traverse output gear) of the rack drive gear set 51 at this time.

The rocking lever 73 engaged with the stop 71s of the trigger lever 71 to position and hold the trigger lever 71 also turns as a result of the rocking lever pin 73p following the cam channel 43 of feed rack 40. As a result, the claw 73d releases the trigger lever 71.

Figure 12:
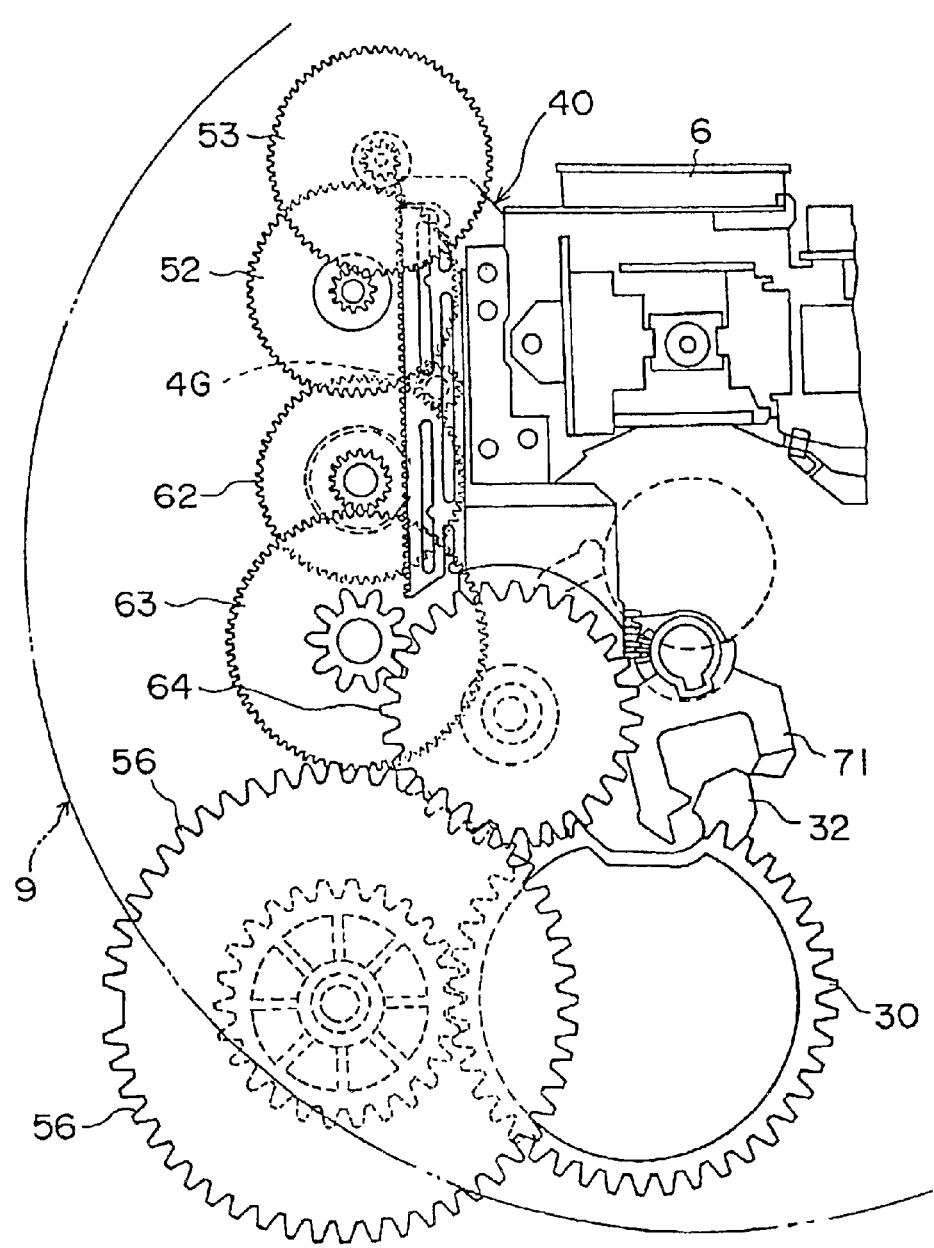
FIG. 12 is one plan view showing the operation of the drive mechanism.
Figure 17:
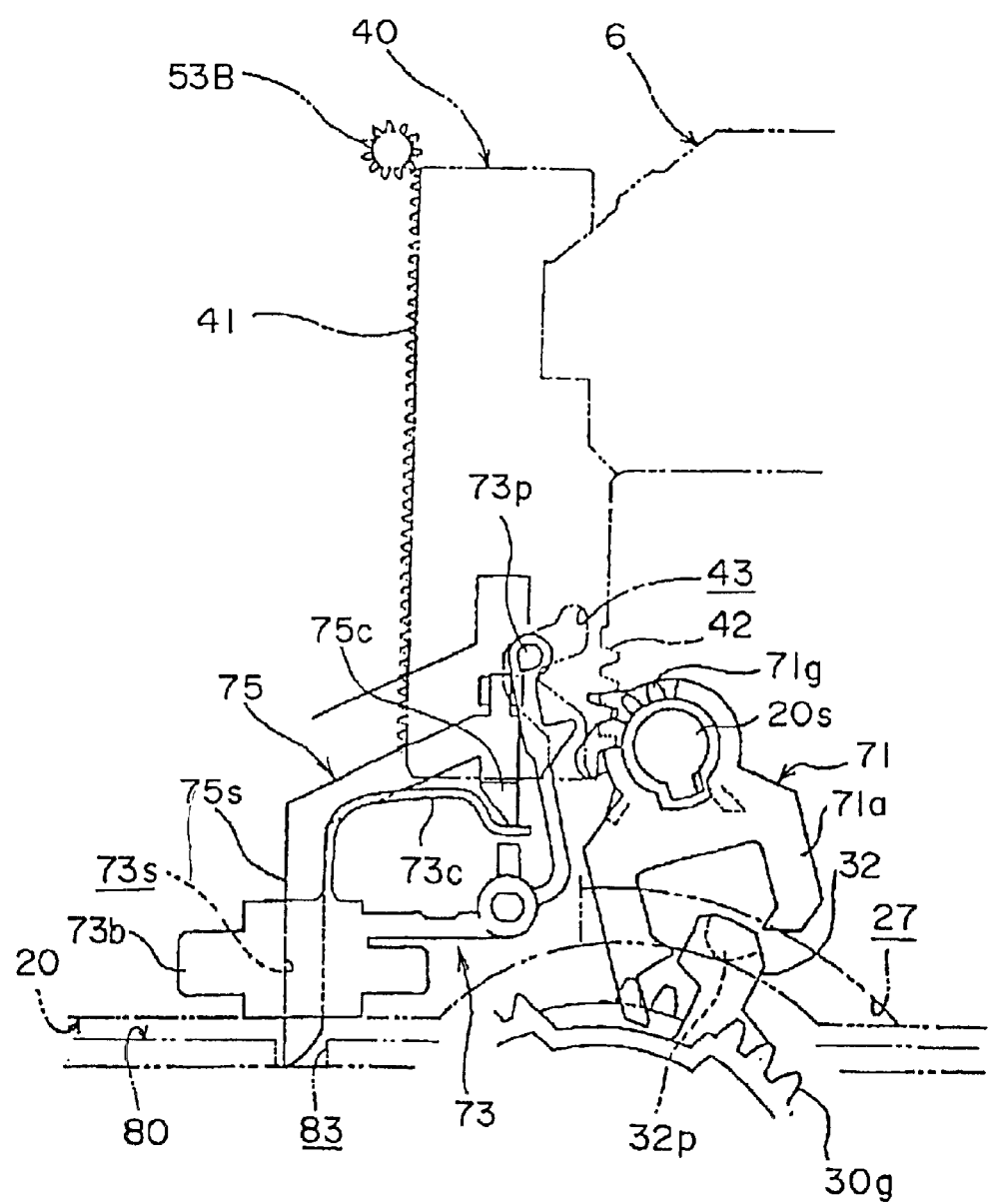
FIG. 17 is a sequence of enlarged plan views showing the drive power transfer path switching operation of the drive mechanism in the optical disk drive.

FIG. 12 and FIG. 17 show the state in which the cam gear 30 is turned clockwise by drive power from the third loading gear 64 from where the cam gear 30 begins to engage the final output gear 64 (third loading gear) of the loading drive gear set 61.

This operation is also accomplished by the motor gear 4G of second motor 4 turning clockwise, that is, in the same direction in which the motor gear 4G turns to move the optical pickup 6 to the inside circumference.

This operation of the cam gear 30 turns the trigger lever 71 counterclockwise to a position limited by the cam gear 30, thus drawing the optical pickup 6 to a further inside circumference position (forward position) until the driven rack part 41 of the feed rack 40 disengages the second traverse output gear 53B. As a result, further clockwise rotation of the motor gear 4G, and hence drive power from the second motor 4, is not transferred to the feed rack 40, that is, to optical pickup 6 movement.

The pin 73p of rocking lever 73 is guided along the cam channel 43 of feed rack 40 to enter the inclined part of the cam channel 43 at this time, and is thus turned clockwise by the spring tension of the rocking lever 73. The trigger lever 71 continues to be turned counterclockwise until it completely separates from the cam gear 30.

It should be noted that basically the trigger lever 71, rocking lever 73, and cam gear 30 (or more specifically the hook 32 and smooth part 34 of the cam gear 30), as well as more specifically the power transfer path switching rack 42 and cam channel 43 of the feed rack 40, combine to form a power transfer path switching mechanism for switching the transfer path of second motor 4 drive power. This power transfer path switching mechanism corresponds to the power transfer path switching mechanism of the accompanying claims.

As described above, the feed rack 40 can move the optical pickup 6 to an inside circumference edge Sr position at the inside circumference limit of the data signal recording area of the disc 9, and can then continue moving the optical pickup 6 beyond this position closer to the inside circumference of the disc 9. Furthermore, the second motor 4 drive power transfer path is switched by the feed rack 40 moving to this specific position at the inside circumference or moving from this specific position toward the outside circumference of the disc. As a result, drive power from a single motor (the second motor 4) can be used to power the signal reading operation of the optical pickup 6, as well as switching the drive power transfer path of the second motor 4.

Furthermore, by continuing to drive the same motor 4 without changing the direction of shaft rotation after moving the optical pickup 6 for signal reproduction to the inside circumference edge Sr of the data signal recording area of the disc 9, the disc 9 is automatically unclamped from the turntable 5 so that the disc 9 can be ejected from the disk drive. It is therefore possible to eliminate the dedicated disk loading motor required for disk loading and unloading in a conventional optical disk drive. It is therefore possible to provide a less expensive disk drive by thus reducing the number of motors used in the disk drive.

Furthermore, by changing the direction of second motor 4 operation or simply stopping the second motor 4 after the optical pickup 6 has been moved to the inside circumference edge Sr of the data signal recording area of the disc 9 and the position of the optical pickup 6 has been detected by the inside circumference detection switch 7, it is possible to not eject the disc 9 from the disk drive and continue reading or writing signals to the same disc 9. The number of detectors or detection switches used in the disk drive can also be reduced, and a lower cost optical disk drive can therefore be provided, because the inside circumference detection switch 7 can be used to detect if a disk has been loaded into the disk drive and if the disk has been clamped, and dedicated detectors used in a conventional disk drive for these detection purposes can therefore be eliminated.

The traverse base 20 in a disk drive according to this preferred embodiment is designed to swing up and down on the back end of the base, through the intermediate base 80, while a protrusion 80P at the front end of the intermediate base 80 engages a cam channel 33 in the cam gear 30. As described above, this cam channel 33 comprises top and bottom horizontal channels 33a and 33c and a diagonal channel 33b connecting these horizontal channels (see FIG. 24 to FIG. 29). The vertical position of the front of the traverse base 20 is determined by what part of these three channels 33a to 33c the protrusion 80P is engaged with, that is, by the direction and distance of cam gear 30 rotation. The intermediate base 80 and the traverse base 20 therefore swing up and down pivoting around the back edge of the traverse base 20 according to the direction and distance of cam gear 30 rotation.

It will thus be obvious that the traverse base 20 is supported to swing vertically on one edge thereof relative to the drive base 10 through the intermediate base 80. More specifically, the cam gear 30 is turned by power transferred from the loading drive gear set 61, causing the other end of the traverse base 20 to move up or down such that the front of traverse base 20 swings up or down relative to the drive base 10. Drive power from one motor, the second motor 4, is thus used to swing the traverse base 20 up and down, and therefore to raise or lower the turntable 5, and spin the disc 9 in conjunction therewith.

Figure 13:
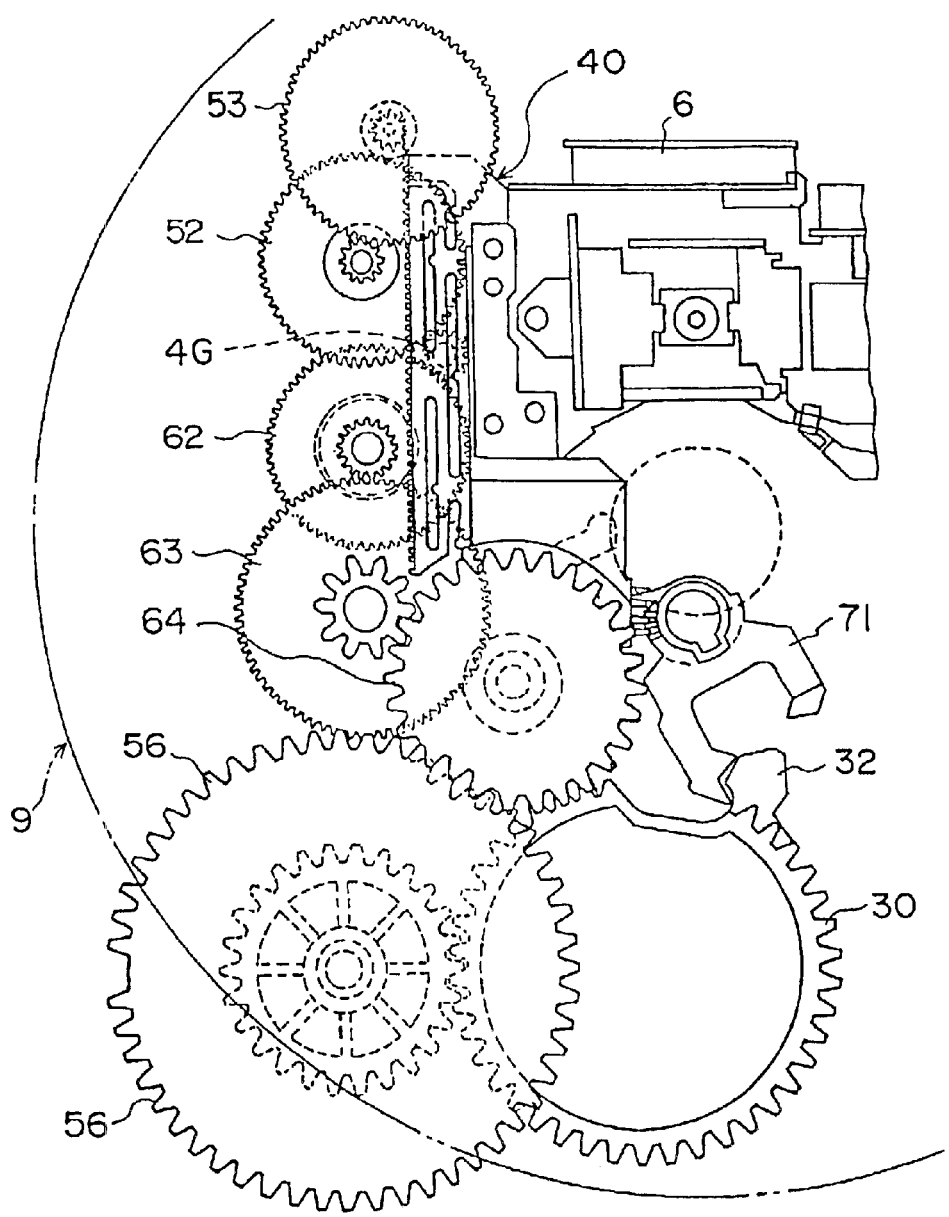
FIG. 13 is one plan view showing the operation of the drive mechanism.
Figure 18:
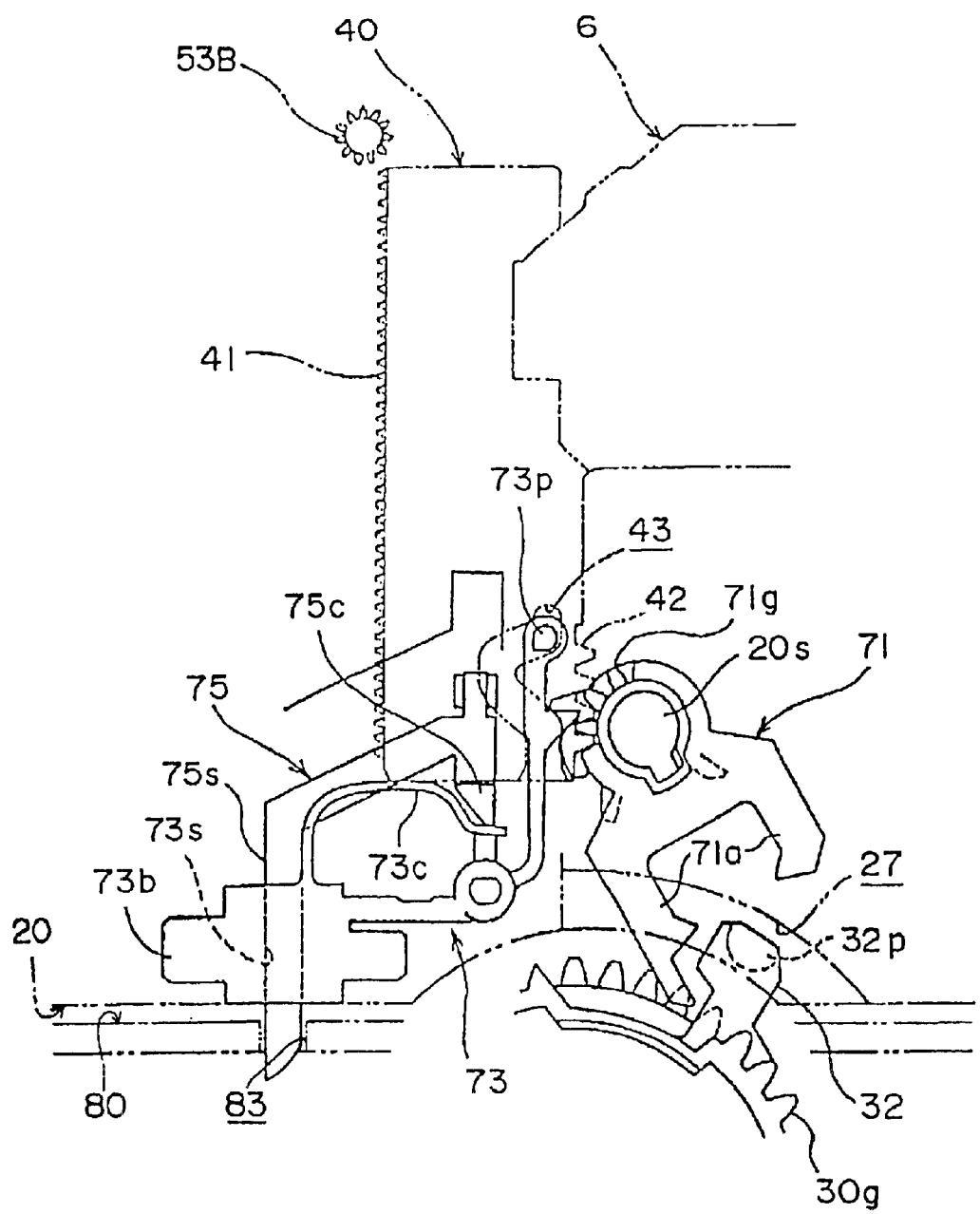
FIG. 18 is a sequence of enlarged plan views showing the drive power transfer path switching operation of the drive mechanism in the optical disk drive.

When the cam gear 30 moves further clockwise as shown in FIG. 13 and FIG. 18, the position at which the protrusion 80P of intermediate base 80 engages the cam channel 33 moves from the top horizontal channel 33a through the diagonal channel 33b to the bottom horizontal channel 33c.

Figure 9:
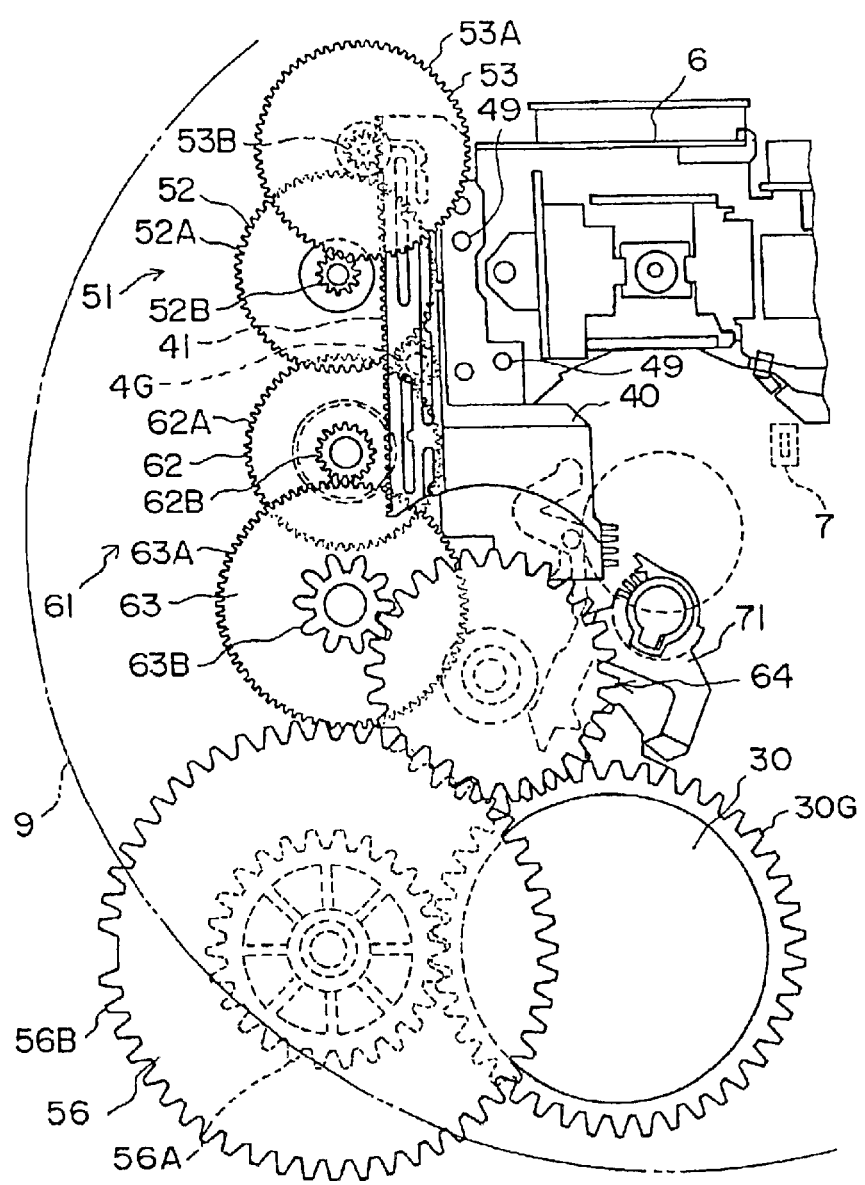
FIG. 9 is one plan view showing the operation of a drive mechanism in the optical disk drive.

When the intermediate base 80 and the traverse base 20 are positioned as shown in FIG. 9 and FIG. 14, the protrusion 80P engages top horizontal channel 33a, and the intermediate base 80 and the traverse base 20 is held as shown in FIG. 6 parallel to the drive base 10 with the top of both bases substantially flush with the top of the drive base 10. The disc 9 can thus be clamped and held level between the turntable 5 and the clamper 96.

When the feed rack 40 moves more than a specific distance forward as shown in FIGS. 10 to 13 and FIGS. 15 to 18, the cam gear 30 begins to turn, and the front protrusion 80P of the intermediate base 80 passes the diagonal channel 33b to engage the bottom horizontal channel 33c of cam channel 33. This results in the intermediate base 80 and the traverse base 20 swinging down on the back end thereof so that it is inclined to the drive base 10 as shown in FIG. 7. This movement of the traverse base 20 also lowers the turntable 5 to the same downward incline. As a result, a disc 9 can be drawn to a position above the turntable 5 from outside the disk drive 1, or can be ejected from above the turntable 5 to outside the disk drive 1, without the disc 9 or turntable 5 interfering with disc 9 loading or unloading.

When the traverse base 20 is thus inclined down from the drive base 10 to a specific position (the position at which the front protrusion 80P of the intermediate base 80 passes the diagonal channel 33b and engages the bottom horizontal channel 33c of cam channel 33), the teeth 30g of cam gear 30 engage the tray drive gear 56 of the disk loading mechanism. The tray 55 is thus driven with the traverse base 20 reliably swung to a downward position. It is therefore possible to reliably avoid interference between the tray 55 (and disc 9 thereon) and the turntable 5 when the tray is driven (that is, when a disk is loaded or unloaded).

When the traverse base 20 is thus inclined (see FIG. 13, FIG. 18, and FIG. 7), the third loading gear 64 is also inclined and engaged with the teeth 30g of cam gear 30. As noted above and shown in FIG. 29, these teeth 30g have a profile in longitudinal section that is curved or inclined to the axis Lg of the cam gear 30. As a result, gears 64 and 30g can engage reliably and smoothly.

Furthermore, while the feed rack 40 (that is, the optical pickup 6) moves to the front and the traverse base 20 is inclining, the front edge of the feed rack 40 contacts and pushes forward on the back of the extension 75c of positioning rod 75 in conjunction with the forward movement of the feed rack 40 as shown in FIGS. 14 to 18. This causes the regulating rod 75s of the positioning rod 75 to move forward guided by the guide slot 73s in the base 73b of rocking lever 73. Then, as noted above, the regulating rod 75s fits into the positioning hole 83 in the intermediate base 80, and thus positions the traverse base 20 to the drive base 10 through the intermediate base 80.

When the feed rack 40 moves in the opposite direction to the back, the force of spring part 73c moves the positioning rod 75 to the back. This is because the front of the extension 75c of positioning rod 75 contacts the spring part 73c of the rocking lever 73, and the spring part 73c thus constantly urges the positioning rod 75 toward the back.

When the traverse base 20 is held substantially parallel to the drive base 10 with the tops thereof substantially flush, the drive base 10 and traverse base 20 are positioned front-back to each other by engagement of the engaging protrusion 32p of hook 32 on cam gear 30 with the cam channel 27 in the front of traverse base 20.

Figure 19:
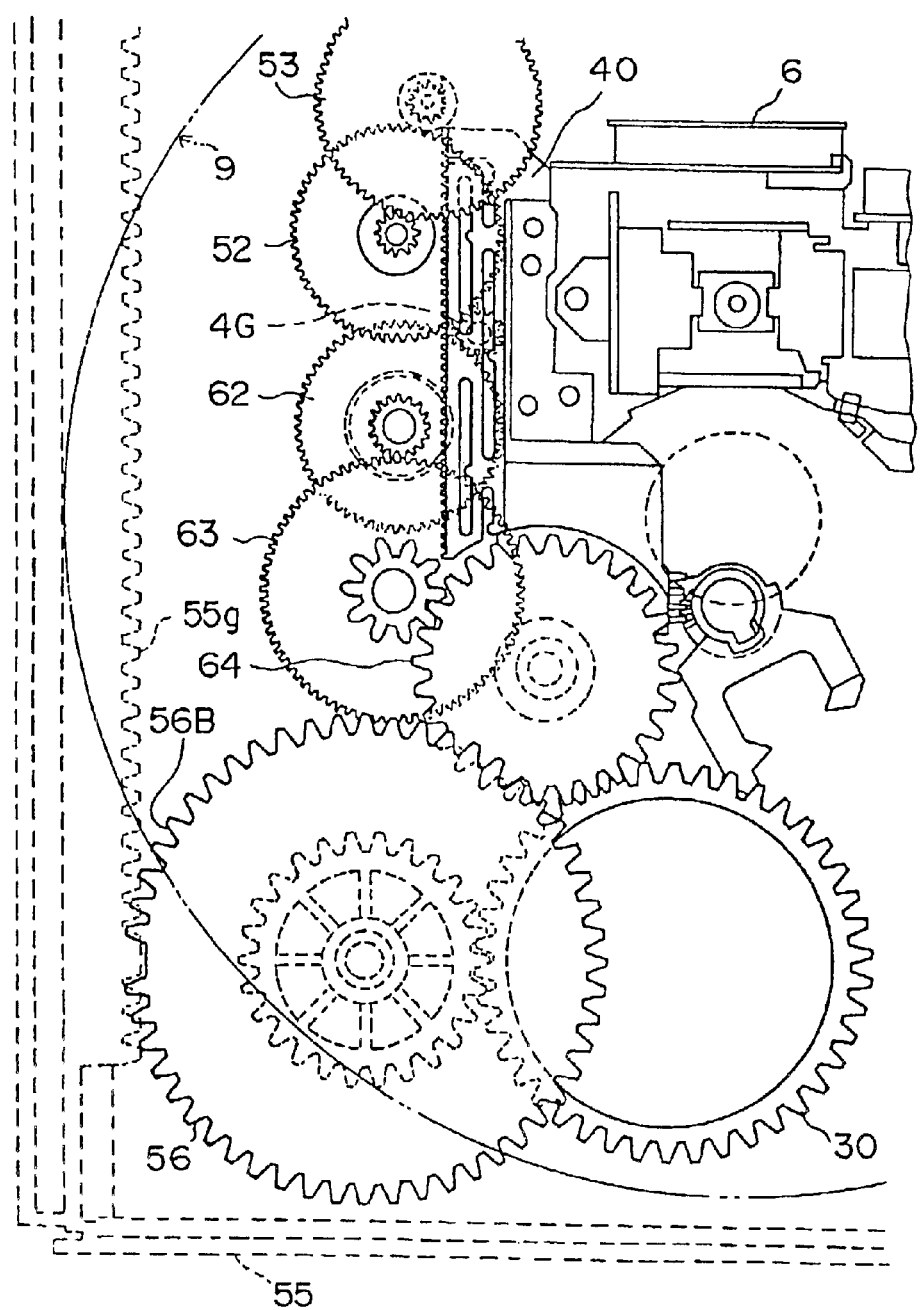
FIG. 19 is an enlarged plan view showing the engagement of the tray and tray drive gear.
Figure 20:
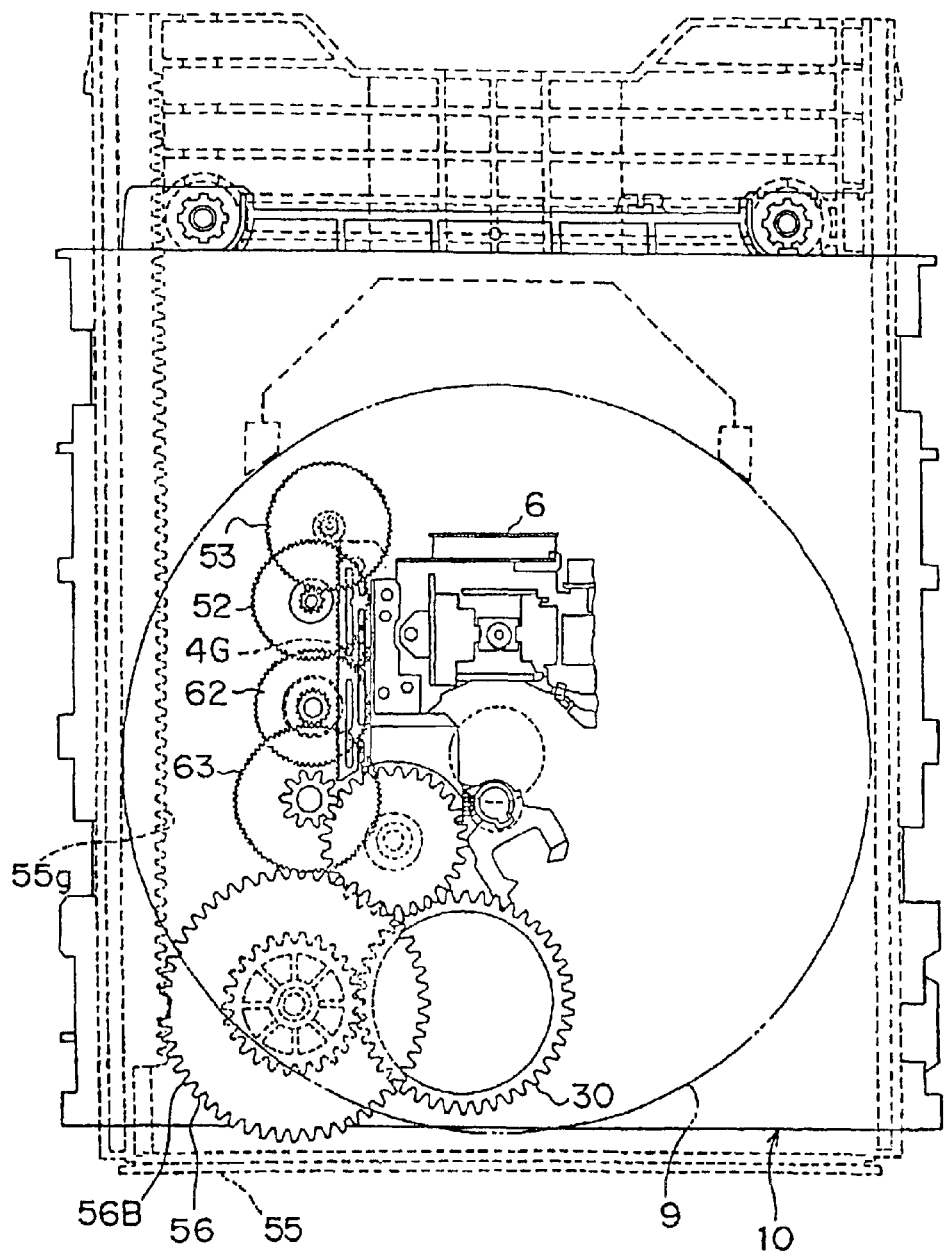
FIG. 20 is a plan view of the optical disk drive with the tray stored inside the drive.

FIG. 19 and FIG. 20 show the state in which the motor gear 4G is driven further in the same direction (clockwise) by the second motor 4, and cam gear 30 is turned further clockwise by way of intervening loading drive gear set 61. The input gear 56A of tray drive gear 56 does not engage the teeth 30g of traverse base 20, and is positioned to the smooth part 34, in the states shown in FIGS. 9 to 13. Rotation of cam gear 30 is therefore not transferred to the tray drive gear 56, and the tray drive gear 56 does not turn.

Figure 21:
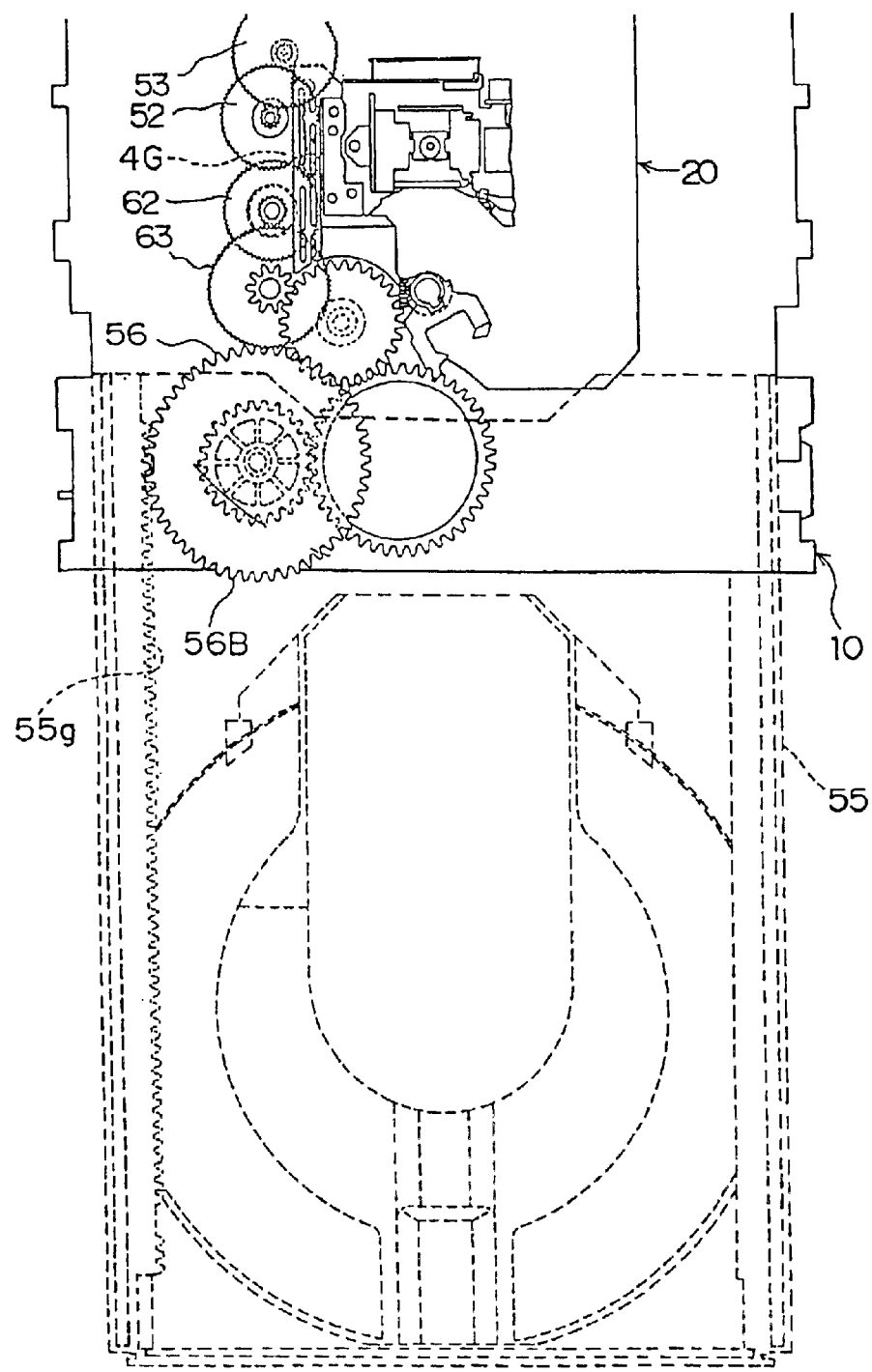
FIG. 21 is a plan view of the optical disk drive with the tray moved outside the drive.
Figure 22:
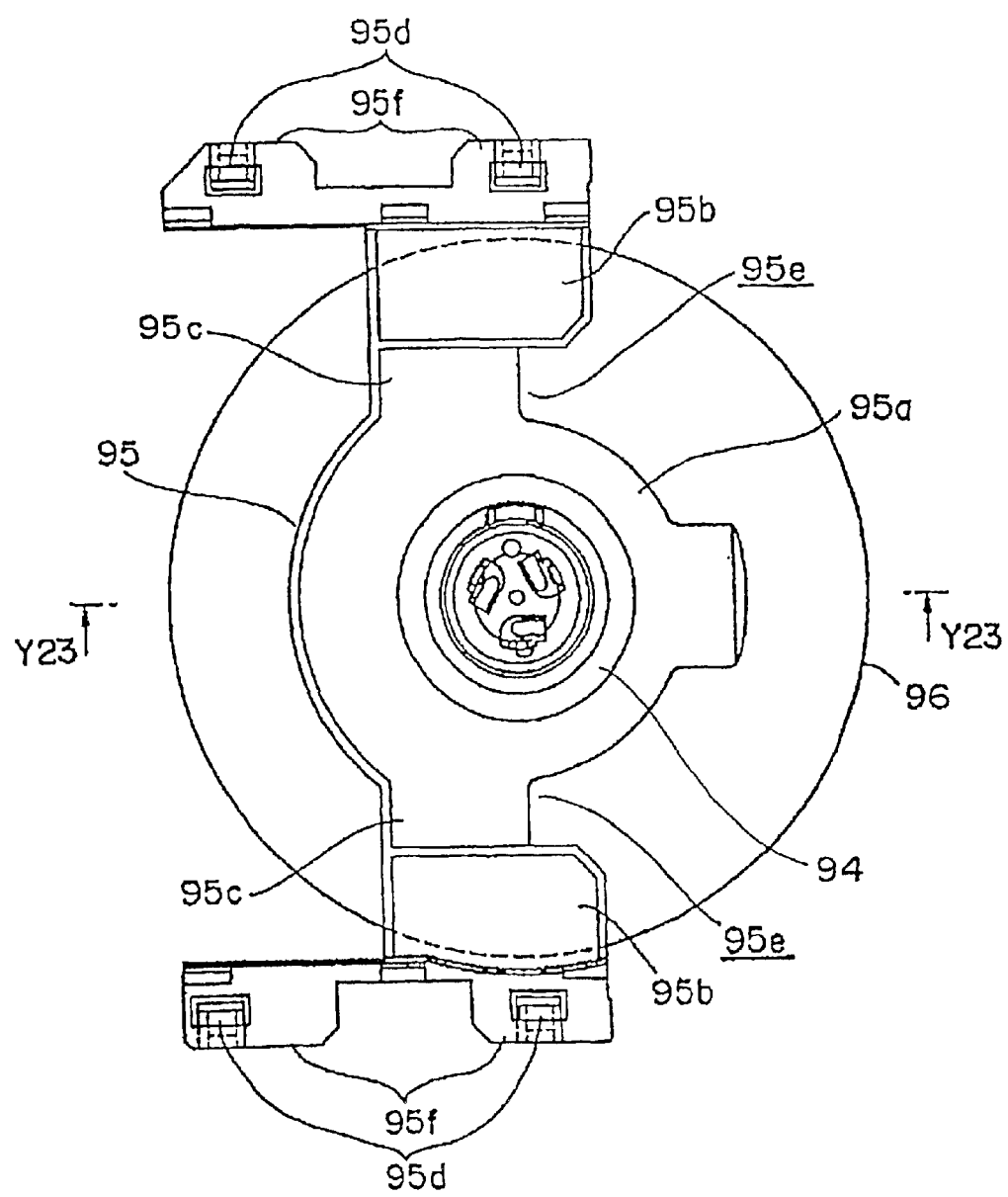
FIG. 22 is an enlarged plan view showing the disk clamping mechanism of the optical disk drive.
Figure 23:
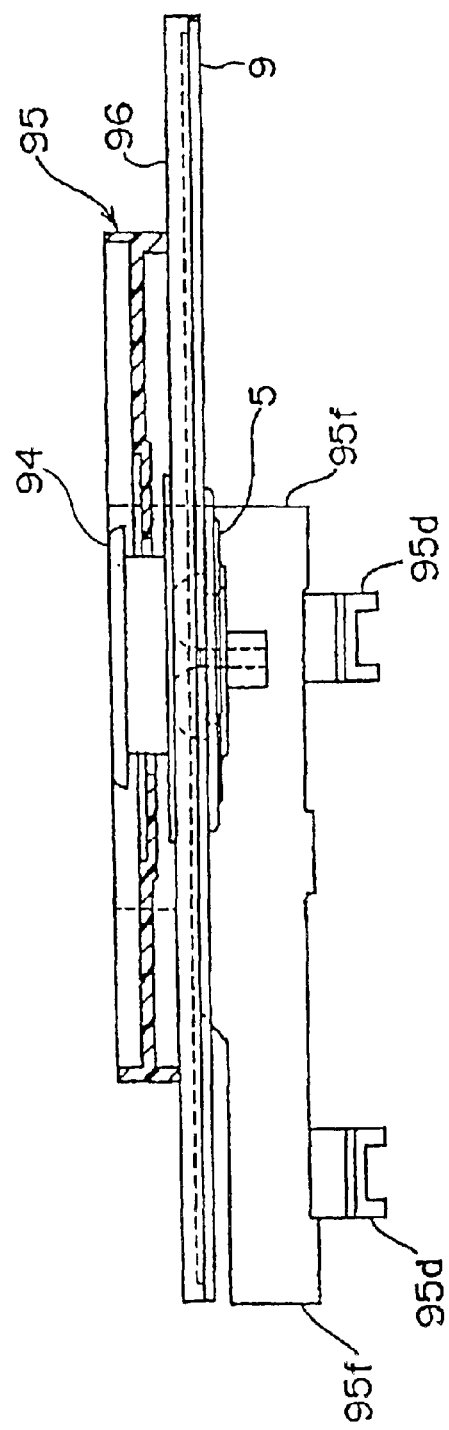
FIG. 23 is a section view through line Y23—Y23 in FIG. 22.
Figure 24:
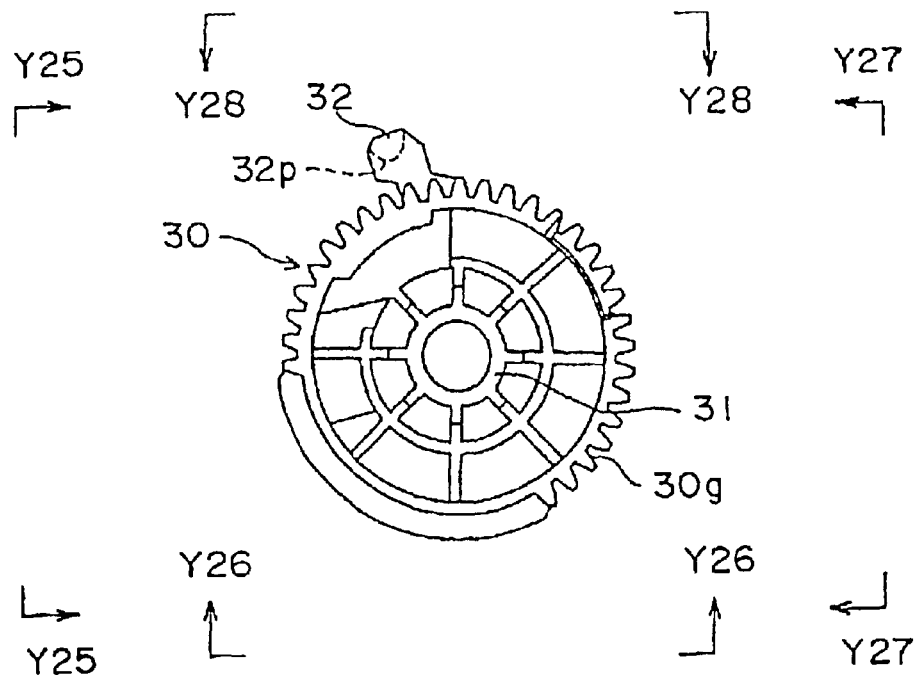
FIG. 24 is a plan view of the cam gear of this drive mechanism.
Figure 25:
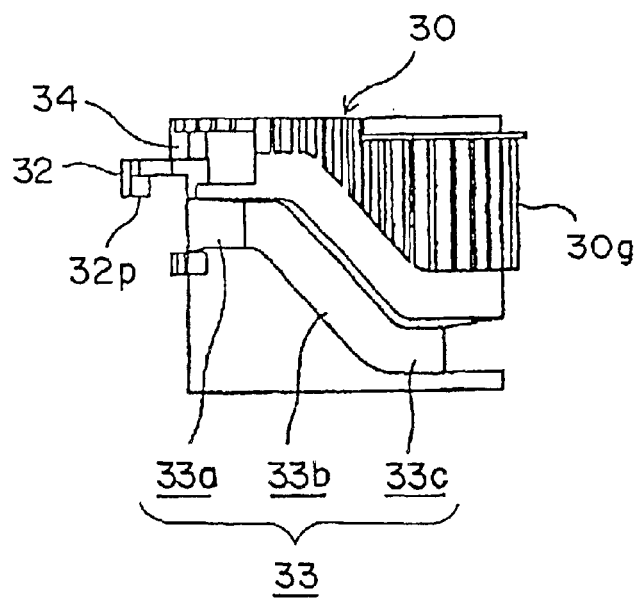
FIG. 25 is a side section view through line Y25—Y25 in FIG. 24.
Figure 26:
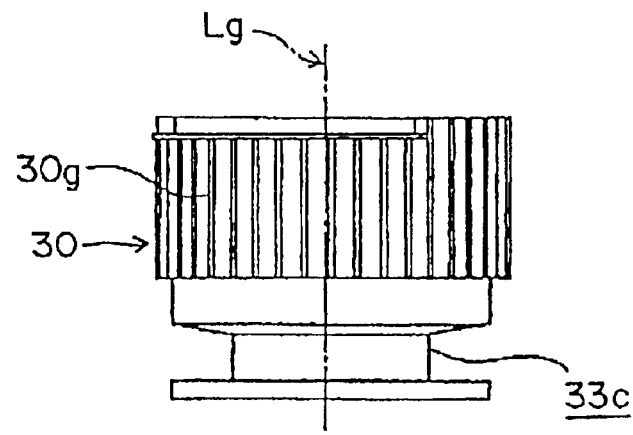
FIG. 26 is a side section view through line Y26—Y26 in FIG. 24.
Figure 27:
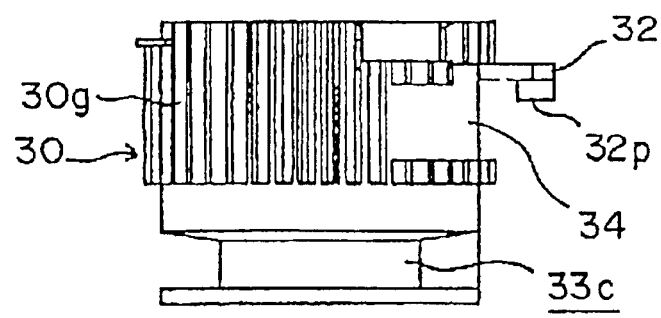
FIG. 27 is a side section view through line Y27—Y27 in FIG. 24.
Figure 28:
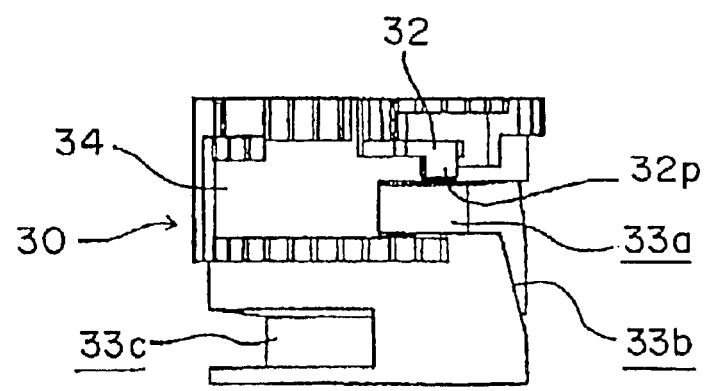
FIG. 28 is a side section view through line Y28—Y28 in FIG. 24.

However, when the cam gear 30 turns to the position shown in FIG. 19 and FIG. 20, teeth 30g of cam gear 30 begin to engage input gear 56A of tray drive gear 56, and tray drive gear 56 turns in conjunction with rotation of the cam gear 30. The tray 55 is then pulled to the front as shown in FIG. 21 by way of output gear 56B of tray drive gear 56 and the tray rack teeth 55g engaged therewith.

It should be noted that drawing the tray 55 from inside the disk drive 1 to outside the drive, that is, unclamping the disc 9 and ejecting the disc 9 from a signal reproduction state, is described above. To draw the tray 55 from outside to inside the disk drive 1, the second motor 4 is driven in the opposite direction by the motor control circuit of the circuit board 2 so that the motor gear 4G begins to turn clockwise. As a result, carrying the optical disc 9 into the disk drive 1, clamping the disc, and preparing for signal reproduction are accomplished as a sequence of actions.

As described above, a disk drive according to this preferred embodiment of the present invention comprises a drive base 10 and separate traverse base 20 to which a turntable 5 is assembled with the traverse base 20 supported so as to swing up and down on the drive base 10. By driving a single motor (second motor 4) continuously in a forward direction (first direction of rotation) or opposite direction, moving an optical pickup 6, raising and lowering the turntable 5, and transporting a disc 9 can be accomplished substantially continuously in this order, or substantially continuously in the opposite order. It is therefore possible when loading or unloading a disc 9 to avoid interference with the turntable 5 without moving the disc 9 up or down. Unlike with a conventional disk drive, it is therefore not necessary to provide a disk holder for lifting the disk.

Furthermore, it is also possible to secure (clamp) and release (unclamp) the disc 9 to or from the turntable 5 using the operation whereby the traverse base 20 to which the turntable 5 is assembled is swung vertically on the drive base 10. Therefore, unlike with a conventional disk drive, it is not necessary to drive the clamping mechanism (chucking plate) up and down.

Furthermore, because a single motor (second motor 4) is used to move the optical pickup 6, raise and lower the turntable 5, and transport the disc 9, the disk drive 1 can be operated using a total of two motors, that is, said second motor 4 and a spindle motor (first motor) 3 for rotationally driving the turntable 5. By thus reducing the number of motors used, disk drive 1 construction is simplified, and good operation of the component parts can be more stably maintained.

As described above, in the optical disk drive 1 according to the preferred embodiment, the drive power transfer path of the second motor is to be switched between a path transferring power to the loading drive mechanism and a path transferring power to the pickup drive mechanism. However, it is possible to utilize the second motor only to drive the optical pickup 6, without performing the switching the transfer path.

That is, for example, in what is called a changer capable of reading information signals from a plurality of disks by exchanging them one by one, and a disk drive having a hop-up type of door, disk loading is conducted by an outer mechanism (that is, by using power from outside of the drive) that is completely separate from a portion of the drive having a mechanism for recording/reading against the optical disk. Therefore, it is not necessary to use power inside of the disk drive by switching the transfer path between the pickup drive mechanism and the loading drive mechanism.

Figure 51:
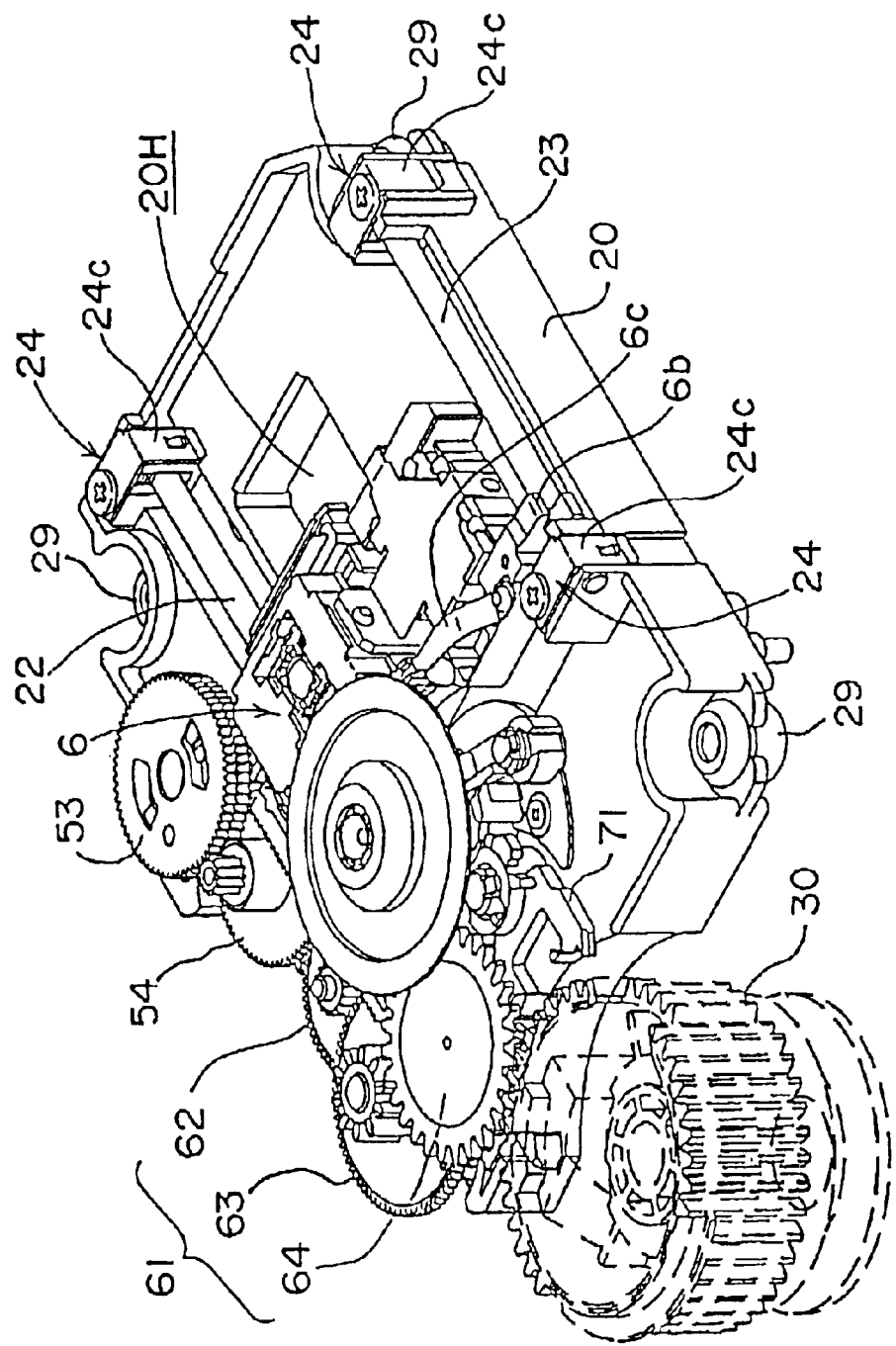
FIG. 51 is a perspective view of the disk drive showing an installed state of gears to the traverse base.
Figure 52:
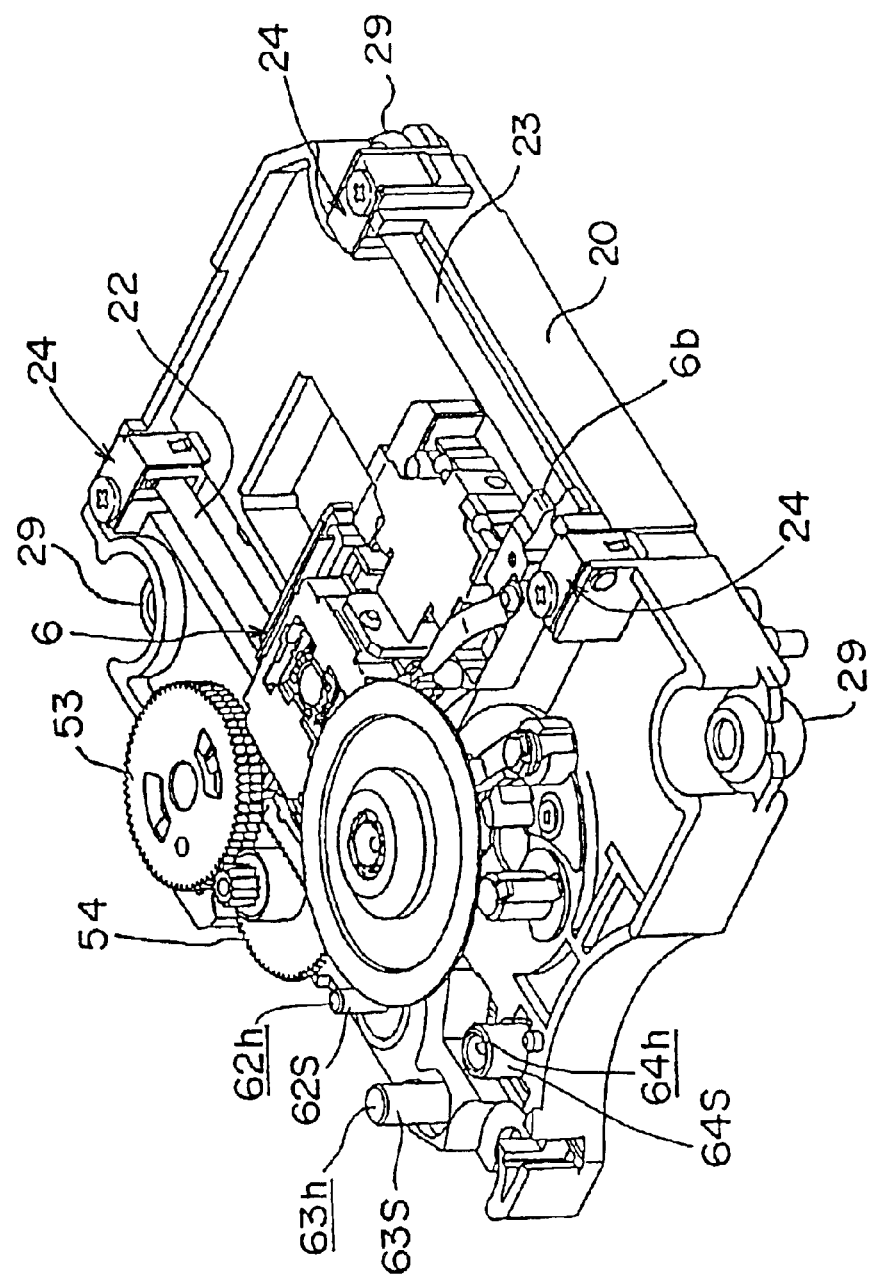
FIG. 52 is a perspective view of the traverse base showing an state wherein loading drive gears are not installed.
Figure 53:
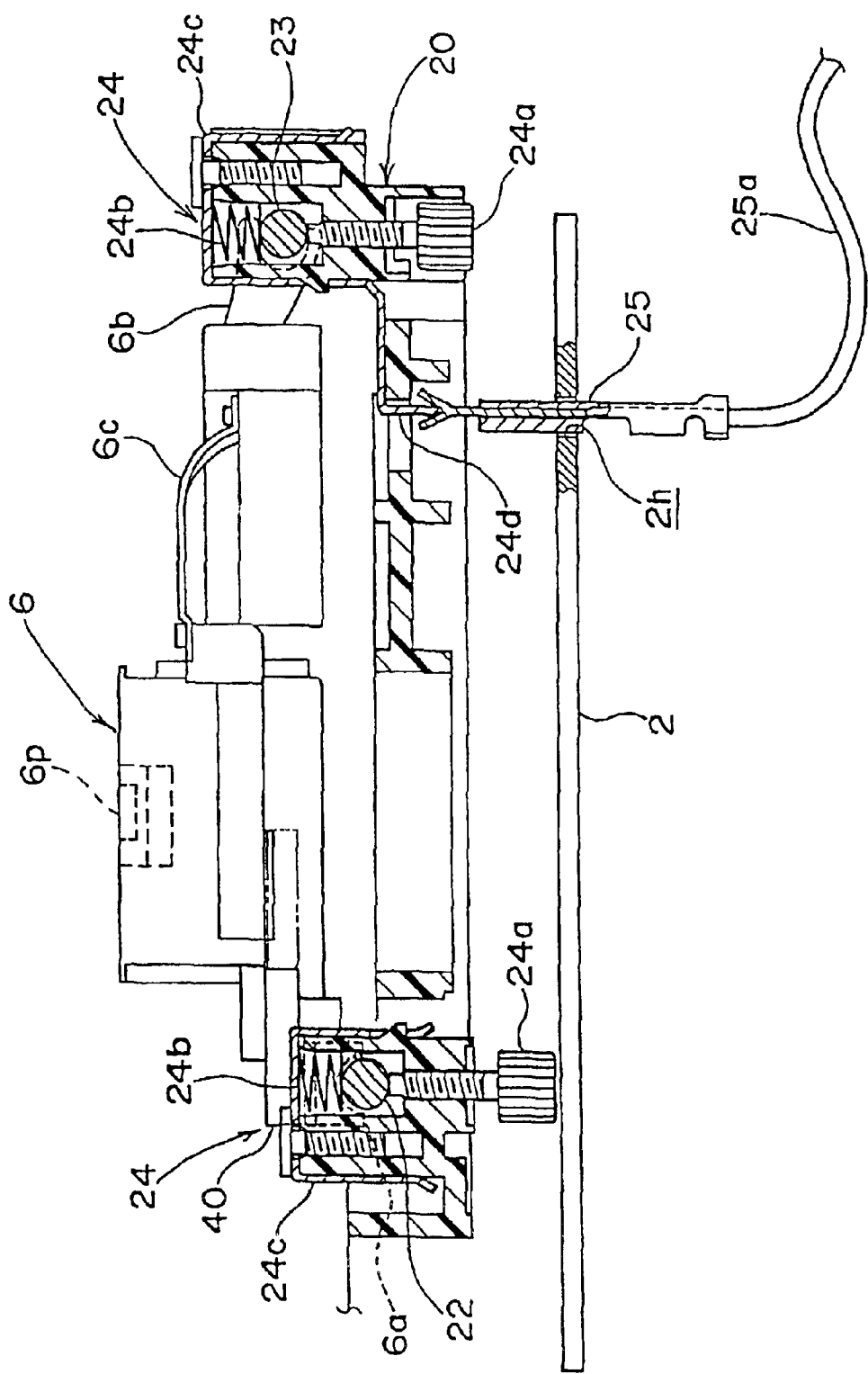
FIG. 53 is a vertical sectional view of the disk drive showing an installed state of a pickup guide and an earth mechanism of the pickup.

Accordingly, for such an application, it is not necessary to provide the above-mentioned loading drive gears 61 (the first to the third loading gears 62–64). As shown in FIG. 51 and FIG. 52, the loading drive gears 61 (the first to the third loading gears 62–64) are assembled to the traverse base 20 by inserting respectively the rotating shafts of the gears 62–64 into the shaft holes 62h–64h of supporting bosses 62S–64S provided on the traverse base 20. However, for the above-mentioned application, the loading drive gears 61 (the first to the third loading gears 62–64) are not assembled to the traverse base 20, and it may be used in the state as shown in FIG. 52. In this case, the second motor is used only to move the optical pick up 6.

As described above, in the disk drive 1 according to the embodiment, it is possible to change easily the manner of use between an application to perform disk loading by using power inside of the drive (that is, the second motor) and an application to perform disk loading by using power outside of the drive.

It is to be noted that the present invention is not limited to the above-described embodiments and, needless to say, various improvements and design changes are possible without departing from the scope of the invention.

As described above, in an optical disk drive according to a first aspect of the present invention, a second base separate from the first base is supported to move or swing vertically relative to the first base through an intermediate base. A single motor (the above-noted second motor) can be driven continuously forward (in a first direction of rotation) or in the opposite direction to move the optical pickup, raise or lower the turntable, and move the optical disc substantially continuously in this sequence, or substantially continuously in reverse direction in reverse sequence. It is therefore possible to avoid interference between the turntable and disk when loading and unloading a disk without moving the disk up or down. Unlike with a conventional disk drive, it is therefore not necessary to provide a disk holder for lifting the disk. Furthermore, it is also possible to secure (clamp) and release the disc to or from the turntable using the operation whereby the second base to which the turntable is assembled is swung vertically on the first base. Therefore, unlike with a conventional disk drive, it is not necessary to drive the clamping mechanism (chucking plate) up and down.

Furthermore, because a single motor (the second motor) is used to move the optical pickup, raise and lower the turntable, and transport the disc, the disk drive can be operated using a total of two motors, that is, said second motor and a first motor for rotationally driving the turntable. By thus reducing the number of motors used, disk drive construction is simplified, and good operation of the component parts can be more stably maintained.

Furthermore, in this case, the intermediate base is supported on a first base such that the intermediate base can move or swing vertically relative to the first base, and the second base is supported by the intermediate base through an elastic body. Accordingly, the supporting of the intermediate base to move or swing vertically relative to the first base and the elastic supporting of the second base can be performed separately. Thus, the flexibility in determining the elasticity of the supporting portion for supporting elastically the second base is enhanced, in comparison with the case where the intermediate base is not provided (prior art 2). As a result, it is possible to achieve effectively both absorbing vibration input from outside and restraining vibration that may be generated by rotation of the turntable simultaneously.

In an optical disk drive according to a second aspect of the present invention, basically the same benefit is achieved as the first aspect of the invention. In addition, the intermediate base supporting the second base is disposed inside an opening in the first base, and is supported so that it can swing vertically pivoting around one end thereof relative to the first base. More specifically, the cam gear is rotated by drive power transferred from the loading drive gear set, and the other end side of the intermediate base (that is, of the second base) is raised or lowered in conjunction with cam gear rotation. As a result, the intermediate base and the second base are moved up or down to the first base pivoting around the one end side of the second base. That is, it is also possible to use drive power from a single motor (the second motor) to drive and link pivoting the second base up and down to the first base (that is, raising and lowering the turntable), and transport (load and unload) the disk.

In an optical disk drive according to a third aspect of the present invention, basically the same benefit is achieved as the second aspect of the invention. In addition, the profile of the outside gear part of the cam gear as seen in longitudinal section is an arc or a line approaching said arc. This arc follows a path of vertical circular motion through which the final output gear of the loading drive gear set travels in conjunction with the swinging movement of the intermediate base (that is, of the second base). In this case the final output gear of the loading drive gear set positively engages the outside gear part of the cam gear when the final output gear swings up or down in conjunction with the swinging movement of the intermediate base and the second base.

In an optical disk drive according to a fourth aspect of the present invention, basically the same benefit is achieved as the second or the third aspect of the invention. In addition, a protrusion is disposed to said other end side of the intermediate base, and this other end side of the intermediate base (that is, of the second base) is positioned vertically as a result of this protrusion engaging a cam channel in the cam gear. Therefore, it is also possible to reliably determine and precisely position the other end side of the intermediate base and the second base vertically to the first base. As a result, components on the first base and components on the second base can be precisely and reliably engaged with corresponding components.

In an optical disk drive according to a fifth aspect of the present invention, basically the same benefit is achieved as anyone of the second to fourth aspects of the invention. In addition, the outside gear part of the cam gear engages the tray drive gear of the disk loading mechanism when the intermediate base (that is, the second base) swings downward to a specific position relative to the first base. The tray is thus driven after the intermediate base and the second base have positively swung down from the first base. Therefore, it is also possible to reliably avoid interference between the tray (that is, the disk on tray) and the turntable when the tray is driven (that is, when the disk is transported).

In an optical disk drive according to a sixth aspect of the present invention, basically the same benefit is achieved as anyone of the second to fifth aspects of the invention. In addition, the feed rack can be moved to a specific position farther to the inside circumference side of the disc after moving the optical pickup to an inside circumference edge position of the data signal recording area of the optical disc. By moving to this specific position at the inside circumference side, or moving from said specific position at the inside circumference side to the outside circumference side of the disc, the feed rack switches the drive power transfer path of the second motor. Therefore, it is also possible to use a single motor (the second motor) to drive signal reading operations of the optical pickup, and switching the drive power transfer path of the second motor.

In an optical disk drive according to a seventh aspect of the present invention, basically the same benefit is achieved as the sixth aspect of the invention. In addition, a regulating rod is driven to project from the other end side of the second base as result of the feed rack moving beyond a specific position to the other end side. The regulating rod thus fits into the positioning hole in the intermediate base, and thereby determines the lateral position of the second base to the intermediate base perpendicular to the direction of feed rack travel.

Therefore, it is also possible to precisely and positively position the other end side of the second base laterally to the intermediate base (that is, to the first base) . In addition, components on the first base and components on the second base can be precisely and reliably engaged with corresponding components. Furthermore, moving the feed rack to the other end side of the second base and positioning the second base can be interlinked using drive power from a single motor (the second motor).

In an optical disk drive according to an eighth aspect of the present invention, basically the same benefit is achieved as the first aspect of the invention. In addition, in clamping a warped disk to the clamper side, it is capable of exhibiting an action of correcting warpage by abutting and pressurizing the large clamper to a proximity of an outer periphery of a disk on which no information is recorded. Thereby, it is possible to irradiate and reflect the light beam of the pickup to the disk surface in a condition of correcting warpage of the disk, and to limit more strictly an angle between an information recording surface of the disk and the light beam. That is, even if there is deformation such as warpage in the disk, it is possible to accurately perform recording and reproducing information in dealing with the deformation of the disk. Furthermore, since the disk drive is provided with a clamper moving means for moving the large clamper abutting against an outer periphery of the disk in a direction away from an upper surface of the turntable, it is possible to move the large clamper so as not to hinder movements of the tray.

In an optical disk drive according to an ninth aspect of the present invention, basically the same benefit is achieved as the eighth aspect of the invention. In addition, the spring hook may be supported by the clamp plate unless the turntable and the clamper are in pinching and holding conditions, and the spring holder that is fixed to the spring hook may be simultaneously supported. It is possible to exhibit an action of moving the clamper by the spring member that is interposed between the supported spring holder and the clamper. That is, it is possible to move the clamper in a direction away from an upper surface of the turntable, by urging force of the spring member that is interposed between the clamper and the spring holder supported by the clamp plate.

In an optical disk drive according to an tenth aspect of the present invention, basically the same benefit is achieved as the eighth aspect of the invention. In addition, it is possible to exhibit an action of moving the clamper in a direction away from an upper surface of the turntable through mutual pulling owing to magnetic force of the first magnet and the second magnet unless the turntable and the clamper are in pinching and holding conditions, thereby

POSSIBILITY OF INDUSTRIAL UTILIZATION

As described above, according to the optical disk drive of the present invention, it is possible to perform a disk loading operation, a disk rotating operation and a pickup driving operation by 2 motors. Thus, it is possible to simplify the construction of the disk drive and to achieve both absorbing vibration from outside and suppressing vibration generated by the rotating operation of the turntable. Therefore, the present invention may advantageously be applied to an optical disk drive, that is required constructional simplification and improvement of durability against applications of shock and vibration, for recording a data signal and/or reproducing a data signal recorded to an optical disk used as a data storage medium such as what is called a CD or what is called a DVD.

What is claimed is:

1. An optical disk drive comprising:
   a turntable for rotatably supporting an optical disc;
   an optical pickup for writing a data signal to an optical disc rotating on said turntable and/or reading a data signal recorded to the optical disc;
   a pickup drive mechanism for moving said optical pickup bidirectionally between the inside circumference side and outside circumference side of the optical disc, said pickup drive mechanism including a feed rack for moving said optical pickup, and a rack drive gear set comprising a plurality of gears for driving said feed rack, said feed rack being movable to a specific position farther to the inside circumference side of the optical disc after moving said optical pickup to an inside circumference edge position of the data signal recording area of the optical disc;
   a disk loading mechanism for moving the optical disc bidirectionally between a first position at which the optical disc is above said turntable, and a second position at which the optical disc is outside said optical disk drive
   a first base comprising a base frame of said optical disk drive;
   a second base having disposed thereto said turntable, a first motor for rotationally driving said turntable, said optical pickup, a retractable regulating rod, and said pickup drive mechanism;
   an intermediate base disposed between said first base and said second base, said intermediate base being supported to move or swing vertically relative to said first base, and supporting said second base through an elastic body, said intermediate base having a positioning hole engageable by said regulating rod;
   a loading drive mechanism for driving said disk loading mechanism;
   a second motor drivable in forward and reverse directions for supplying drive power to said loading drive mechanism and pickup drive mechanism; and
   a drive power transfer path switching mechanism for switching a drive power transfer path of said second motor between a path transferring power to said loading drive mechanism and a path transferring power to said pickup drive mechanism, wherein said loading drive mechanism, said second motor, and said drive power transfer path switching mechanism are disposed on said first base and/or said second base;
   wherein said second motor is operable to drive continuously in a first direction of rotation so as to substantially continuously move said optical pickup, raise or lower said turntable, and move the optical disc, and said second motor is operable to drive continuously in a direction opposite the first direction of rotation so as to substantially continuously perform these operations in reverse direction in reverse sequence substantially continuously,
   wherein said pickup drive mechanism is operable to engage said drive power transfer path switching mechanism by moving to the specific position farther to the inside circumference side of the optical disc and thereby switch said drive power transfer path from a path to said pickup drive mechanism to a path to said loading drive mechanism,
   wherein said pickup drive mechanism is operable to switch said drive power transfer path from the path to said loading drive mechanism to the path to said pickup drive mechanism by moving from the specific position farther to the inside circumference side of the optical disc to the outside circumference side of the optical disc and thereby disengage from said drive power transfer path switching mechanism,
   wherein said feed rack is operable to engage said regulating rod when said feed rack moves from one end side of said second base to the other end side of said second base and reaches a specific position, and
   wherein said regulating rod is operable to protrude from the other end side of said second base and fit into said positioning hole when said feed rack moves further toward the other end side after engaging said regulating rod, thus regulating a position of said regulating rod with respect to said intermediate base through an elastic body, thereby positioning said second base with respect to said first base in a lateral direction perpendicular to a direction of feed rack travel.

2. An optical disk drive as described in claim 1, wherein said intermediate base is disposed inside an opening in said first base, and is vertically swingably supported around one end thereof relative to said first base;

wherein said first base comprises thereon a cam gear disposed near an end side of said intermediate base, said cam gear having on an outside surface thereof a cam channel for raising and lowering said end side of said intermediate base;

wherein said loading drive mechanism comprises a loading drive gear set containing a plurality of gears including a final output gear; and wherein said final output gear of said loading drive gear set is operable to engage an outside teeth part of said cam gear to rotate said cam gear and thereby raise or lower said end side of said intermediate base.

3. An optical disk drive as described in claim 2, wherein the profile of the outside teeth part of said cam gear as seen in longitudinal section is an arc or a line approaching said arc, said arc following a path of vertical circular motion through which said final output gear of said loading drive gear set travels in conjunction with the swinging movement of said intermediate base.

4. An optical disk drive as described in claim 3, wherein said end side of said intermediate base has a protrusion, and said end side of said intermediate base is positioned vertically by said protrusion engaging said cam channel in said cam gear.

5. An optical disk drive as described in claim 3, wherein said disk loading mechanism comprises a tray drive gear for driving a tray on which a disk is placed, said outside teeth part of said cam gear engaging said tray drive gear when said intermediate base swings downward to a specific position relative to said first base.

6. An optical disk drive as described in claim 2, wherein said end side of said intermediate base has a protrusion, and said end side of said intermediate base is positioned vertically by said protrusion engaging said cam channel in said cam gear.

7. An optical disk drive as described in claim 6, wherein said disk loading mechanism comprises a tray drive gear for driving a tray on which a disk is placed, said outside teeth part of said cam gear engaging said tray drive gear when said intermediate base swings downward to a specific position relative to said first base.

8. An optical disk drive as described in claim 2, wherein said disk loading mechanism comprises a tray drive gear for driving a tray on which a disk is placed, said outside teeth part of said cam gear engaging said tray drive gear when said intermediate base swings downward to a specific position relative to said first base.

9. An optical disk drive as described in claim 1, further comprising a disk clamping mechanism for pinching and holding the optical disk, which is mounted at a position that is concentric with said turntable fixed to a rotating axis of a spindle motor, with a clamper that is supported in a freely rotating manner;

wherein said clamper is comprised of a central clamper portion for pinching and holding an inner edge of the optical disk with said turntable and a large clamper portion abutting against an outer periphery of the optical disk; and wherein said optical disk drive further comprises a clamper moving means for moving said clamper in a direction away from an upper surface of said turntable when the pinching and holding of the optical disk by said turntable and said clamper are released.

10. An optical disk drive as described in claim 9, further comprising said clamper supported at a position that is concentric with said turntable, a spring member having one side abutting said clamper and the other side abutting a spring holder mounted at a position that is concentric with said clamper, a spring hook piercing through said clamper and being fixed to said spring holder with said clamper and said spring member being interposed between, and a clamp plate for supporting said spring hook, wherein spring hook is supported by said clamp plate unless said turntable and said clamper are in pinching and holding conditions and wherein said clamper is moved by said spring member interposed between said clamper and said spring holder.

11. An optical disk drive as described in claim 9, further comprising said clamper on which a first magnet is mounted, a clamp plate disposed in a direction opposite to said turntable of said clamper, and a second magnet mounted on said clamp plate, wherein said clamper is moved through mutual pulling owing to magnetic force of said first magnet and said second magnet unless said turntable and said clamper are in pinching and holding conditions.

\* \* \* \* \*